US012262461B2

(12) United States Patent
Hill et al.

(10) Patent No.: US 12,262,461 B2
(45) Date of Patent: Mar. 25, 2025

(54) METHODS AND APPARATUS FOR DECOMPOSING CONSTITUENT ELEMENTS OF FLUIDS

(71) Applicant: TellaPure, LLC, Reston, VA (US)

(72) Inventors: Edgar Bryan Hill, Reston, VA (US); Dawn Price, Great Falls, VA (US); Hidetaka Noda, Tokyo (JP)

(73) Assignee: TellaPure, LLC, Reston, VA (US)

( * ) Notice: Subject to any disclaimer, the term of this patent is extended or adjusted under 35 U.S.C. 154(b) by 364 days.

(21) Appl. No.: 17/847,249

(22) Filed: Jun. 23, 2022

(65) Prior Publication Data

US 2023/0038863 A1 Feb. 9, 2023

Related U.S. Application Data

(63) Continuation-in-part of application No. 17/732,442, filed on Apr. 28, 2022.

(60) Provisional application No. 63/300,636, filed on Jan. 18, 2022, provisional application No. 63/274,848, filed on Nov. 2, 2021, provisional application No. 63/231,178, filed on Aug. 9, 2021.

(51) Int. Cl.
*H05H 1/24* (2006.01)

(52) U.S. Cl.
CPC ....... *H05H 1/2437* (2021.05); *H05H 2245/15* (2021.05); *H05H 2245/17* (2021.05)

(58) Field of Classification Search
CPC .. H05H 1/2437; H05H 1/247; H05H 2245/15; H05H 2245/17; H05H 2245/20
USPC .................................................... 422/186.04
See application file for complete search history.

(56) References Cited

U.S. PATENT DOCUMENTS

2004/0022669 A1* 2/2004 Ruan ...................... A61M 1/32 422/22
2007/0114389 A1* 5/2007 Karpetsky ............ H01J 49/142 250/288

* cited by examiner

*Primary Examiner* — Kiet T Nguyen
(74) *Attorney, Agent, or Firm* — LSIP Law LLC

(57) ABSTRACT

Some embodiments are directed to a decomposing and collection apparatus for use with a fluid. The apparatus includes an assembly for generating ions via applying atmospheric pressure, low temperature plasma to the fluid and separating the generated ions. The assembly includes multiple plasma generator and separator units that are vertically stacked relative to each other. Each of the multiple plasma generator and separator units includes a plasma generator for generating the generating atmospheric pressure, low temperature plasma, and a separator disposed to receive the positively and negatively ions ejected from the plasma generator and configured to redirect the received positively charged ions in one direction and the received negatively charged ions are redirected to another direction different from the one direction. The apparatus also includes a collector configured to collect at least one of the redirected positively charged ions and the negatively charged ions.

17 Claims, 30 Drawing Sheets

FIG. 8

| Row | Parameter | Small Electrode (6 cm x 9 cm) | Large Electrode (30 cm x 30 cm) | Small Electrode (6 cm x 9 cm) | Large Electrode (30 cm x 30 cm) | Small Electrode (6 cm x 9 cm) | Large Electrode (30 cm x 30 cm) |
|---|---|---|---|---|---|---|---|
| 1 | Electrode Material | Aluminum | Aluminum | Aluminum | Aluminum | Aluminum | Aluminum |
| 2 | Electrode Gap | 6.0 mm | 6.0 mm | 6.0 mm | 6.0 mm | 6.0 mm | 6.0 mm |
| 3 | **Dielectric Layer Material** | **Borosilicate Glass** | **Borosilicate Glass** | **Borosilicate Glass** | **Borosilicate Glass** | **Borosilicate Glass** | **Borosilicate Glass** |
| 4 | **Dielectric Thickness (mm)** | **1.0 mm** | **1.0 mm** | **2.0 mm** | **2.0 mm** | **2.5 mm** | **2.5 mm** |
| 5 | Relative Permittivity | 4.7 | 4.7 | 4.7 | 4.7 | 4.7 | 4.7 |
| 6 | Dielectric Strength (kV/mm) | 30 kV/mm | 30 kV/mm | 30 kV/mm | 30 kV/mm | 30 kV/mm | 30 kV/mm |
| 7 | **Plasma Gap** | **4 mm** | **4 mm** | **2 mm** | **2 mm** | **1 mm** | **1 mm** |
| 8 | Frequency | 60 Hz | 60 Hz | 60 Hz | 60 Hz | 60 Hz | 60 Hz |
| 9 | Applied Voltage (AC) | 5 kV | 5 kV | 5 kV | 5 kV | 5 kV | 5 kV |
| 10 | Streamer Discharge (arbitrary qualitative scale) | 5 | 1 | 7 | 3 | 8 | 4 |
| 11 | Capacitance (farads) | 1.08E-11 F | 1.80E-10 F | 1.68E-11 F | 2.79E-10 F | 2.32E-11 F | 3.86E-10 F |
| 12 | Impedance | 2.4551E+08 ohm | 1.4730E+07 ohm | 1.5818E+08 ohm | 9.4909E+06 ohm | 1.1452E+08 ohm | 6.8712E+06 ohm |
| 13 | Peak Reduced Electric Field (Td) | 43.82 Td | 43.82 Td | 43.82 Td | 43.82 Td | 43.82 Td | 43.82 Td |
| 14 | Ignition Voltage (arbitrary qualitative scale) | 5 | 5 | 3 | 3 | 2 | 2 |
| 15 | Burning Voltage (arbitrary qualitative scale) | 4 | 4 | 2 | 2 | 1 | 1 |
| 16 | Plasma Volume/Micro-discharge number (arbitrary qualitative scale) | 1 | 16.7 | 3 | 50 | 4 | 66.7 |

FIG. 9

| Row | Parameter | Small Electrode (6 cm x 9 cm) | Large Electrode (30 cm x 30 cm) | Small Electrode (6 cm x 9 cm) | Large Electrode (30 cm x 30 cm) | Small Electrode (6 cm x 9 cm) | Large Electrode (30 cm x 30 cm) |
|---|---|---|---|---|---|---|---|
| 1 | Electrode Material | Aluminum | Aluminum | Aluminum | Aluminum | Aluminum | Aluminum |
| 2 | Electrode Gap | 6.0 mm | 6.0 mm | 6.0 mm | 6.0 mm | 6.0 mm | 6.0 mm |
| **3** | **Dielectric Layer Material** | **Ceramic** | **Ceramic** | **Ceramic** | **Ceramic** | **Ceramic** | **Ceramic** |
| **4** | **Dielectric Thickness (mm)** | **1.0 mm** | **1.0 mm** | **2.0 mm** | **2.0 mm** | **2.5 mm** | **2.5 mm** |
| 5 | Relative Permittivity | 25 | 25 | 25 | 25 | 25 | 25 |
| 6 | Dielectric Strength (kV/mm) | 24 kV/mm | 24 kV/mm | 24 kV/mm | 24 kV/mm | 24 kV/mm | 24 kV/mm |
| **7** | **Plasma Gap** | **4 mm** | **4 mm** | **2 mm** | **2 mm** | **1 mm** | **1 mm** |
| 8 | Frequency | 60 Hz | 60 Hz | 60 Hz | 60 Hz | 60 Hz | 60 Hz |
| 9 | Applied Voltage (AC) | 5 kV | 5 kV | 5 kV | 5 kV | 5 kV | 5 kV |
| 10 | Streamer Discharge (arbitrary qualitative scale) | 5 | 1 | 7 | 3 | 8 | 4 |
| 11 | Capacitance (farads) | 1.17E-11 F | 1.95E-10 F | 2.21E-11 F | 3.69E-10 F | 3.98E-11 F | 6.64E-10 F |
| 12 | Impedance | 2.2633E+08 ohm | 1.3580E+07 ohm | 1.1982E+08 ohm | 7.1895E+06 ohm | 6.6573E+07 ohm | 3.9944E+06 ohm |
| 13 | Peak Reduced Electric Field (Td) | 43.82 Td | 43.82 Td | 43.82 Td | 43.82 Td | 43.82 Td | 43.82 Td |
| 14 | Ignition Voltage (arbitrary qualitative scale) | 5 | 5 | 3 | 3 | 2 | 2 |
| 15 | Burning Voltage (arbitrary qualitative scale) | 4 | 4 | 2 | 2 | 1 | 1 |
| 16 | Plasma Volume/Micro-discharge number (arbitrary qualitative scale) | 1 | 16.7 | 3 | 50 | 4 | 66.7 |

METHODS AND APPARATUS FOR DECOMPOSING CONSTITUENT ELEMENTS OF FLUIDS

BACKGROUND

Some embodiments relate to methods and apparatus for generating, dispersing, ejecting, controlling, and/or using free radicals. Some of these embodiments more specifically relate to methods and apparatus for generating ions via atmospheric pressure, low temperature plasma (hereinafter "cold plasma" or "non-equilibrium plasma" or "stable plasma" or "plasma"). Some embodiments generate these ions by affecting or breaking down molecules into their constituent elements (such as for decomposing gases), and/or isolating or otherwise using some or all of the constituent elements, such as in the context of exhaust removal systems for example.

Cold plasma is plasma where the temperatures of the individual constituents are different from each other. Electrons exist at higher temperatures (more than 10,000K) and neutral atoms can exist at room temperature. However, the density of the electrons in cold plasma is very low compared to the density of the neutral atoms. In a laboratory, cold plasmas are generally produced by applying electrical energy to different inert gases. This production can be performed at room temperature and at atmospheric pressure, obviating costly instruments and thereby reducing the overall costs associating with making cold plasma.

On a molecular level, cold plasma is produced by moving accelerated electrons through certain gasses, e.g., helium or air. These electrons impact the atoms and molecules with so much energy that they separate the outermost electrons of the atoms and molecules in the gas, thereby creating a soupy mixture of free electrons and free ions. The gas remains at approximately room temperature because the energy required to separate the electrons from their atoms quickly dissipates, leaving the gas ions cool. The relatively low-density plasma enables controlled ionization of the available gas, which generates little to no detectable sound.

On a practical level, cold plasma is produced based on dielectric-barrier discharge (DBD), which is the electrical discharge between two electrodes separated by an insulating dielectric barrier. DBD has been referred to as silent (inaudible) discharge, ozone production discharge, or partial discharge. In the related art, DBD requires high voltage alternating current ranging from lower radio frequency to microwave frequencies. Plasma is produced by two electrodes with a dielectric layer between the electrodes to limit the current flow in the plasma. The dielectric layer that limits the current controls the rate of ionization of the gas. DBD constitutes a dry method of plasma production that does not generate wastewater or require drying of the material after treatment.

SUMMARY

Creating stable cold plasma can be difficult because it involves balancing numerous factors. For example, changes in voltage, composition of gases entering the system, air flow rate, relative humidity, electrode and insulting layer physiochemical characteristics, introduction of catalysts, synergetic technologies, etc., can impact the production and concentration of the reactive and non-radicalized species, ions, electrons, and ultraviolet photons.

However, the potential advantages of generating stable cold plasma are enormous, because the free electrons and free ions created thereby can be selectively transmitted to impact and break down molecules. In other words, it may be beneficial to use cold plasma in a controlled manor so as to generate, disperse, eject, control, or otherwise use free radicals to selectively impact and break down certain molecules. It may also be beneficial to use free radicals to affect or break down molecules into certain constituent elements, and then isolate or otherwise use some of the constituent elements. Thus, cold plasma can be used in various applications, including but not limited to ozone generation, gas reforming including but not limited to methane and methanol, carbon capture, broad area low-level activation processes, substance creation, etc.

As one example, breaking down molecules of a microorganism (single cell organism) will effectively terminate the organism, thereby operating to sterilize the area in which the microorganism existed, i.e., virus inactivation. In other words, this process can effectively inactivate viruses suspended in air or on surfaces.

Breaking down molecules using cold plasma may also provide environmental benefits, such as by reducing any of the five main greenhouse gases released into the atmosphere. The massive release of these gases into the atmosphere by manufacturing and industrial processes as well as other events is a matter of serious global concern.

For example, 40% of carbon dioxide ($CO_2$) emitted into the atmosphere remains after 100 years, 20% remains after 1,000 years, and 10% remains after 10,000 years. Methane (CH4) persists in the atmosphere for far less time than carbon dioxide (about a decade), but it is more potent in terms of the "greenhouse effect" on the atmosphere. Nitrous oxide (N2O) is a powerful greenhouse gas, with a potency 300× more than that of carbon dioxide on a 100-year time scale, and it remains in the atmosphere, on average, a little more than a century. Fluorinated gases are emitted in smaller quantities than other greenhouse gases (they account for just 2% of artificially made global greenhouse gas emissions), but trap substantially more heat. Water vapor is the most abundant greenhouse gas and changes in its atmospheric concentrations are linked not to human activities directly, but rather to the warming that results from the other greenhouse gases. Carbon dioxide is the most abundant greenhouse gas released by human activities—of all carbon dioxide released in the last 250 years, approximately 40% was released on the last 40 years.

Thus, cold plasma can be used to break down the above greenhouse gases, thereby neutralizing their effect on the environment. As one example, cold plasma can be used to interact with the exhaust or byproducts of the manufacturing and industrial processes that create the greenhouse gases.

As another specific example, it may be beneficial to provide an air purification device using cold plasma, wherein a first electrode is covered with a dielectric layer, and a second electrode is similarly covered with a dielectric layer, and these electrodes/dielectrics are separated from each other by a gap in which cold plasma is generated. These electrode/dielectric layers can be formed into a matrix for scale, and an air inlet and outlet can enable air to contact the cold plasma generated in the gap to obviate viruses, pathogens, mold toxins, etc., that were disposed in the air.

The free radicals generated by cold plasma as discussed above can also be used to breakdown molecules in water and on solid surfaces. This technology may similarly be used to clean and sterilize areas and gases within internal combustion engines (ICE), waste plants, industrial mines, etc., such as by breaking down carbon dioxide into separate carbon and oxygen atoms. In these cases, oxygen would be released, and carbon captured or sequestered.

Embodiments are intended to include or otherwise cover methods and apparatus that release all or some of the oxygen and/or capture all or some of the carbon. Other greenhouse gases can similarly be broken down into their constituent elements, and captured, isolated, or recombined to form less destructive or toxic compounds. However, embodiments are not intended to be limited to carbon gases, and some embodiments are intended to capture and create other substances, in any form including gases, liquids, slurries, solids, etc.

It may be especially beneficial to generate stable cold plasma with high concentrations of Reactive Oxygen Species ("ROS") and Reactive Nitrogen Species ("RNS") that are highly effective at inactivating numerous pathogens in the air, on surfaces, and in water. Additionally, reactive species, ions and electrons are relevant, important, or crucial to decomposing dangerous compounds into non-reactive compounds, chemically inert substances, and basic elements.

Cold plasma can be used on a grand scale as an active filtration system, wherein a fluid (such as air), passes through a large-area plate plasma field where the air is sterilized. An HVAC application may include a number of electrodes, such as for example eleven 20 cm×30 cm electrodes (or alternatively 30 cm×30 cm electrodes), producing 10 plasma generating fields. A singular plasma generator may process a large amount of air (such as 988-1060 cfm), and so some embodiments may use multiple plasma generators (such as combining 6 generators) to process as much fluid as is required, e.g., 5900-6360 cfm. However, as indicated above, any number of electrodes and dielectric layers can be used as well as electrodes and dielectric layers of any sizes, such as 6 cm×9 cm.

It may be beneficial to integrate the plasma generator with AQRSS (Air Quality Risk Surveillance System) technology, which allows for active testing of indoor air quality to further control the plasma generator operation. Some embodiments of the plasma generator may produce small amounts of ozone, and so the system can be configured to automatically cease operations if the output approaches CARB (0.05 ppm) or OSHA (0.1 ppm) standards (predetermined limits). Some of these embodiments may also be configured to measure gas concentrations, such as carbon dioxide, carbon monoxide, particulate matter <2.5 microns (PM 2.5), PM 1.0, Formaldehyde, Volatile Organic Compounds (VOCs), Nitrogen Oxides $(NO_X)_2$, etc.

It may be especially beneficial for the plasma generator to be configured to operate using relatively low power. For example, in some embodiments, each plasma generator operates on less than 60 watts of electrical power, which is the equivalent of a single light bulb.

It may also be beneficial to use the cold plasma, such as the cold plasma discussed above, to create ions from fluid disposed in proximity to a cold plasma generator, and then to eject the ions to a separator. In some of these embodiments, the separator is configured to separate or further redirect the ions based on charge, i.e., negatively charged ions are redirected in one or multiple directions, and the positively charged ions are redirected to another or other multiple different directions that are different from the one or the multiple directions of the negatively charged ions. Thus, some of the above embodiments relate to methods and apparatus for redirecting ions (such as based on their charge) that are generated upon communication with free radicals resulting from atmospheric pressure low temperature plasma.

Some embodiments are therefore directed to a decomposing and collection apparatus for use with a fluid. The apparatus can include an assembly for generating ions via applying atmospheric pressure, low temperature plasma to the fluid and separating the generated ions. The assembly can include multiple plasma generator and separator units that are vertically stacked relative to each other. Each of the multiple plasma generator and separator units can include: a plasma generator for generating the generating atmospheric pressure, low temperature plasma, the plasma generator including a first electrode covered at least in part with a first dielectric layer and a second electrode covered at least in part with a second dielectric layer and disposed such that a predetermined gap separates the first and second dielectric layers, the plasma generator also including a power supply configured to supply electrical power to the first and second electrodes at a predetermined voltage and frequency, such that, based on the predetermined gap between the first and second dielectric layers, atmospheric pressure, low temperature plasma is generated such that positively and negatively ions are ejected from the plasma generator; and a separator disposed to receive the positively and negatively ions ejected from the plasma generator, the separator including: a first separator electrode; a second separator electrode spaced from the first separator electrode; and a separator power supply that supplies electric power in the form of at least one of different voltages and different polarities to the first and second separator electrodes ranging from 0 kV and 10 kV, such that the received positively charged ions are redirected in one direction and the received negatively charged ions are redirected to another direction different from the one direction. The apparatus can also include a collector configured to collect at least one of the redirected positively charged ions and the negatively charged ions.

In some of these embodiments, the collector is configured to collect the redirected positively charged ions.

Some of these embodiments also include a rack that is configured to operate as a housing to hold the vertically stacked multiple plasma generator and separator units.

In some of these embodiments, the rack defines multiple apertures that are configured such that each of the multiple plasma generator and separator units are disposed in one of the multiple apertures.

In some of these embodiments, the rack is configured such that each of the multiple plasma generator and separator units are insertable into and removable from one of the multiple apertures.

In some of these embodiments, each of the multiple plasma generator and separator units includes a hollow case in which one of the plasma generator and separator units is disposed.

In some of these embodiments, the hollow case of each of the multiple plasma generator and separator units is formed of an electrically insulating material to electrically insulate each of the multiple plasma generator and separator units from each other.

In some of these embodiments, the hollow case includes a top that defines apertures.

In some of these embodiments, each of the apertures of the top of the hollow case define a hexagon in cross-section so as to collectively form a honeycomb structure.

Some of these embodiments further include an inlet duct structure configured to facilitate flow of the fluid into each of the multiple plasma generator and separator units, the inlet duct structure being disposed at an inlet side of the rack.

Some of these embodiments further include an outlet duct structure configured to facilitate flow of the separated ions out of each of the multiple plasma generator and separator units, the outlet duct structure being disposed at an outlet side of the rack.

Some of these embodiments further include a UV emitter disposed proximately near the inlet duct structure to facilitate plasma generation.

Some of these embodiments further include an ultrasonic oscillator disposed proximately near the inlet duct structure to facilitate ion separation.

Some of these embodiments further include a tapered collar disposed between the inlet duct and the rack configured to facilitate laminar flow of the fluid entering the vertically stacked multiple plasma generator and separator units.

In some of these embodiments, the fluid is a primary fluid that includes exhaust of an industrial process, and further includes a mixer configured to mix a secondary fluid with the primary fluid prior to entry into each the vertically stacked multiple plasma generator and separator units.

In some of these embodiments, the secondary fluid includes ambient air.

Some of these embodiments further include a heater configured and disposed to heat the secondary fluid prior to entry of the secondary fluid into the mixer.

BRIEF DESCRIPTION OF FIGURES

Each figure describes basic features of various methods and apparatuses for generating and/or dispersing free radicals and for separating ionized molecules. Various exemplary aspects of the systems and methods will be described in detail, with reference to the following figures, wherein:

FIG. 8 is a table of different parameters for a plasma generator embodiment with dielectric layers formed of borosilicate glass.

FIG. 9 is a table of different parameters for a plasma generator embodiment with dielectric layers formed of ceramic.

DETAILED DESCRIPTION

Figure 1:
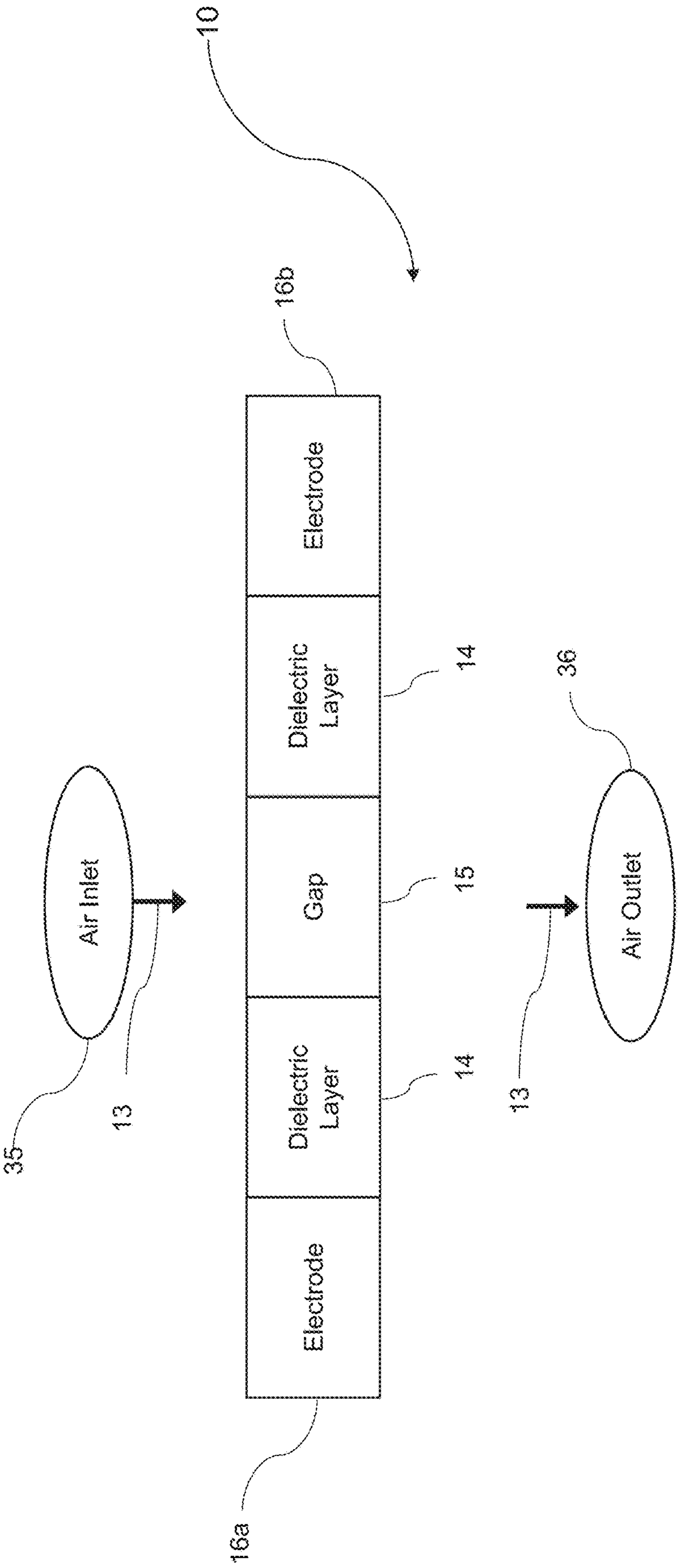
FIG. 1 is a schematic depicting basic features of a plasma generator 10 according to an exemplary embodiment.

The Detailed Description is organized based on the following headings.

I. Definitions
II. Plasma Generator
  A. Applications
  B. Overview of the Plasma Generator
  C. Variations of Embodiments
  D. Detailed Explanation
  E. Decreased Ozone Production
III. Sterilization System
IV. Gas Decomposition System
  A. Applications
  B. Detailed Explanation
    1. Plasma Generator
    2. Separation Unit
  C. Variations of Embodiments
    1. Exemplary Embodiment 1
    2. Circuit for Exemplary Embodiment 1
    3. Exemplary Embodiment 2
    4. Circuit for Exemplary Embodiment 2

5. Exemplary Embodiment 3
6. Exemplary Embodiment 4
V. High Volume Fluid Decomposition System
A. Applications
B. Detailed Explanation
1. Plasma Generator
2. Separation Unit
a. Overview
b. Separation Electrodes
c. Fluid Separator ("Partition")
3. Control Circuit
4. Collection Apparatus
5. Catalysts

I. Definitions

It will be understood that, when an element is referred to as being "connected", or "coupled" to another element, it can be directly connected or coupled to the other element or intervening elements that may be present. In contrast, when an element is referred to as being "directly connected" or "directly coupled" to another element, there are no intervening elements present. As used herein "and/or" includes any and all combinations of one or more of the associated listing items. Further, it will be understood that when an element is "presented" to an entity, it can be presented electronically to the entity through multiple intermediaries or elements of the system. In addition, it will also be understood that when an element is referred to as being "directly presented" to an entity, it is presented electronically through only one intermediary or element of the system. In addition, it will be understood that when an element is presented or directly presented to an entity the presentation may take place on an electronic screen separate from any or all previous electronic screens.

It will also be understood that, although the terms "first", "second", etc. may be used herein to describe various elements or components, these elements or components should not be limited by these terms. These terms are only used to distinguish one element or component from another element or component. Thus, a first element or component discussed below may be termed a second element or component without departing from the teachings of exemplary embodiments. Further it will be understood that the use of "then", when used to describe connecting two steps of a logical process, indicates that the steps may occur sequentially, but does not preclude the addition of intermediary steps or elimination of one of the steps without departing from the teachings of exemplary embodiments.

Exemplary embodiments are described herein with reference to logical process illustrations that are schematic illustrations of idealized embodiments (and intermediate structures) of exemplary embodiments. As such, variations from the sequence of the illustrations as a result, for exemplary, of inclusion of intermediary steps, are to be expected. Thus, exemplary embodiments should not be construed as limited to the particular sequence of logical steps illustrated herein but are to include deviations in the sequence of the steps, for exemplary, from communication of electronic information to remote databases. Thus, the logical steps illustrated in the figures are schematic in nature and their sequence is not intended to limit to scope of exemplary embodiments.

The terminology used herein is for the purpose of describing particular embodiments only and is not intended to be limiting of exemplary embodiments. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that all terms, such as those defined in commonly used dictionaries, should be interpreted as having a meaning that is consistent with their meaning in the context of the relevant art and will not be interpreted in an idealized or overly formal sense unless expressly so defined herein. As used herein, expressions such as "at least one of", when preceding a list of elements, modify the entire list of elements and do not modify the individual elements of the list.

Various electrical or electronic elements of the disclosed embodiments, including but not limited to the power supply and control circuitry, are intended to include or otherwise cover all processors, software or computer programs capable of performing the various disclosed determinations, calculations, etc., for the disclosed purposes. For example, exemplary embodiments are intended to cover all software or computer programs capable of enabling processors to implement the disclosed processes. In other words, exemplary embodiments are intended to cover all systems and processes that configure a document operating system to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages. Some of these and other embodiments utilize a Bluetooth network.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Central database systems may include a network server for communicating with the various remote computer systems. Communication to the network may be over the Internet, other networks, telephone, or other suitable means. The central database systems further include a central database and database server for storing and retrieving information. The network server can be operated by software that allows communication with the remote computer systems and transfers information to and from the database server for maintenance of the database and for providing patient specific information.

Reference will now be made in detail to embodiments, examples of which are illustrated in the accompanying schematics, wherein like reference numerals refer to the like elements throughout. In this regard, the present embodiments may have different forms and should not be construed as being limited to the descriptions set forth herein. Accordingly, the embodiments are merely described below, by referring to the figures, to explain exemplary embodiments of the present description. It is also important to note that various elements and features may be used interchangeably among the different disclosed embodiments, and so the various elements and features may be combined to achieve new embodiments.

II. Plasma Generator

Embodiments are intended to include or otherwise cover a variety of structures and processes for generating cold plasma for any possible advantageous use, e.g., so that the free electrons and free ions created thereby can be selectively transmitted to impact and break down molecules. Some of the disclosed plasma generator embodiments constitute large-area multi-layer dielectric barrier plasma discharge units or “plasma generators” or “reactors”; however, other embodiments can cover other types of units.

Some of the generated plasmas as disclosed herein are atmospheric pressure, low temperature plasma (hereinafter “cold plasma” or “non-equilibrium plasma” or “stable plasma” or “plasma”). However, embodiments are intended to include or otherwise cover other types of plasmas that may be beneficial.

Some of the disclosed plasma generators include a first electrode covered (e.g., in part) with a dielectric layer, and a second electrode similarly covered (e.g., in part) with a dielectric layer, wherein these electrodes/dielectrics are separated from each other by a gap in which cold plasma is generated. However, embodiments are intended to cover or otherwise include other structures for generating the cold plasma, such as including but not limited to only one of the electrodes being covered (e.g., in part) with a dielectric layer, or alternatively multiple dielectric layers being disposed between a pair of electrodes. Moreover, some embodiments can include multiple plasma generators “stacked” on top of one another.

In some of these embodiments, stable cold plasma is generated based on the following factors: 1) height of gap separating the electrodes/dielectrics; 2) voltage of AC electrical power supplied to the electrodes; and 3) frequency of electrical power supplied to the electrodes. However, other factors can affect the stable cold plasma generation of some embodiments, including the materials from which the electrodes and dielectric layers are formed, the relative permittivity and strength of the dielectric layer, etc. For example, in order to generate stable cold plasma, the output voltage can be controlled based on certain structural parameters of the plasma generator, such as the vertical distance separating the electrodes, the materials from which the electrodes are formed, the plane size and thickness of the electrodes, etc.

In addition, embodiments are intended to cover or otherwise include any combination of the above factors that achieves the generation of stable cold plasma, including but not limited to the exemplary ranges specifically disclosed herein. Still further, embodiments are intended to include or otherwise cover any methods, processes, or structures for supplying, varying or otherwise modifying the electrical power to the electrodes having appropriate voltages and frequencies for generating the stable cold plasma.

A few exemplary plasma generator embodiments are disclosed below, however as indicated above, embodiments are intended to cover many different variances in structure and function from the specific elements and processes disclosed below.

A. Applications

Embodiments are intended to cover various structures of plasma generators for creating or otherwise generating free electrons and free ions, such as to selectively transmit the generated free electrons and free ions to impact and break down molecules for any useful purpose. Embodiments are also intended to be configured for use with any advantageous or otherwise beneficial applications of the stable cold plasma and the free electrons and free ions generated thereby. For example, embodiments are intended to include or otherwise cover any advantageous or otherwise beneficial application of using the generated free electrons and free ions to break down or otherwise modify molecules.

For example, embodiments can be used in various contexts related to disinfection, including viral inactivation. This usage may be especially poignant based on the fact that droplet transmission is associated with the spread of coronavirus and similar pathogens including other viruses, pathogenic bacteria, mold, poisons, gases, mycotoxins (aerosol infection) constitute one of the main routes of infection. Thus, it may be beneficial to structure or otherwise use the plasma generator embodiments disclosed herein to contact air that may include such pathogens and thereby sterilize the air to reduce, minimize, or prevent the transmission and spread of the pathogens.

Embodiments are intended to include or otherwise cover any structures or processes that enable or otherwise adapt the disclosed plasma generators for such sterilization usages. For example, the disclosed plasma generators can be adapted to operate in conjunction with equipment configured to supply air to the generated plasma, and then to export the sterilized air back into the environment in which the air was originally obtained.

For some of these embodiments that operate as air sterilizers, additional structures may be provided for enhanced sterilization, such as apparatus for increasing turbulence of air upon entering an inlet into the gap in which the cold plasma is generated. The increased turbulence increases the contact rate of the air with the electrons and ions to enhance sterilization.

A number of electrodes for generating cold plasma can be arranged into a matrix to scale the sterilization process. In other words, a plurality of plasma generating units (each of which can be planar), can be stacked and otherwise provided to ensure that collected ambient air is efficiently mixed with the plasma to enhance sterilization.

However, embodiments are intended to cover or otherwise include any other useful application of creating or otherwise generating free electrons and free ions, including but not limited to selectively transmit the generated free electrons and free ions to impact and break down molecules.

For example, some embodiments are directed to breaking down greenhouse gases in any possible context, such as in the exhaust of industrial and manufacturing facilities (e.g., coal plants, cement manufacturing, etc.), internal combustion engine operations (e.g., automobiles), etc. Still other embodiments are directed to breaking down molecules via a liquid, including water-based liquids, such as in the contexts of waste-water treatment, using water to sterilize various things including but not limited to cloths, farm animals, etc. Other embodiments are directed to still other applications, such as sterilizing currency.

B. Overview of the Plasma Generator

FIG. 1 is a schematic depicting basic features of a plasma generator 10 according to an exemplary embodiment wherein the various elements are schematically shown in the context of their relative positioning. As shown in FIG. 1, the plasma generator 10 includes a pair of electrodes 16*a*, 16*b* at opposing sides of the plasma generator 10.

In some of the disclosed embodiments, the electrodes 16*a*, 16*b* are each planar (flat) conductive metal plates. However, embodiments are intended to include or otherwise cover any type (including any material, shape, size, etc.) of electrical conductor that is usable to make contact with a metallic part of a circuit configured to generate stable cold plasma. For example, in some embodiments, the electrodes 16*a*, 16*b* are solid metal while in other embodiments the electrodes 16*a*, 16*b* are formed as a mesh that defines gaps therewithin. Also, it is intended that the electrodes 16*a*, 16*b* can be formed of any related art, known, or later developed material that operates as a similar electrical conductor suitable for the purpose of generating stable cold plasma. In some embodiments, the electrodes 16*a*, 16*b* may be mirror-polished metal, including stainless steel.

In some embodiments, the electrode is the circuit element that allows current to pass through its volume to its surface of the electrode. The electrons stay confined to the surface and cannot exit due to the dielectric material directly opposite the incoming current. Similarly, the electrons are allowed to pass from the surface of the electrode through its volume, without any electrons passing through the dielectric material to the electrode surface opposite an outgoing current in other words, the electrons can pass freely through the volume of the electrodes, but are unable to pass through (or are otherwise impeded from passing through) the volume of the dielectric material when the applied voltage is less than the dielectric strength of the dielectric material.

In some embodiments, the electrodes 16*a*, 16*b* have the same structure, size, and shape. For example, both electrodes can be formed into the same or substantially the same size and planar shape, where each defines a rectangle, square, etc., in top plan view. However, in other embodiments, the electrodes 16*a*, 16*b* can have different shapes and sizes, and can be formed of different materials.

As shown in FIG. 1, a pair of dielectric layers 14 is disposed between both electrodes 16*a*, 16*b*. However, in some embodiments, only one dielectric layer 14 is disposed between the electrodes 16*a*, 16*b*. Also in some embodiments, each dielectric layer 14 is adhered onto one, or both, of the electrodes 16*a*, 16*b*. In some embodiments, each dielectric layer 14 is disposed directly on one of the electrodes 16*a*, 16*b*, such as in cases where the dielectric layer 14 is adhered or otherwise integrally formed onto the electrode 16*a*, 16*b*.

However, in some other embodiments, each dielectric layer 14 can be separated from the nearest electrode 16*a*, 16*b*, such as where an empty gap extends therebetween or alternatively where another element extends therebetween. More specifically, an adhesive material may be provided to separate the electrode 16*a*, 16*b* from the dielectric layer 14. In other words, embodiments are not limited to structures where all of the dielectric layers are necessarily in direct contact with electrodes, and some embodiments may even cover structures where other elements are disposed between electrodes and dielectric layers.

Embodiments are intended to include or otherwise cover the dielectric layer(s) 14 as constituting any electrical insulator that can be polarized by an applied electric field, such that if the dielectric material is placed in an electric field, then electric charges do not flow through the material as they do in an electrical conductor (in this case the electrodes 16*a*, 16*b*), so as to thereby be usable with the other elements of the plasma generator 10 to generate stable cold plasma.

More specifically, the dielectric layer(s) 14 are envisioned to be formed of any related art, known, or later developed material without (or with reduced) loosely bound (or free) electrons that may not drift through the material, and that instead shift (slightly), from their average equilibrium positions, causing dielectric polarization. Because of this dielectric polarization, positive charges are displaced in the direction of the field and negative charges shift in the direction opposite to the field (for example, if the field is moving parallel to the positive x axis, the negative charges will shift in the negative x direction, so as to create an internal electric field that reduces the overall field within the dielectric itself. In embodiments where the dielectric is composed of weakly bonded molecules, those molecules not only become polarized, but also reorient so that their symmetry axes align to the field.

In some embodiments, the dielectric layers 14 have the same structure, size, and shape. For example, both dielectric layers 14 can be formed into the same or substantially the same size and planar shape, where each defines a rectangle or square in top plan view. However, in other embodiments, the dielectric layers 14 can have different shapes and sizes and can be formed of different materials.

In some embodiments, there can be one or two dielectric layers between each pair of electrodes, yielding beneficial results when there are two dielectric layers between each pair of electrodes. The number of electrodes can also vary, wherein the horizontally aligned electrodes are adhered to and stacked vertically with dielectric layers and fluid gaps between every stacked electrode such that first and second electrodes serve as top and bottom electrodes to adjoin one plasma gap (hereinafter "plasma gap" or "gap") in a stack of electrodes and dielectric layers to create multiple plasma gaps.

Embodiments are intended to include or otherwise cover any number of electrodes. In some embodiments, the number of electrodes can be configured to be between two and fifty-one, where the number of gaps between electrodes can be between one and fifty, yielding beneficial results with the number of fluid gaps between five and twenty, and still further at ten. However, embodiments are intended to include or otherwise cover any number of electrodes and/or gaps. However, as indicated above, some embodiments can include more than fifty-one electrodes.

As shown in FIG. 1, a gap 15 is defined between the dielectric layers 14. In some embodiments, the range of the gap 15 between the dielectric layers is approximately 1.5 mm to approximately 3.0 mm. In some of these embodiments, the gap 15 between the dielectric layers is approximately 1.75 mm to approximately 2.25 mm. In some of these embodiments, the gap 15 between the dielectric layers is approximately 2.0. However, embodiments are intended to include or otherwise cover gaps of any width or height applicable for any conceivable application, material, etc.

Electrical power at a predetermined AC voltage and frequency can be applied to the first and second electrodes 16*a*, 16*b*, such that, based also on the height of the gap 15 and other factors, stable cold plasma is generated within the gap 15. Other factors that affect the generation of cold plasma within the gap 15 include (but are not necessarily limited to) material from which the electrodes 16*a*. 16*b* are formed, plane size and thickness of the electrodes 16*a*, 16*b*, aspects of the dielectric layer 14, etc. Thus, in some embodiments, in order to generate stable cold plasma, the output voltage needs to be controlled based on certain structural parameters of the plasma generator 10, such as distance between electrodes 16*a*, 16*b* (i.e., gap 15), the material from which the electrodes 16*a*, 16*b* are formed, the plane size and thickness of the electrodes 16*a*, 16*b*, aspects of the dielectric layer 14, etc.

In other words, stable cold plasma can be generated within the gap 15 based on at least the following factors: 1) height of gap 15 separating the electrodes/dielectrics; 2) voltage of AC electrical power supplied to the electrodes 16*a*, 16*b;* 3) frequency of electrical power supplied to the electrodes 16*a*, 16*b;* 4) structural characteristics of the plasma generator 10 including but not limited to the above structural factors; 5) dielectric constant (permittivity) of the dielectric material; 6) thickness of the dielectric material; and/or 7) composition of the fluid in the plasma gap. Some embodiments use or otherwise incorporate semiconductors (in lieu of transformers), e.g., silicon carbide high voltage chip, such as a chip capable of generating 3 kV of plasma).

FIG. 1 also shows an airflow path 13 that enables air to flow from an air inlet 35, into the gap 15 and thus in contact with the free electrons and free ions generated by the cold plasma, and then out of an air outlet 36. Molecules that come into contact with the free electrons and free ions of the cold plasma are thereby broken down or otherwise altered.

Multiple plasma generators 10 that have the same or similar structures to those discussed above can be provided to scale the amount of cold plasma generated. In some of these embodiments, the layers of electrodes 16*a*, 16*b* and dielectrics 14 can be stacked so as to result in a vertically aligned structure, wherein a separate gap 15 separates each layer of an electrode 16*a*, 16*b* laminated with a dielectric layer 14.

Some of the embodiments create stable cold plasma by focusing on various parameters, calculations, and the application. For example, some embodiments are directed to a multi-layered dielectric barrier plasma discharge generator with a gap of approximately 2 mm. Some of these embodiments are equipped to sterilize and decompose large volumes of atmospheric, indoor air and greenhouse gas emissions. The materials and parameters of elements of the generator of these embodiments may change depending on the composition of the fluid (i.e., gas) entering the plasma field.

Some embodiments of the plasma generator 10 for indoor air sterilization require less voltage than other embodiments that are applied for greenhouse Fluid Decomposition. In general, the composition of atmospheric/indoor air is 78% Nitrogen, 21% Oxygen, 0.93% Argon, and 0.04% Carbon Dioxide—the remainder being trace amounts. To create sufficient stable plasma to sterilize indoor air, some embodiments of the plasma generator 10 produce a minimum voltage, ranging from 3 kV-7.5 kV, based on bond energies and electron Volts required to separate Hydrogen-Oxygen bonds (1.23 eV), reforming into hydroxyl radicals (OH), hydrogen peroxide (H2O2), as well as sufficient energy to eradicate specific pathogens (i.e., viruses, bacteria, fungi, etc.). In the context of carbon decomposition, the voltage may be increased to allow the electrons to separate carbon oxygen bonds (5.45 eV) in carbon dioxide molecules.

In some of these embodiments, once the voltage range is established, the capacitance requirements of the plasma generator can be calculated. Some embodiments for indoor air sterilization are designed with a 2 mm plasma gap, 2 mm dielectric layer 14 with a minimum relative permittivity of 4. Some of these embodiments use borosilicate glass as the insulating layer, which includes a relative permittivity of 4.7 at 60 Hz and minimum dielectric strength of 30 kV/mm (to ensure there is no or reduced dielectric breakdown).

In some embodiments, the borosilicate glass can be treated to resist higher temperatures. For example, the borosilicate glass can be treated to become tempex glass that can resist temperatures above 500 degrees Celsius.

In some of these embodiments, once the voltage range is established, the capacitance requirements of the plasma generator can be calculated. Some embodiments for indoor air sterilization are designed with a 2 mm plasma gap, 2 mm dielectric layer 14 with a minimum relative permittivity of 25. Some of these embodiments use ceramic as the insulating layer, which includes a relative permittivity of 25 at 60 Hz and minimum dielectric strength of 24 kV/mm (to ensure there is no or reduced dielectric breakdown).

Some embodiments use a 6 cm×9 cm electrode 16*a*, 16*b* formed of aluminum, with a total area of 54 $cm^2$ per electrode. Other embodiments use a 30 cm×30 cm electrode 16*a*, 16*b* formed of aluminum or other conductive material thereby providing a total area of 900 $cm^2$ per electrode. Total separation distance between electrodes 16*a*, 16*b* for some of these embodiments is 6 mm. Once standards are established, the electrical components necessary to convert inputted DC 12 V to the required AC 3 kV-7.5 kV can be determined. Based on the air flow requirements calculated using streamer discharge, length and width of electrode 16*a*, 16*b* and the plasma Gap 15, additional Plasma Gaps 15 can be added while maintaining the same voltage requirements. At such time that stable plasma is no longer generated due to the cumulative area (cm2) of the electrode 16*a*, 16*b* exceed the applied voltage, revisions can be made to the voltage, dielectric layers, and plasma Gap 15 parameters.

All of the embodiments are intended to cover applications where any fluid is disposed in the Gap 15. For example, the fluid in the gap can be “atmospheric air” (such as in the context of the tables of FIG. 8 and FIG. 9, any other gas or gaseous material (including but not limited to products and byproducts of industrial or commercial processes, etc.), any fluid in liquid form, any slurry, etc. In fact, the fluid is not even limited to the before-mentioned fluids and is intended to cover any substance disposed in the Gap 15.

C. Variations of Embodiments

Embodiments are intended to include or otherwise cover any methods and apparatus for creating stable cold plasma. Some of these embodiments are directed to generating stable cold plasma under atmospheric conditions where ambient fluid and small biological particles enter and interact with the plasma. In some of these embodiments, some or all of the small biological particles are sterilized by interaction with the stable cold plasma. However, other embodiments generate stable cold plasma for interaction with other fluids, such as fluids that include various gas species and concentrations.

Some embodiments include or otherwise cover relatively small electrode plates (such as, for example, electrode plates that are defined by a width of 6 cm and length of 9 cm), where a first electrode may have a dielectric layer that is formed of insulating material, such as glass, on its bottom surface. A second electrode plate of approximately the same size as the first electrode plate (in some embodiments 6 cm×9 cm) may also have a dielectric layer on its top side formed of the same dielectric material as the dielectric layer of the first electrode. The stacking configurations of some of these embodiments may define a constant 6 mm separation between the first and second electrode plates.

In some of these embodiments, this 6 mm separation includes the two dielectric layers and a gap in which stable cold plasma is generated. In some of these embodiments that include the 6 mm separation between electrodes, the dielectric layer may be 2 mm thick on each electrode plate, resulting in a 2 mm gap in which plasma is generated. In some of these embodiments, the stable cold plasma is generated upon AC 5 kV being applied to the electrodes at 60 Hz.

Some other embodiments include or otherwise cover relatively large electrode plates (such as, for example, electrode plates that are defined by a width of 30 cm and length of 30 cm) in the same or similar configurations as described above regarding the relatively smaller (e.g., 6 cm×9 cm) electrode plates. Some of these embodiments that include relatively larger electrodes may be especially beneficial because they may generate a relatively larger volume of stable cold plasma and enable a relatively larger volume of fluid to flow through the gap.

More specifically, embodiments that also include a constant 6 mm separation between the first and second electrodes, where the thickness of each dielectric layer is 2 mm and the plasma gap is 2 mm, enable a relatively increased volume of plasma generated in the gap between the dielectric layers as well as a relatively increased volume of fluid flowing through the plasma gap. In these embodiments, relatively larger electrode plates may be beneficial because they increase the capacitance of the system, yet the applied voltage and frequency will remain the same as that used for relatively small plate configurations.

In some of these and other embodiments, the dielectric layer thickness may be less than 2 mm. For example, if the dielectric layers of these embodiments has a thickness of 1 mm or 1.5 mm, then the plasma gap will increase, assuming a fixed separation between electrode. In other words, the distance between the electrodes will remain the same but the gap size may differ if the dielectric material thickness changes, creating a bigger or smaller gap where plasma is generated. In some of these embodiments, this increased gap may cause a slight increase in capacitance, and the burning voltage may also increase due to a smaller dependence on the surface electron emission properties of the dielectric layer on both the first and second electrode plates. In some of these embodiments, these combined effects may cause the total amount of plasma generated through an AC cycle, as well as the volume of the plasma at any one time, to both decrease.

In some embodiments, if the plasma gap decreases due to a relatively thicker dielectric layer within the 6 mm separation between the first and second electrode plates (or for some other structural reason), then the capacitance and the burning voltage may decrease. In some of these embodiments, these effects may combine to allow for the total amount of plasma generated through an AC cycle as well as the volume of the plasma at any one time to both increase. These qualitative changes may be constant between different embodiments, such as the relatively small electrode plate configurations (e.g., 6 cm×9 cm) and the relatively large electrode plate configurations (e.g., 30 cm×30 cm). However, it is important to note that embodiments are not limited to these electrode plate sizes, and embodiments are intended to include or otherwise electrode plates of any size and shape that is usable to generate or help generate stable cold plasma.

In some embodiments, changes in relative permittivity, dielectric strength, and/or surface charge properties occurs if the insulating material of the dielectric layer changes, for example from glass to ceramic. This change may after the capacitance of the system, the production rates of each chemical species in the plasma, and in some embodiments force a change to the applied voltage. However, in some of these embodiments, the frequency and gap size between each electrode plate, such as at an electrode separation of 6 mm, will remain constant. These changes are constant between relatively small electrode plate configurations (e.g., 6 cm×9 cm) and relatively large electrode plate configurations (e.g., 30 cm×30 cm).

In some embodiments, small electrode plates (e.g., 6 cm×9 cm) may be configured within larger (e.g., 12 cm×15 cm) plates that are made of the same material as the dielectric layer material. In some embodiments, large electrode plates (e.g., 30 cm×30 cm) may be configured within larger plates (e.g., 50 cm×50 cm) that are made of the same material as the dielectric layer material. Embodiments with these configurations include larger creepage areas as per Japanese, US, European, or other standards.

D. Detailed Explanation

The plasma generator 10 of FIG. 1 is disclosed above at a high level and will be discussed in much more detail below.

Figure 2:
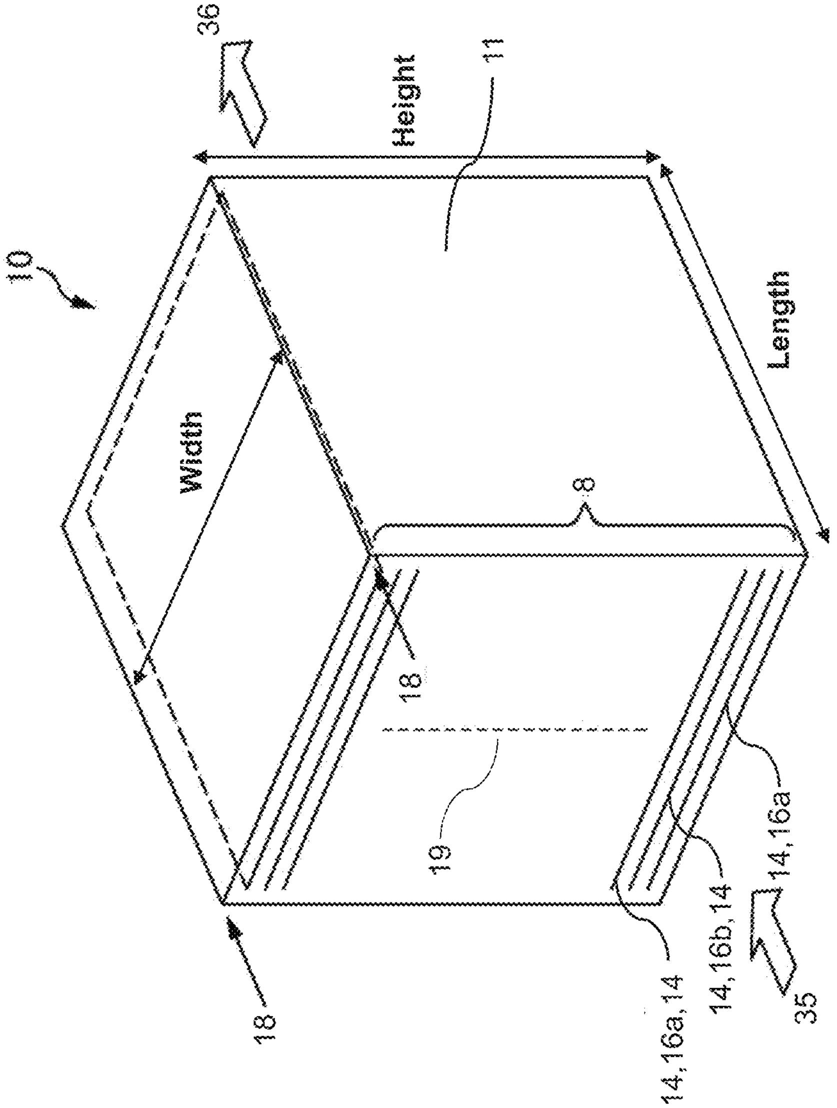
FIG. 2 is a perspective view of the plasma generator 10 of FIG. 1.

FIG. 2 is a perspective view of the plasma generator 10 of FIG. 1. FIG. 2 specially shows an exterior housing 11 of the plasma generator 10 that houses multiple stacked electrodes 16*a*, 16*b*, which are each laminated with a dielectric layer 14, and then vertically separated by gaps 15 from other electrodes 16*a*, 16*b* laminated with dielectric layers 14.

These stacked layers extend vertically to a height 8 of the housing 11. Thus, the plasma generator 10 of FIG. 2 is formed in a rectangular parallelepiped shape having a rectangular plane as a whole.

As specifically shown in FIG. 2, each horizontal line represents an electrode 16*a*, 16*b*, which is laminated with either one or two dielectric layers 14. For example, the bottom horizontal line constitutes an electrode 16*a* laminated on its top surface with a dielectric layer 14, but not its bottom surface because it constitutes the lowermost layer. Similarly, the top horizontal line constitutes an electrode 16*a* laminated on its bottom surface with a dielectric layer 14, but not its top surface because it constitutes the topmost layer. However, the horizontal lines representing the layers in the middle, including the second lowermost layer, include an electrode 16*b* with both the top and bottom surfaces that are each laminated with a dielectric layer 14. Dashed line 19 in FIG. 2 represents multiple such layers extending vertically along the height 8 of the housing 11 in a vertically disposed central area of the housing 11. Each of the dielectric layers 14 are separated by a gap 15 such that many such gaps 15 are defined within the plasma generator 10.

An air inlet 35 enables air to enter a front end of the multiple stacked gaps 15, wherein plasma is generated if electrical power is applied to the electrodes 16*a*, 16*b*. Air is taken in from the front side of the plasma generator 10, passes through a plurality of flow paths defined by the gaps 15, and is exhausted from the rear of the plasma generator 10. In other words, each of the gaps 15 constitute air passages formed in the plasma generator 10, which in the embodiment of FIG. 2 is defined as a flat slit-shaped open area.

Stable cold plasma is generated within those gaps 15 so that the air contacts or otherwise communicates with the free ions and free electrons generated by the cold plasma, thereby causing molecules in the air to break down or otherwise be altered. Air with the broken down or altered molecules then exits the plasma generator 10 at the air outlet 36.

Figure 3:
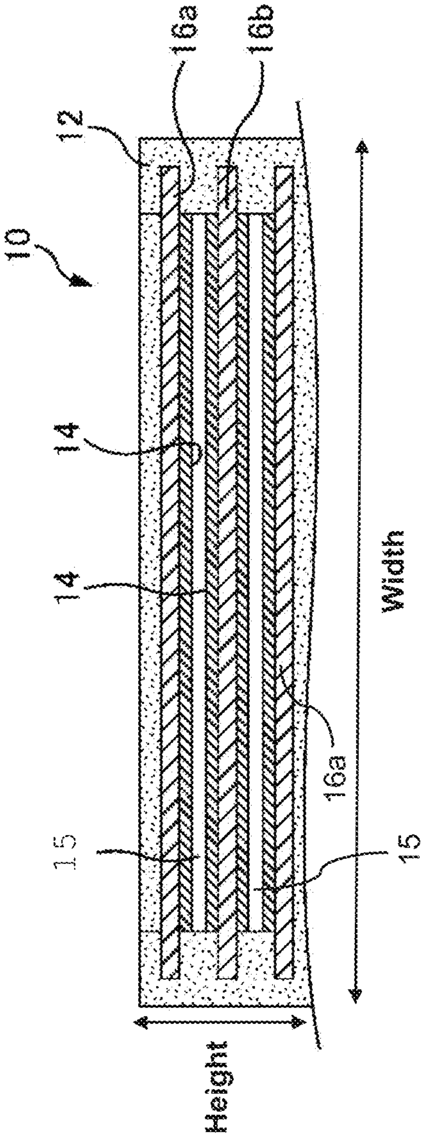
FIG. 3 is a partial cross-sectional view of the plasma generator 10 of FIG. 2.

FIG. 3 is a partial cross-sectional view of the plasma generator 10 of FIG. 2, which shows three such electrode/dielectric layers with two separate gaps 15 defined therebetween. As shown in FIG. 3, the top layer includes an electrode 16*a* that is laminated with a dielectric layer 14 on its bottom surface, which is then separated by a gap 15 from the adjacent layer disposed immediately there below, which itself includes an electrode 16*b* that is laminated by dielectric layers 14 on both its top and bottom surfaces.

The FIG. 3 embodiment shows the middle electrode 16*b* separated from each of its neighboring electrodes 16*a* (above and below) by two separate dielectric layers 14. In particular, a dielectric layer 14 is provided on both of its top and bottom surfaces, and a separate dielectric layer 14 on each of the neighboring electrodes 16*a*. However, embodiments are intended to cover structures where neighboring electrodes 16*a*, 16*b* are only separated by a single dielectric layer 14.

The electrodes 16*a*, 16*b* (with their attached dielectric layers 14) are held in place by a spacer 12 disposed at opposite width-wise ends. The spacer 12 holds the electrodes 16*a*, 16*b* in place so as to define the gaps 15, each extending vertically to a predetermined distance, between the dielectric layers 14. As shown in FIG. 3, the spacer 12 extends above, below, and to the side ends of each of the electrodes 16*a*, 16*b*, wherein the side ends are cantilevered beyond the dielectric layers 14 in the width-wise direction. The spacer 12 can also be disposed above the top and below the bottom of the stacks of electrodes/dielectric layers to further hold the structure together.

The spacer 12 can be formed of a single contiguous or unitary element, or alternatively can be formed by multiple elements. The spacer 12 is formed of an insulating material, similar or including (but not limited to) the materials from which the dielectric layer 14 are formed, and is intended to include any related art, currently known, or later developed material(s). The spacer 12 can be adhered to the dielectric layer 14 for the electrodes 16*a*, 16*b*.

Figure 4:
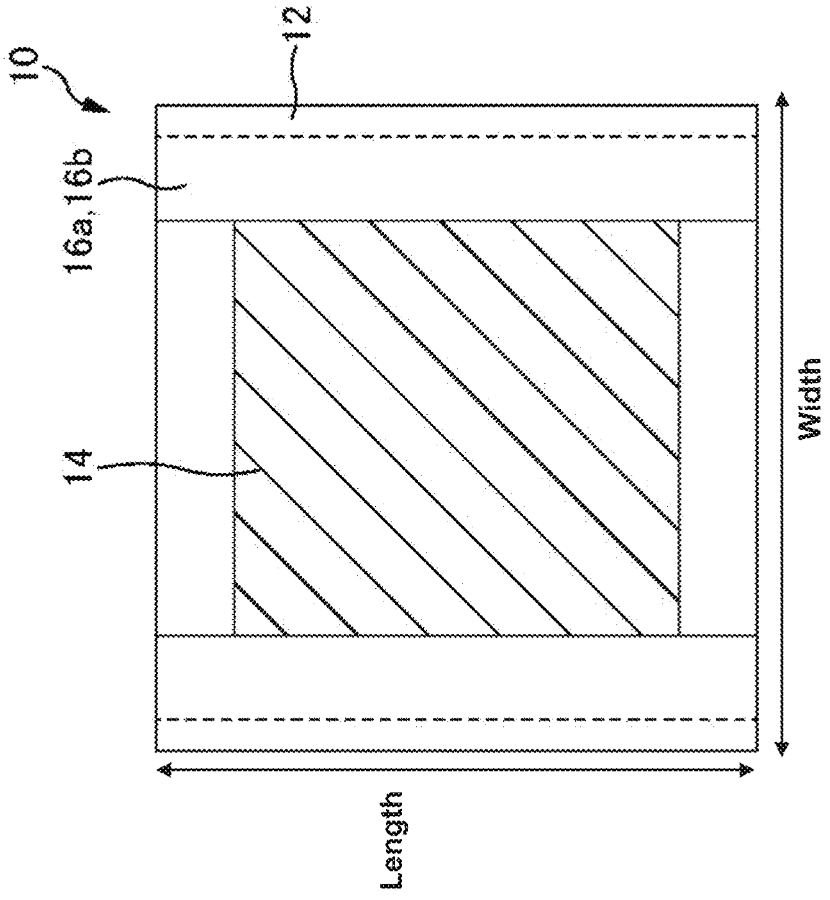
FIG. 4 is a top plan view of the plasma generator 10 of FIG. 2.

FIG. 4 is a top plan view of the plasma generator 10 of FIG. 2. As shown in FIG. 4, the spacer 12 is disposed at certain locations around the perimeter of the electrodes 16*a*, 16*b*, thereby holding them in place while also constituting an insulator. FIG. 4 specifically shows the spacer 12 extending around the sides of the electrodes 16*a*, 16*b*. Also as shown in FIG. 4, the dielectric layers 14 do extend as far as the electrodes 16*a*, 16*b* in the widthwise direction, such that the face of each of the side ends of the dielectric layers 14 abuts the spacer 12.

In the embodiments of FIGS. 1-4, each of the electrodes 16*a*, 16*b* can be a metal or mesh plate in the shape of a thin sheet that is rectangular or square in top and bottom plan views, wherein the top and bottom surfaces are flat or planar. However, the electrodes 16*a*, 16*b* can be formed into any shape that may be beneficial for the application at issue. Thus, the width and length of each electrode 16*a*, 16*b* is each longer than its height. In some of these embodiments, the electrodes 16*a*, 16*b* are formed of an aluminum plate, but may be formed of any other suitable conductive related art, known, or later developed material, including but not limited to stainless-steel plate, silver, gold, magnesium alloy, etc.

Embodiments are intended to cover electrodes 16*a*, 16*b* of any size depending on application. It is beneficial to avoid bending of the electrodes 16*a*, 16*b*, such as that may result from widthwise interior section extend into the adjacent gap 15, which may occur based on mass and gravity and become particularly acute as the length of the electrode 16*a*, 16*b* Increases. The size (including length) of the electrodes 16*a*, 16*b* can be increased by using stronger materials that resist such bending.

In the embodiments of FIGS. 1-4, each electrode is laminated, at least in part, with a dielectric layer 14 that is formed of a solid insulating resin, such as borosilicate glass, fiberglass, aluminum oxide, ceramics, Pantex glass, polyimide film, etc., allowing for high breakdown voltage. A creepage distance is located around each electrode 16*a*, 16*b*, allowing for high voltage to run through it. The size of the creepage distance as shown on FIG. 4 is based on industrial standards, such as those in the United States, Europe, or Japan.

In the embodiments of FIGS. 1-4, the dielectric layers 14 (insulating layers), at least in part, can be formed as a layer of glass, such as from the materials disclosed above or other materials. The dielectric insulating layer 14 operates to stabilize the plasma generated within the gap 15, and can include various other materials, such as quartz, ceramics, enamel, or similar materials. The thickness of each dielectric layer 14 can affect the stable cold plasma generation and so can fluctuate. For some embodiments, the thickness of each dielectric layer 14 produces a 2 mm gap 15 between adjacent dielectric layers 14.

In the embodiments of FIGS. 1-4, the dielectric layers 14 are provided on the surfaces of opposing electrodes 16*a*, 16*b*, and the dielectric layers 14 are supported so as to be parallel to each other while being separated by spacers 12. The size of the spacers 12 (which operate as spacing members) is determined by the thickness of electrodes 16*a* and 16*b*, dielectric layers 14, and gap 15. The spacers 12 can be formed from any electrically insulating resin material, such as glass (similar to that used for the dielectric layers 14 as described above).

As discussed above, stable cold plasma can be generated within the gap 15 based on the following factors: 1) height of gap 15 separating the electrodes/dielectrics; 2) voltage of AC electrical power supplied to the electrodes 16*a*, 16*b;* 3) frequency of electrical power supplied to the electrodes 16*a*, 16*b*; and/or 4) structural characteristics of the plasma generator 10. Some of these structural factors that impact creating stable cold plasma include aspects of the dielectric layers 14, such as break voltage, i.e., the dielectric strength or kV per mm, and the relative permittivity. In some embodiments, creating stable cold plasma is enhanced by providing for a higher relative permittivity.

In the embodiments of FIGS. 1-4, the height of each gap 15 is set to be approximately 2 mm, and the thicknesses or height of each of the electrodes 16*a*, 16*b* is set to be approximately 2 mm. As schematically shown in FIG. 2, an appropriate number of gaps 15 (for example, about 30-40 layers) are provided in the height direction (height 8) of the plasma generator 10. However, any number of layers can be provided depending on the capacity required.

In some of the embodiments of the structures shown in FIGS. 1-4, the width of each gap 15 can be 100 mm-400 mm (10 cm-40 cm). However, it is especially beneficial for a width of the gap 15 to be 250 mm-350 mm (25 cm-35 cm), and still better if the width of the gap 15 is approximately 300 mm (30 cm). However, in other embodiments, the width of the gap 15 can be reduced to 30 mm-90 mm (3 cm-9 cm). In those embodiments, it may be especially beneficial for the width of the gap 15 to be 45 mm-75 mm (4.5 cm-7.5 cm), and still better if the width of the gap 15 is approximately 60 mm (6 cm). The depth of each gap 15 along the flow direction is approximately 300 mm (30 cm). However, the size of each gap 15 can be modified as per application use, such as for the purpose of increasing the volume of fluid that can be processed while maintaining electricity levels that result in stable plasma generation.

As shown in FIG. 3, the spacers 12 (formed of an electrically insulating resin material, similar to the glass used for the dielectric layer) can be formed to a height that exceeds the combined heights of the electrodes 16*a*, 16*b*, dielectric layers 14, and the gap 15. In other words, in some embodiments, the spacers 12 extend adjacent side ends (in the widthwise direction) of the electrodes 16*a*, 16*b* and dielectric layers 14, and also above (in the height direction) cantilevered side ends of the electrodes 16*a*, 16*b*, which provides structural stability of the generator 10, especially in embodiments that include numerous stacked layers. For example, in an embodiment that includes two electrodes 16*a*, 16*b* that are each 2 mm in height, two dielectric layers 14 that are each 2 mm in height, and a gap that extends between the dielectric layers 14 to a height of 2 mm, it may be beneficial for the spacer 12 to extend to a height exceeding 7 mm. Some embodiments may include materials, including but not limited to materials used for the purpose of adhesion of components, placed between the electrodes 16*a*, 16*b* the dielectric layers 14, and the spacer 12, which may increase the gaps between these components. In this case, it may be beneficial for the spacer 12 to extend to a height exceeding 8 mm or even 9 mm.

The size and number of dielectric layers 14 and electrodes 16*a*, 16*b* has a direct correlation to the voltage used. Thus, some embodiments increase the spacer 12 size to handle higher voltages i.e., to allow for proper creepage distance.

In the embodiments of FIGS. 1-4, stacking electrodes/dielectric layers helps create stable plasma generated in the gaps 15 defined therebetween. Further, the stacked design allows for more gaps 15 and thereby enables more fluid to pass through the plasma generator 10, which is beneficial for many applications. Embodiments are intended to include or otherwise cover any number of stacked electrode/dielectric layers separated from each other by gaps 15, including but not limited to 100 layers, 11 layers, etc. For example, some embodiments include stacked units with 11 electrodes 16*a*, 16*b*, resulting in 10 gaps 15 in which plasma is generated. It may be beneficial to provide enough electrodes 16*a*, 16*b* to define 20 gaps 15 in which stable cold plasma is generated. However, as indicated above, embodiments can include any number of stacked electrode/dielectric layers separated from each other by gaps 15.

In the embodiments of FIGS. 1-4, efficiencies of plasma generation are the same or substantially the same regardless of how much fluid is processed through the gaps 15 of the plasma generator 10. However, effectiveness of the plasma generation does change and is affected based on the type of fluid passing through the plasma generator 10. In other words, the type of fluid passing through the plasma generator can lead to changing any of the following parameters: dielectric thickness, dielectric material, electrode material, electrode gap, plasma gap, applied voltage, frequency of applied voltage, etc.

In the embodiments of FIGS. 1-4, applying a predetermined AC voltage at a predetermined frequency between the electrodes 16*a*, 16*b* generates cold plasma in the gaps 15 between the dielectric layers 14, which is based on the dielectric barrier discharge induced in the plasma gap 15. This acts to ionize $CO_2$, for example, contained in air, disposed in the gap 15 and in contact with the plasma, to separate the carbon atoms and oxygen atoms. Specifically, a $CO_2$ molecule receiving energy from the plasma ionizes into a positively charged carbon atom (hereinafter "C+"), which has lost electrons in the outermost shell, and a negatively charged oxygen atom (hereinafter "O−"), which has received electrons from the carbon atom. Ultimately, the ionized C+ and O− favor being recombined and returning to stable $CO_2$, and so a separation unit 21 described in the following section is provided adjacent to the downstream side of the plasma generator 10 or is combined with the plasma generator 10 to isolate the ionized C+ and O− before they naturally recombine.

Cold plasma acts on air and water vapor (i.e., fluid) to generate reactive oxygen species including various radicals, such as singlet oxygen (1 $O_2$), ozone ($O_3$), hydroxyl radical (OH), superoxide anion radical ($O_2$—), hydroperoxyl radical ($HO_2$) and hydrogen peroxide ($H_2O_2$). The fluid passing through each gap 15 of the plasma generator 10 flows while being in contact with the generated plasma by continuously spreading in each planar shaped gap 15. Microorganisms, such as viruses and bacteria, contained in the surrounding air sucked into each gap 15 are very quickly destroyed, such as within microseconds, by contacting the cold plasma. A mixture of a multi-plasma gas containing the reactive oxygen species inactivates the viruses and sterilizes the microorganisms. Thus, the plasma generator operates to effectively sterilize the ambient air entering the gaps 15.

Figure 5:
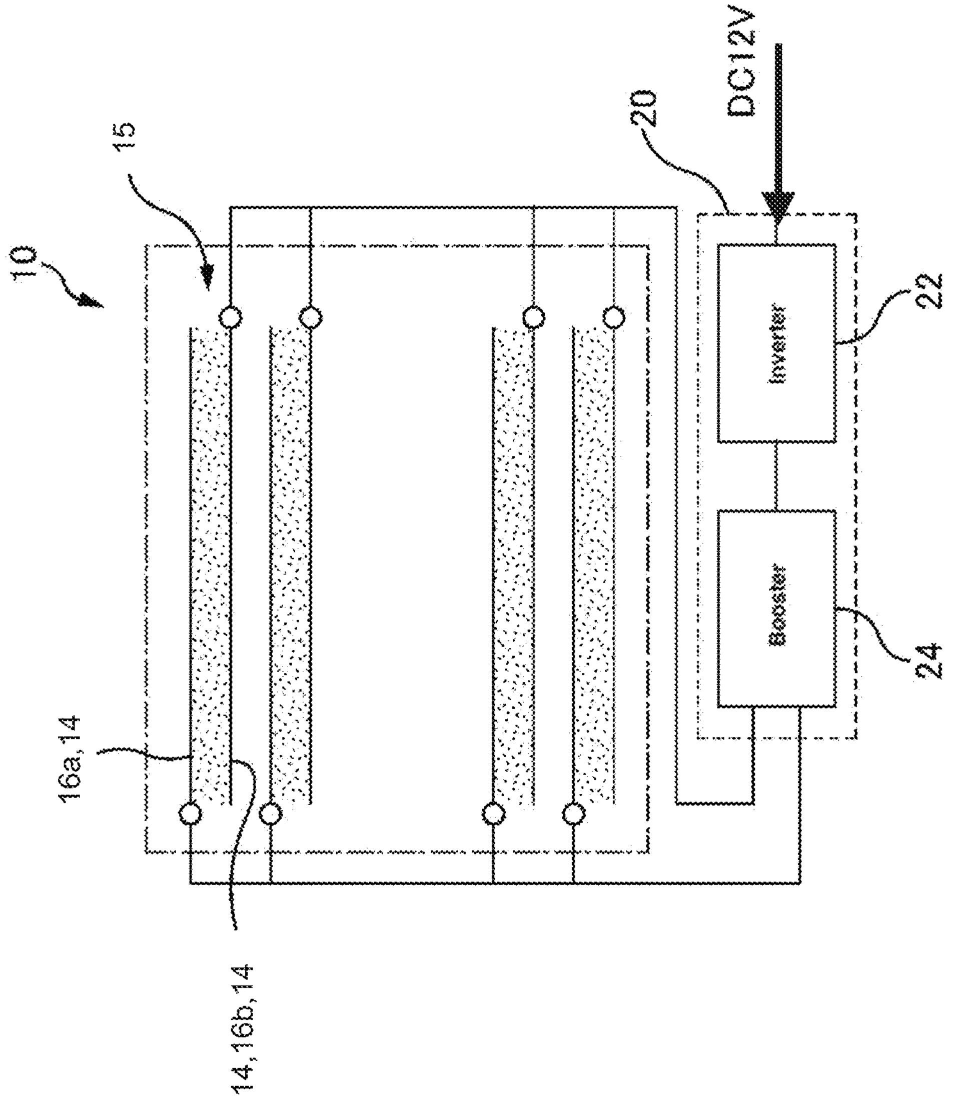
FIG. 5 is a schematic of an exemplary control circuit for the plasma generator 10 of FIG. 2.

FIG. 5 is a schematic of an exemplary control circuit for the plasma generator 10 of FIG. 2. As shown in FIG. 5, a power supply 20 supplies AC electrical power at a predetermined voltage and frequency to the electrodes to generate cold plasma within the gaps 15. The power supply includes and is intended to cover any related art, known, or later developed equipment for performing the above operation.

The power supply includes an inverter 22 and a booster 24, which is connected to each electrode 16*a*, 16*b*. DC 12 V is input to the inverter 22 of the plasma power supply unit 20 from an external power source. The inverter 22 outputs an AC voltage controlled in accordance with the input DC voltage and supplies it to the booster 24. The inverter 22 is sufficient for controlling the power, implementing the control method, the type of the switching element, etc.

Thus, the inverter 22 outputs an AC voltage corresponding to the input DC voltage, and more specifically an AC voltage that is proportional to the input voltage. For example, 1 kV AC is outputted if 1 V DC is applied, and 9 kV AC is outputted if 9 V DC is applied. In order to generate stable cold plasma, the output voltage needs to be controlled based on certain structural parameters of the plasma generator 10, such as the distance between the electrodes 16*a*, 16*b*, the material from which the electrodes are formed, the plane size and the thickness of the electrodes 16*a*, 16*b*. The AC frequency may be appropriately determined.

In some embodiments, the inverter 22 converts DC 12V to AC33.3V and transmits this voltage to the booster 24. The control method used to apply voltage to the electrodes 16*a*, 16*b* to maintain stable barrier discharge, and the amount of voltage sent to the booster, is controlled by the amplitude of the inverter output. A switching element for the separation unit 21 (described below) uses a Field Effect Transfer (FET) and can be built into the inverter. For example, in some embodiments, the Field Effect Transfer (FET) is built into the inverter, while in other embodiments the Field Effect Transfer (FET) is structurally separate from the inverter. The booster 24 uses a rate of 150× to convert the AC33.3V received from inverter up to AC 15 kV.

In some embodiments, the inverter 22 converts DC 12V to AC 20V-AC 100V and transmits this voltage to the booster 24. The booster can have a predetermined rate of 150× and be capable of converting AC 20V-AC 100V to AC 3 kV-15 kV. It may be beneficial to boost AC 33.33V to AC 5 kV for stable cold plasma generation. The composition of the gas passing through the plasma Gap 15 may affect the voltage that is relevant or required for the stable cold plasma generation. In some applications, such as disinfecting and/or sterilizing, less voltage may be necessary, such as AC 5 kV, but in other applications, such as decomposing gases, higher voltage may be necessary, such as AC 7.5 kV-10 kV. The booster 24 can be part of the power supply 21 and can be a transformer.

However, embodiments are intended to cover other voltages and voltage ranges as discussed in detail below. For example, 5 kV-10 kV may be especially beneficial, and 7.5 kV may be even more beneficial. Further, in some embodiments where ozone is a concern, the voltage levels may be beneficial at 3 kV-7 kV. However, 5 kV may be even more beneficial in this context.

Although barrier discharge is used in the plasma generator 10, discharge does not occur if the voltage between the electrodes 16*a*, 16*b* is too low. If the voltage between the electrodes 16*a*, 16*b* is too high, then it shifts to spark discharge or arc discharge, which leads to a decrease in the generation efficiency of active species by the plasma and damage of the electrodes 16*a*, 16*b* due to the concentration of discharge in a specific place.

In the present embodiments, the stable barrier discharge is maintained by controlling the AC voltage applied between the electrodes 16*a*, 16*b*. Thus, the generation of plasma can be stably and continuously performed. Further, by controlling an AC voltage applied between the electrodes, a multi-plasma gas containing active oxygen species is efficiently generated while suppressing generation of harmful ozone ($O_3$).

Voltage levels that produce stable barrier discharge range from 3 kV to 9 kV, although 5 kV may be more advantageous. Due to electrochemical properties, the amount of ozone generated is controlled by voltage. Low voltage 5 kV, for example, generates lower ozone concentrations and the higher voltage 10 kV, for example, generates higher amounts of ozone. The applicable voltage levels may increase to allow for additional plasma generators 10 to be stacked to allow for stable plasma generation. In some embodiments where ozone is not a concern, such as for $CO_2$ decomposition, the voltage levels that may be beneficial are 3 kV-15 kV. However, 5 kV-10 kV may be especially beneficial, and 7.5 kV may be even more beneficial. Further, in some embodiments where ozone is a concern, the voltage levels may be beneficial at 3 kV-7.5 kV. However, 5 kV may be even more beneficial.

The frequency of the electrical power supplied to the electrodes is also relevant to the plasma generation. The frequency is determined by the inverter 22 and can range from 30-60 Hz. At 50 Hz, frequency equals 20 ms and streamer discharge at 10 ms. At 60 Hz, frequency equals 16.67 ms and streamer discharge at 8.33 ms.

As discussed above, multiple stacked layers of electrodes 16*a*, 16*b* and dielectric layers 14 can be used to scale each plasma generator 10, and in fact separate plasma generators 10 can be stacked such as by being vertically aligned. The voltage used to power multiple stacked plasma generators 10 can be augmented by the booster 24 and the inverter 22. The voltage used to power multiple stacked plasma generators 10 can also be augmented by the power supply 21 or one or multiple transformers.

Thus, as discussed above, creating a stable cold plasma depends on a combination of elements, including voltage, frequency, composition of electrodes and dielectric material, structure, size, spacing, creepage distance, and process of forming electrodes. However, the selected voltage and frequency of the electrical power supplied to the electrodes 16*a*, 16*b* and the dielectric strength and relative permittivity are especially important to generate stable cold plasma.

Tables in FIG. 8 and FIG. 9 describe specific parameters of the plasma generator. Each table describes specific examples of parameters that may be found in exemplary embodiments. Each table references parameters depicted in configurations described in FIGS. 1-7. However, it is important to note that the parameters disclosed therein are provided merely for exemplary purposes and are not intended to be limiting in any way. In fact, embodiments are intended to include or otherwise cover plasma generators that include any parameters to create or facilitate the creation of stable cold plasma in a fluid. Embodiments are intended to cover any type of fluid composition in the context of the generation of ions, including but not limited to, power plant flue gas, automobile exhaust gas, chemical processing plant exhaust gas, manufacturing plant exhaust gas, and atmospheric air. Atmospheric air is defined here to be gas composed of the same relative constituents, temperatures, and pressures as the average atmospheric conditions in the location of the device, with humidity that varies naturally.

The tables shown in FIG. 8 and FIG. 9 convey the large changes in the plasma generation process that stem from minute changes to the configuration and other parameters. Each table references a single stacked layer configuration of the plasma generator 10 found in FIGS. 1-7, where there is a first electrode 16*a* and second electrode 16*b*, each with a dielectric layer 14 on the surface that faces the gap 15 created between the two electrodes. However, the parameters in each table in FIG. 8 and FIG. 9 can be multiplied for each layer present in a particular embodiment that contains multiple or stacked plasma generating layers. The optimization of the plasma device for the formation of free radicals and other reactive species is shown to depend on minute changes in the parameters. These parameters are dependent on constants such as the space between each layered electrode plates, the thickness of the dielectric material and the dimensions of the plasma gap. Some of these constants are changed between FIG. 8 and FIG. 9 to show some of the changes to the properties of the system due to the changes in the configuration and materials of the device. Although FIG. 8 and FIG. 9 are keeping electrode material, electrode gap, dielectric material, frequency of applied voltage, and applied voltage constant, it is assumed that other constants can be held and the calculations and parameters will be adjusted in order to produce stable cold plasma.

Some parameters are well defined and described in explicit units, while other parameters are difficult to measure. Parameters that are difficult to measure are described in the tables using an arbitrary qualitative scale, or a scale used to convey qualitative changes.

FIG. 8 is a table of different parameters for a plasma generator with dielectric layers formed of borosilicate glass. Every column alternates between parameters for an exemplary small electrode configuration (6 cm×9 cm) and parameters for an exemplary large electrode configuration (30 cm×30 cm), as noted in the top row. However, as indicated previously herein, embodiments are intended to include or otherwise cover other electrode sizes.

The first parameter, starting from Row 1, is "Electrode Material". The electrode is the circuit element that allows current to pass through its volume to its surface, but the electrons stay confined to the surface and cannot pass through the dielectric material adjoining the surface of the electrode directly opposite the incoming current. This parameter is constant through all variations in the table and between FIG. 8 and FIG. 9, with the single value of "Aluminum" but can be made of similar conductive material such as stainless steel.

Row 2 is "Electrode Gap", which describes the distance between the surfaces of two layered electrodes in millimeters (mm). This parameter is a constant and thus remains unchanged through all variations in the table and has a single value of "6 mm."

Row 3 is "Dielectric Layer Material", which describes the material that constitutes the dielectric layers of the plasma generator. In this embodiment, the dielectric layer is on each stacked electrode. The dielectric material is defined to be a material that can inherently polarize in the presence of an external electric field, thus reducing the electric field within. The charges within the dielectric layer are bound and thus its purpose is to prevent any current from passing through its bulk. This then limits the amount of current that passes through the fluid between the dielectric surfaces, preventing the current from heating the fluid far above room temperature. This parameter also remains unchanged through all variations in the table and has the single value of "Borosilicate Glass".

Row 4 Is "Dielectric Thickness", which is the thickness of each of the two dielectric layers between the electrodes in millimeters. This parameter increases as the columns progress to the right of the table. This parameter is an independent variable, and the dependent parameters depend on its value. This means that this is the only parameter that is actively being varied in the chart and all changes of other parameters are completely dependent on the changes of the independent variable "Dielectric Thickness".

Row 5 is "Relative Permittivity", which is the dimensionless ability of the dielectric layer to reduce an externally applied electric field within the dielectric material—in other words its ability to polarize in an external electric field. The relative permittivity of a vacuum is assumed to be 1, and all other relative permittivity values are greater than this value. This parameter depends on the "Dielectric Layer Material" row and the "Frequency" row, and thus remains unchanged through all variations in the table because the dielectric layer and frequency are constant, having the single value of "4.7".

Row 6 is "Dielectric Strength", which is the electric field threshold that initiates transition from insulator (i.e., dielectric layer 14) to conductor (i.e., electrode 16*a*, 16*b*) and allows significant electric current to pass through. An insulator is a material with the ability to prevent electric charge carriers from passing through at a certain electric field (i.e., dielectric layer 14), whereas a conductor is a material that can allow large amounts of charge carriers to pass through at the same voltage (i.e., electrode 16*a*, 16*b*). For high voltage conditions, a higher dielectric strength is desirable so that charge is allowed to build on or over the surfaces of the dielectric layers and does not pass through the dielectric material. If significant electric current were to pass through the dielectric layer, the purpose of the dielectric would become obsolete, because the current through the fluid in the plasma gap 15 would no longer be limited. This would cause significant heating of the fluid and power consumption would increase, vastly decreasing the efficiency of the device. This parameter depends on the material used for the "Dielectric Layer Material" row and thus remains unchanged through all variations in the table and has the single value of "30 kV/mm".

Row 7 is "Plasma Gap", which is the distance in millimeters between the two dielectric layers, and the region that contains the gas/fluid and in which the stable cold plasma is generated i.e., plasma gap 15. This parameter decreases as from left to right in the table due to the dielectric layer increasing in thickness.

Row 8 is "Frequency", which is the frequency in Hertz (Hz) of the alternating current (AC) applied to the electrodes that are connected to the plasma power supply 20. This parameter remains unchanged through all variations in the table and has the single value of "60 Hz".

Row 9 is "Applied Voltage", which is the RMS (root-mean-square) value in kilovolts (kV) of the AC voltage applied to at least one of the electrodes connected to the plasma power supply 20. This parameter remains unchanged through all variations in the table and has the single value of "5 kV".

Row 10 is "Streamer Discharge", which is the amount of time during a bipolar wave pulse if plasma micro discharges form within the gas/fluid, or the time during which the gap between the dielectric layer surfaces is at the absolute value of burning voltage, which is another parameter that is described below. A bipolar wave pulse is also known as a single alternating current cycle. Micro discharges are the individual filaments that allow current to pass between the surfaces of the dielectrics and are the actual plasma forming regions in the gas/fluid. Micro discharges occur on the order of nanoseconds.

The voltage between the dielectric layer surfaces, in the plasma/fluid gap region, is known as the plasma gap voltage, which is different from the applied voltage. The plasma gap voltage is the mechanism by which the streamer discharge and other parameters vary, and the concept can be used to justify qualitative changes in those parameters. The existence of a micro discharge is dependent on the value of the plasma gap voltage at a particular moment of time: if the plasma gap voltage is too low, the micro discharges cannot exist, and if the plasma gap voltage reaches the critical value of the burning voltage, the micro discharges can form plasma. The plasma gap voltage depends on the charges built up on the electrode surfaces and on the charges built up on the dielectric layer surfaces. Once the charge buildup on the electrodes creates a plasma gap voltage during the rising portion of the AC cycle that is equal to a threshold value known as the burning voltage (described below), micro discharges carry small amounts of charge from one dielectric layer surface to the other.

The charge carried by a micro discharge creates a negative voltage that brings the plasma gap voltage below the value of the burning voltage. This process happens every time the plasma gap voltage momentarily rises above the burning voltage. There is also subtle variability in the surface charges on the surfaces of the dielectric layers, so a micro discharge in one location in the plasma gap 15 will not significantly influence the plasma gap voltage in another location in the plasma gap 15. Thus, there may be many micro discharges occurring at once that all work to keep the average plasma gap voltage at the value of the burning voltage through the existence of the micro discharges. Using an arbitrary qualitative scale, the value of the streamer discharge parameter increases from left to right on the table for small electrodes, and then increases on a separate scale for large electrodes.

However, if changing from a small electrode to a large electrode while keeping the independent variable of dielectric layer thickness constant, the value of this parameter decreases. In other words, the amount of time during which the absolute value of the average plasma gap voltage between the dielectric layers surfaces is at the value of burning voltage increases as the thickness of the dielectric layer is increased and the plasma gap distance (height if electrodes are stacked vertically) is decreased. The reason for this might be that the streamer discharge roughly follows the changes in capacitance (described below). A lower capacitance will lead to a faster buildup of charge and thus a larger plasma gap voltage. The time that the plasma gap voltage is at the burning voltage will then increase, leading to an increase in the value of this parameter.

Row 11 is "Capacitance", which is the amount of surface charge that can be stored on the electrode plates divided by the voltage difference between the electrode plates. For multiple dielectric layers (the dielectric layers and the gas/fluid in the plasma gap, which also has dielectric properties), the following formula is used:

$$C = \epsilon A \frac{\kappa 1 \kappa 2}{\kappa 2 d1 + \kappa 1 d2}$$

where C is the capacitance, e is the vacuum permittivity constant, A is the surface area of one of the electrode plates, in is the relative permittivity of the dielectric layer, κ2 is the relative permittivity of the gas/fluid in the plasma gap, d1 is the combined thickness of both of the dielectric layers, and d2 is the plasma gap distance between the dielectric layers.

The capacitance in the context of the disclosed embodiments represents the amount of time it takes for the electrode plates to build up electric charge, which is the mechanism responsible for inducing an electric field within the plasma gap. In an AC cycle, this also represents how close the plasma gap voltage within the plasma gap is to the applied voltage. Higher values of capacitance might decrease the time and the amount of plasma in the gap. The capacitance increases if changing from a small electrode configuration to a large electrode configuration with all other parameters remaining constant. The capacitance increases then the thickness of the dielectric layer is increased, represented in the table from left to right in the table.

Row 12 is "impedance", which is the amount of resistance to the flow of alternating current into and out of the electrodes. The impedance inversely correlates with the induced current, with lower impedance inducing greater current. This relationship can be demonstrated by Ohm's law for AC circuits, where impedance is equal to the root mean square (RMS) value of applied voltage divided by the RMS value of induced current. In the calculation below, resistive effects are ignored and only capacitive effects are considered, because capacitive effects dominate.

In this case, the impedance is equal to the magnitude of the capacitive reactance (a well-known electrical engineering term that describes the amount of electrical energy an AC circuit can store in a capacitor), with the following formula:

$$Z = \frac{1}{2\pi f C}$$

where Z is the impedance, f is the frequency of the applied alternating current, and C is the capacitance of the device. The impedance of the plasma generator decreases if changing from a relatively small electrode configuration to a relatively large electrode configuration. The impedance of the plasma generator increases if the thickness of the dielectric layer is increased, represented in the table from left to right in the table.

Row 13 is "Peak Reduced Electric Field", which is the peak electric field divided by the number density of the fluid. This parameter is defined in Townsend units (Td). The approximate plasma gap voltage is calculated to be the applied voltage divided by 0.707 (in order to convert root mean square applied voltage to peak applied voltage), and thus the peak reduced electric field is the peak plasma gap voltage divided by the distance between the electrodes (i.e., 6 mm in the current embodiment), which is the plasma gap plus the thickness of both dielectric layers. The following formula is used to calculate the peak reduced electric field:

$$E/N = \frac{V}{(0.707) d n_o} \times \left(10^{21}\ V^{-1} m^{-2}\right)$$

where E/N is the approximate peak reduced electric field, V is the RMS applied voltage, d is the electrode distance, $n_o$ is the Loschmidt constant, equal to $2.7\times10^{25}$ $m^{-3}$, and the factor of $10^{21}$ is used to convert to Townsend units.

The true plasma gap voltage is lower than the applied plasma gap voltage applied to the electrodes and changes due to capacitive effects. This parameter depends on the "Electrode Gap" row, and the "Applied Voltage" row and remains unchanged through all variations in the table because all of these parameters remain constant, having the single value of "43.82 Td".

Row 14 is "ignition Voltage", which is the voltage between the electrodes that initiates the very first micro discharge in the plasma gap in the operation of the entire device. This parameter depends mainly on the surface properties of the dielectric layer material, the distance between the dielectric layers, and the composition of the gas/fluid in the plasma gap. The ignition voltage can also depend on the amount of time the device has been turned off between operations, decreasing with smaller breaks in operation. Using an arbitrary qualitative scale, the value of this parameter decreases from left to right in the table, every other column. In other words, the ignition voltage decreases if the thickness of the dielectric layer is increased.

Row 15 is "Burning Voltage", which is the voltage between the electrodes that initiates sustained micro discharges after many AC cycles. This voltage is an asymptotic property, meaning the voltage that initiates micro discharges will lower from the ignition voltage and approach the burning voltage over many AC cycles. Using an arbitrary qualitative scale and comparing it to the "Ignition Voltage" row, the value of this parameter is always lower than that of the ignition voltage and decreases from left to right in the table, every other column. In other words, the burning voltage also decreases if the thickness of the dielectric layer is increased.

Row 16 is "Micro Discharge Number", which is the number of micro discharges present in the plasma gap region at any one time. Because micro discharges have a filamentary volumetric shape and all are the same size, the number of micro discharges is nearly synonymous with the momentary volume of plasma present in the plasma gap region. Using an arbitrary qualitative scale, the value of this parameter increases when traveling from left to right in the table, but at separate scales for small electrodes and large electrodes.

If changing from a small electrode to a large electrode while keeping the independent variable of dielectric layer thickness constant, the value of this parameter also increases. In other words, the momentary plasma volume increases if the thickness of the dielectric layer is increased or if the surface area of the electrodes is increased. The reason for this might be related to the decrease in burning voltage; if the applied voltage remains constant, the burning voltage threshold occurs earlier in the AC cycle where the slope of the plasma gap voltage is greater. This will cause the number of micro discharges to increase in order to more quickly cancel the rising plasma gap voltage and keep it at the value of the burning voltage.

However, in some configurations, the decrease in plasma gap distance will decrease the length of each micro discharge, which might also decrease the volume of the micro discharges to a small degree. This might lead to either a smaller increase in the micro-discharge number or a decrease in micro-discharge number if increasing the thickness of the dielectric layer.

In some embodiments, there can be one or two dielectric layers between each pair of electrodes, yielding beneficial results if there are two dielectric layers between each pair of electrodes. The number of electrodes can also vary, wherein the horizontally aligned electrodes are stacked vertically with dielectric layers and fluid gaps between every stacked electrode such that first and second electrodes serve as top and bottom electrodes to adjoin one plasma gap in a stack of electrodes and dielectric layers to create multiple plasma gaps. Embodiments are intended to include or otherwise cover any number of electrodes and resulting gaps. In some embodiments, the number of electrodes can be configured to be between two and fifty-one, where the number of gaps between electrodes can be between one and fifty, yielding beneficial results with the number of fluid gaps between five and twenty, and still further at ten.

The stacking process described above changes some of the parameters in the tables. The capacitance scales linearly with the number of plasma gaps, so for an arrangement of five plasma gaps, the capacitance is equal to that of a single plasma gap multiplied by five. This increase in capacitance would clearly decrease the impedance, using the formula given in the embodiments above. This would also decrease the speed of charge buildup on the electrode plate surfaces, and thus lowering the plasma gap voltage between the plates. The lower plasma gap voltage would then decrease the amount of time that the plasma can be held at the burning voltage, decreasing the streamer discharge.

FIG. 9 is a table of different parameters for a plasma generator with dielectric layers formed of ceramic. The leftmost column identifies the parameter that is assigned to the values in the same row. Every column alternates between an exemplary small electrode configuration (6 cm×9 cm) and an exemplary large electrode configuration (30 cm×30 cm), demonstrated by the top row. However, as indicated previously herein, embodiments are intended to include or otherwise cover other electrode sizes.

The first parameter, starting from Row 1, is "Electrode Material". The electrode is the circuit element that allows current to pass through its volume to its surface, but the electrons stay confined to the surface and cannot pass through the dielectric material adjoining the surface of the electrode directly opposite the incoming current. This parameter is constant through all variations in the table and between FIG. 8 and FIG. 9, with the single value of "Aluminum".

Row 2 is "Electrode Gap", which describes the distance between the surfaces of two layered electrodes in millimeters (mm). This parameter is a constant and thus remains unchanged through all variations in the table and has a single value of "6 mm".

Row 3 is "Dielectric Layer Material", which describes the material that constitutes the dielectric layers of the plasma generator. In this embodiment, the dielectric layer is on each stacked electrode. The dielectric material is defined to be a material that can inherently polarize in the presence of an external electric field, thus reducing the electric field within. The charges within the dielectric layer are bound and thus its purpose is to prevent any current from passing through its bulk. This then limits the amount of current that passes through the fluid between the dielectric surfaces, preventing the current from heating the fluid far above room temperature. This parameter also remains unchanged through all variations in the table and has the single value of "Ceramic".

Row 4 is "Dielectric Thickness", which is the thickness of each of the two dielectric layers between the electrodes in millimeters. This parameter increases as the columns progress to the right of the table. This parameter is an independent variable, and the dependent parameters depend on its value. This means that this is the only parameter that is actively being varied in the chart and all changes of other parameters are completely dependent on the changes of the independent variable "Dielectric Thickness".

Row 5 is "Relative Permittivity", which is the dimensionless ability of the dielectric layer to reduce an externally applied electric field within the dielectric material—in other words its ability to polarize in an external electric field. The relative permittivity of a vacuum is assumed to be 1, and all other relative permittivity values are greater than this value.

This parameter depends on the "Dielectric Layer Material" row and the "Frequency" row, and thus remains unchanged through all variations in the table because the dielectric layer and frequency are constant, having the single value of "25".

Row 6 is "Dielectric Strength", which is the electric field threshold that initiates transition from insulator (i.e., dielectric layer 14) to conductor (i.e., electrode 16*a*, 16*b*) and allows significant electric current to pass through. An insulator is a material with the ability to prevent electric charge carriers from passing through at a certain electric field (i.e., dielectric layer 14), whereas a conductor is a material that can allow large amounts of charge carriers to pass through at the same voltage (i.e., electrode 16*a*, 16*b*). For high voltage conditions, a higher dielectric strength is desirable so that charge is allowed to build on or over the surfaces of the dielectric layers and does not pass through the dielectric material. If significant electric current were to pass through the dielectric layer, the purpose of the dielectric would become obsolete, because the current through the fluid in the plasma gap 15 would no longer be limited. This would cause significant heating of the fluid and power consumption would increase, vastly decreasing the efficiency of the device. This parameter depends on the material used for the "Dielectric Material Layer" row and thus remains unchanged through all variations in the table and has the single value of "24 kV/mm".

Row 7 is "Plasma Gap", which is the distance in millimeters between the two dielectric layers, and the region that contains the gas/fluid and in which the stable cold plasma is generated i.e., plasma gap 15. This parameter decreases as from left to right in the table due to the dielectric layer increasing in thickness.

Row 8 is "Frequency", which is the frequency in Hertz (Hz) of the alternating current (AC) applied to the electrodes that are connected to the plasma power supply 20. This parameter remains unchanged through all variations in the table and has the single value of "60 Hz".

Row 9 is "Applied Voltage", which is the RMS (root-mean-square) value in kilovolts (kV) of the AC voltage applied to at least one of the electrodes connected to the plasma power supply 20. This parameter remains unchanged through all variations in the table and has the single value of "5 kV".

Row 10 is "Streamer Discharge", which is the amount of time during a bipolar wave pulse during which plasma micro discharges form within the gas/fluid, or the time during which the gap between the dielectric layer surfaces is at the absolute value of burning voltage, which is another parameter that is described below. A bipolar wave pulse is also known as a single alternating current cycle. Micro discharges are the individual filaments that allow current to pass between the surfaces of the dielectrics and are the actual plasma forming regions in the gas/fluid. Micro discharges occur on the order of nanoseconds.

The voltage between the dielectric layer surfaces, in the plasma/fluid gap region, is known as the plasma gap voltage, which is different from the applied voltage. The plasma gap voltage is the mechanism by which the streamer discharge and other parameters vary, and the concept can be used to justify qualitative changes in those parameters. The existence of a micro discharge is dependent on the value of the plasma gap voltage at a particular moment of time: if the plasma gap voltage is too low, the micro discharges cannot exist, and if the plasma gap voltage reaches the critical value of the burning voltage, the micro discharges can form plasma. The plasma gap voltage depends on the charges built up on the electrode surfaces and on the charges built up on the dielectric layer surfaces.

Once the charge buildup on the electrodes creates a plasma gap voltage during the rising portion of the AC cycle that is equal to a threshold value known as the burning voltage (described below), micro discharges carry small amounts of charge from one dielectric layer surface to the other. The charge carried by a micro discharge creates a negative voltage that brings the plasma gap voltage below the value of the burning voltage. This process happens every time the plasma gap voltage momentarily rises above the burning voltage. There is also subtle variability in the surface charges on the surfaces of the dielectric layers, so a micro discharge in one location in the plasma gap 15 will not significantly influence the plasma gap voltage in another location in the plasma gap 15. Thus, there may be many micro discharges occurring at once that all work to keep the average plasma gap voltage at the value of the burning voltage through the existence of the micro discharges.

Using an arbitrary qualitative scale, the value of the streamer discharge parameter increases from left to right on the table for small electrodes, and then increases on a separate scale for large electrodes. However, if changing from a small electrode to a large electrode while keeping the independent variable of dielectric layer thickness constant, the value of this parameter decreases. In other words, the amount of time during which the absolute value of the average plasma gap voltage between the dielectric layers surfaces is at the value of burning voltage increases as the thickness of the dielectric layer is increased and the plasma gap distance (height if electrodes are stacked vertically) is decreased. The reason for this might be that the streamer discharge roughly follows the changes in capacitance (described below). A lower capacitance will lead to a faster buildup of charge and thus a larger plasma gap voltage. The time that the plasma gap voltage is at the burning voltage will then increase, leading to an increase in the value of this parameter.

Row 11 is "Capacitance", which is the amount of surface charge that can be stored on the electrode plates divided by the voltage difference between the electrode plates. For multiple dielectric layers (the dielectric layers and the gas/fluid in the plasma gap, which also has dielectric properties), the following formula is used:

$$C = \epsilon A \frac{\kappa 1 \kappa 2}{\kappa 2 d1 + \kappa 1 d2}$$

where C is the capacitance, e is the vacuum permittivity constant, A is the surface area of one of the electrode plates, κ1 is the relative permittivity of the dielectric layer, κ2 is the relative permittivity of the gas/fluid in the plasma gap, d1 is the combined thickness of both dielectric layers, and d2 is the plasma gap distance between the dielectric layers.

The capacitance in the context of the disclosed embodiments represents the amount of time it takes for the electrode plates to build up electric charge, which is the mechanism responsible for inducing an electric field within the plasma gap. In an AC cycle, this also represents how close the plasma gap voltage within the plasma gap is to the applied voltage. Higher values of capacitance might decrease the time and the amount of plasma in the gap. The capacitance increases if changing from a small electrode configuration to a large electrode configuration with all other parameters remaining constant. The capacitance increases then the thickness of the dielectric layer is increased, represented in the table from left to right in the table.

Row 12 is "Impedance", which is the amount of resistance to the flow of alternating current into and out of the electrodes. The impedance inversely correlates with the induced current, with lower impedance inducing greater current. This relationship can be demonstrated by Ohm's law for AC circuits, where impedance is equal to the root mean square (RMS) value of applied voltage divided by the RMS value of induced current. In the calculation below, resistive effects are ignored, and only capacitive effects are considered, because capacitive effects dominate.

In this case, the impedance is equal to the magnitude of the capacitive reactance (a well-known electrical engineering term that describes the amount of electrical energy an AC circuit can store in a capacitor), with the following formula $$Z = \frac{1}{2\pi fC}$$

where Z is the impedance, f is the frequency of the applied alternating current, and C is the capacitance of the device. The impedance of the plasma generator decreases if changing from a relatively small electrode configuration to a relatively large electrode configuration. The impedance of the plasma generator decreases if the thickness of the dielectric layer is increased, represented in the table from left to right in the table.

Row 13 is "Peak Reduced Electric Field", which is the peak electric field divided by the number density of the fluid. This parameter is defined in Townsend units (Td). The approximate plasma gap voltage is calculated to be the applied voltage divided by 0.707 (in order to convert root mean square voltage to peak voltage), and thus the peak electric field is the plasma gap voltage divided by the distance between the electrodes (i.e., 6 mm in the current embodiment), which is the plasma gap plus the thickness of both dielectric layers. The following formula is used to calculate the peak reduced electric field:

$$E/N = \frac{V}{(0.707)dn_o} \times \left(10^{21}\ V^{-1}m^{-2}\right)$$

where E/N is the approximate peak reduced electric field, V is the RMS applied voltage, d is the electrode distance, $n_0$ is the Loschmidt constant, equal to $2.7\times10^{25}$ $m^{-3}$, and the factor of $10^{21}$ is used to convert to Townsend units.

The true plasma gap voltage is lower than the applied voltage that is applied to the electrodes and changes due to capacitive effects. This parameter depends on the "Electrode Gap" row, and the "Applied Voltage" row and remains unchanged through all variations in the table because all of these parameters remain constant, having the single value of "43.82 Td".

Row 14 is "ignition Voltage", which is the voltage between the electrodes that initiates the very first micro discharge in the plasma gap in the operation of the entire device. This parameter depends mainly on the surface properties of the dielectric layer material, the distance between the dielectric layers, and the composition of the gas/fluid in the plasma gap. The ignition voltage can also depend on the amount of time the device has been turned off between operations, decreasing with smaller breaks in operation. Using an arbitrary qualitative scale, the value of this parameter decreases from left to right in the table, every other column. In other words, the ignition voltage decreases if the thickness of the dielectric layer is increased.

Row 15 is "Burning Voltage", which is the voltage between the electrodes that initiates sustained micro discharges after many AC cycles. This voltage is an asymptotic property, meaning the voltage that initiates micro discharges will lower from the ignition voltage and approach the burning voltage over many AC cycles. Using an arbitrary qualitative scale and comparing it to the "ignition Voltage" row, the value of this parameter is always lower than that of the ignition voltage and decreases from left to right in the table, every other column. In other words, the burning voltage also decreases if the thickness of the dielectric layer is increased.

Row 16 is "Micro Discharge Number", which is the number of micro discharges present in the plasma gap region at any one time. Because micro discharges have a filamentary volumetric shape and all are the same size, the number of micro discharges is nearly synonymous with the momentary volume of plasma present in the plasma gap region. Using an arbitrary qualitative scale, the value of this parameter increases when traveling from left to right in the table, but at separate scales for small electrodes and large electrodes. If changing from a small electrode to a large electrode while keeping the independent variable of dielectric layer thickness constant, the value of this parameter also increases. In other words, the momentary plasma volume increases if the thickness of the dielectric layer is increased or if the surface area of the electrodes is increased.

The reason for this might be related to the decrease in burning voltage; if the applied voltage remains constant, the burning voltage threshold occurs earlier in the AC cycle where the slope of the plasma gap voltage is greater. This will cause the number of micro discharges to increase in order to cancel the rising plasma gap voltage and keep it at the value of the burning voltage more quickly. However, in some configurations, the decrease in plasma gap distance will decrease the length of each micro discharge, which might also decrease the volume of the micro discharges to a small degree. This might lead to either a smaller increase in the micro-discharge number or a decrease in micro-discharge number if increasing the thickness of the dielectric layer.

In some embodiments, there can be one or two dielectric layers between each pair of electrodes, yielding beneficial results if there are two dielectric layers between each pair of electrodes. The number of electrodes can also vary, wherein the horizontally aligned electrodes are stacked vertically with dielectric layers and fluid gaps between every stacked electrode such that first and second electrodes serve as top and bottom electrodes to adjoin one plasma gap in a stack of electrodes and dielectric layers to create multiple plasma gaps. In some embodiments the number of electrodes can be configured to be between two and fifty-one, where the number of gaps between electrodes can be between one and fifty, yielding beneficial results with the number of fluid gaps between five and twenty, and still further at ten. However, embodiments are intended to include or otherwise cover any number of electrodes and/or gaps.

The stacking process described above changes some of the parameters in the tables. The capacitance scales linearly with the number of plasma gaps, so for an arrangement of five plasma gaps, the capacitance is equal to that of a single plasma gap multiplied by five. This increase in capacitance would clearly decrease the impedance, using the formula given in the embodiments above. This would also decrease the speed of charge buildup on the electrode plate surfaces, and thus lower the plasma gap voltage between the plates. The lower plasma gap voltage would then decrease the amount of time that the plasma can be held at the burning voltage, decreasing the streamer discharge.

As indicated above, the parameters provided in the tables of FIGS. 8 and 9 are provided for exemplary purposes, and it is intended that other embodiments include other parameters.

In some embodiments, the plasma generator 10 may be assisted in its function of sterilization by an ultrasonic oscillator, which is a device that emits ultrasonic waves and serves to support cleaning of air by damaging structures such as bacteria in the air or by promoting mixing of various active species generated in the atmospheric pressure low temperature plasma by the plasma generator 10.

In some embodiments, the plasma generator 10 may also be assisted by an ultraviolet emitter, which emits ultraviolet light and can help to sterilize the air by destroying bacteria or virus. The ultraviolet light can also help to ionize the air, possibly reducing the amount of applied voltage required.

E. Decreased Ozone Production

The chemical products of the plasma, including the relative productions of ozone versus other reactive oxygen species or free radicals, are determined at least in part by the properties of the individual micro discharges. Thus, each individual micro discharge can be regarded as a miniature non-equilibrium plasma chemical reactor. The micro discharge characteristics can be tailored for a given application, such as decreasing the relative production of ozone compared to hydroxyl radicals, by making use of the fluid properties, adjusting the electrode design, or changing the dielectric material thereby changing the properties of the dielectric layer. The properties of each micro discharge are notably independent of the electrode area or the applied voltage, which only serve to change the number of micro discharges present in the fluid gap. Thus, Individual micro discharge properties are not altered during up-scaling.

From the plasma chemistry perspective, a significant or dominant characteristic of DBD is the dynamics of the electron energy distribution function (EEDF) in the micro discharge. The EEDF changes based on properties such as the value of the relative permittivity of the dielectric layer, the thickness of the dielectric layer, the electron work function of the dielectric surface, the roughness and porousness of the dielectric surface, the thickness of the fluid gap, the molecular composition of the fluid in the fluid gap, the pressure and temperature of the fluid in the fluid gap, and more. The exact proportionalities depend on the design and arrangement of the DBD.

In order to decrease the relative production of ozone compared to hydroxyl radicals, the above properties can be manipulated to increase the tail end of the EEDF (the higher energy end) above the ionization energy of fluid, including water, which leads to production of hydroxyls, but below the ionization energy of oxygen gas, which leads to ozone production. Thus, the choice of dielectric material properties, and the thickness of the dielectric layer combined with the properties of the ambient air, including water, to decrease ozone production while still producing hydroxyls for sterilization. Because ambient air conditions are held constant through all configurations of the plasma generator (for the embodiments that use ambient air as the fluid), the choice of dielectric properties can thus be selected for the ambient air conditions to achieve an optimum or enhanced EEDF.

In some embodiments, the EEDF is tailored to produce less ozone by configuring the dielectric layer with a dielectric material that has an average surface roughness between 0 nm and 800 nm. Depending on the other stated properties that affect the EEDF, beneficial results may be yielded if a low surface roughness is desirable, between 0 and 100 nm. Beneficial results may also be yielded if a high surface roughness is desirable, between 100 and 800 nm. Low surface roughness can be used to increase the tail end of the EEDF, and high surface roughness can accomplish the opposite. This is achieved because higher surface roughness can make the electric field near the dielectric surface very nonuniform, decreasing the burning voltage, and lowering the total electric field energy transferred to each micro discharge.

In some embodiments, the EEDF is tailored to produce less ozone by configuring the dielectric layer with a dielectric material that has a relative permittivity between 2 and 500, and a dielectric layer thickness between 0 mm and 3 mm. If the relative permittivity is on the lower end, between 2 and 15, beneficial results for the dielectric thickness are yielded between 1 mm and 3 mm, with even better results at 2 mm. If the relative permittivity is in the middle of each end, between 15 and 100, beneficial results for the dielectric thickness are yielded between 0 mm and 2 mm, with even better results at 1 mm. If the relative permittivity is on the higher end, between 100 and 500, beneficial results for the dielectric thickness are yielded between 0 mm and 5 mm, with even better results at 2 mm. These combinations of relative permittivity and dielectric layer thickness affect the specific capacitance of the barrier $C_d/A$, which determines the amount of charge transferred in each micro discharge and, furthermore, the energy dissipated to the electrons in each micro discharge. These properties allow the tall end of the EEDF to be between that of the ionization energies of water and diatomic oxygen gas.

III. Sterilization System

Figure 6:
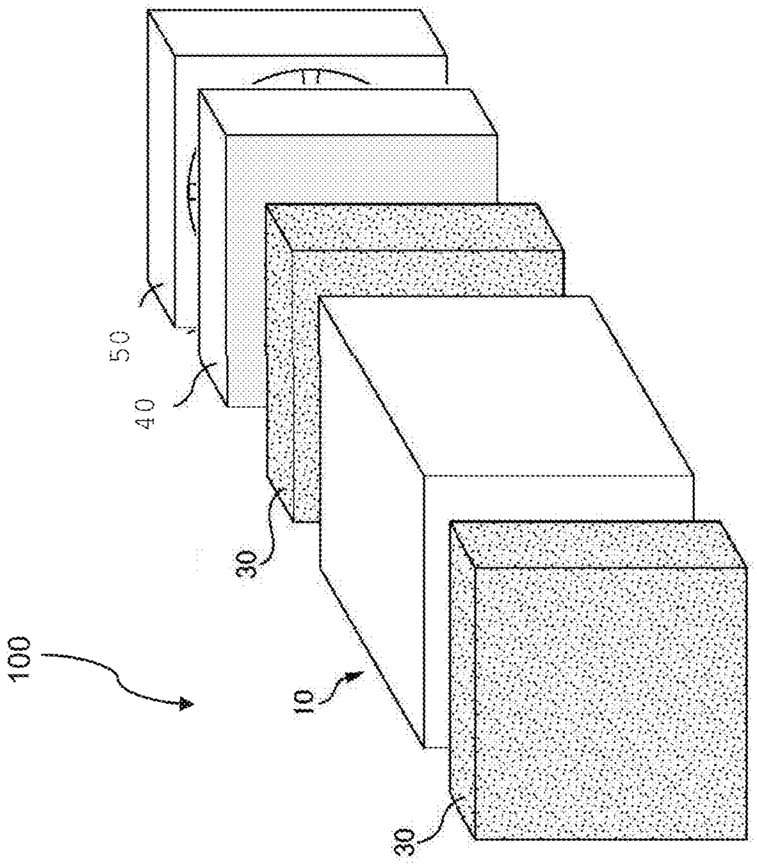
FIG. 6 is a perspective view of a sterilization system 100 incorporating the plasma generator of FIG. 2.

FIG. 6 is perspective view of a sterilization system 100 incorporating the plasma generator of FIG. 2. In this sterilization system 100, the plasma generator 10 discussed above is used with other equipment to sterilize air. The plasma generator 10 used in this sterilization system 100 can be the same or similar to the embodiments discussed above, or alternatively can have differences that are incorporated to enhance performance in this application.

The sterilization system 100 includes a first ozone decomposition filter 30 at an upstream end, which filters the air prior to the air entering the plasma generator 10. Air exiting the plasma generator 10 enters a second ozone decomposition filter 30. Air exiting the second ozone decomposition filter 30 then contacts an ozone sensor 40, which is powered by a DC power supply and detects presence of ozone. A dynamic fan 50 is provided at a downstream end of the sterilization system 100 and sucks the air therethrough.

The fan 50 is a blower unit that functions as an exhaust fan of the sterilization system 100. By operating the electric fan 50 in the exhaust direction, the air inside the sterilization system 100 is introduced and passes through the plasma generator 10.

The sterilization system 100 shown in FIG. 6 arranges the various components in a linear formation, however embodiments are intended to cover other component configurations, such as the components being arranged in a circular configuration and housed within a circular-cylindrical housing.

Many reactive species are formed by the plasma generated by the plasma generator 10, including small amounts of Ozone (03), which is potentially harmful to humans (having a unique odor) and may exit in either an upstream direction of a downstream direction absent mitigation efforts.

Thus, the ozone decomposing filters 30 are provided at the upstream and downstream sides of the plasma generator 10. The ozone decomposing filters 30 reduce, minimize, or prevent the ozone from exiting back through the upstream side or through the downstream side of the sterilization system 100. However, in some embodiments where there is no issue with ozone flowing back through the upstream flow path, the ozone decomposing filter 30 at the upstream side can be eliminated.

Embodiments are intended to include any related art, known, or later developed ozone-degrading filters for this purpose. The shape and dimensions of the ozone decomposing filters 30 depend on the specifications of the sterilization system 100 in which they are incorporated.

An ozone sensor 40 is provided downstream of the plasma generator 10 and the second ozone decomposition filter 30 adjacent the fan 50 to confirm proper operation of the ozone decomposition filters 30, and thus compliance with safety standards. For example, current regulations provide that the permissible concentration in a work environment is approximately 0.1 ppm or less, as per Japanese, US, European, or other standards.

The ozone sensor 40 measures the ozone concentration contained in the exhaust gas on the downstream side of plasma generator 10. Embodiments are intended to include any related art, known, or later developed ozone sensor 40, such as a semiconductor type gas sensor with a high sensitivity. By monitoring the force, the ozone sensor 40 can be configured to control the operation of the plasma generator 10 such as to cease operations of the plasma generator 10 should it detect improper amounts of ozone. However, some embodiments do not include an ozone sensor 40, such as those that integrate an AQRSS, as referred to above.

Figure 7:
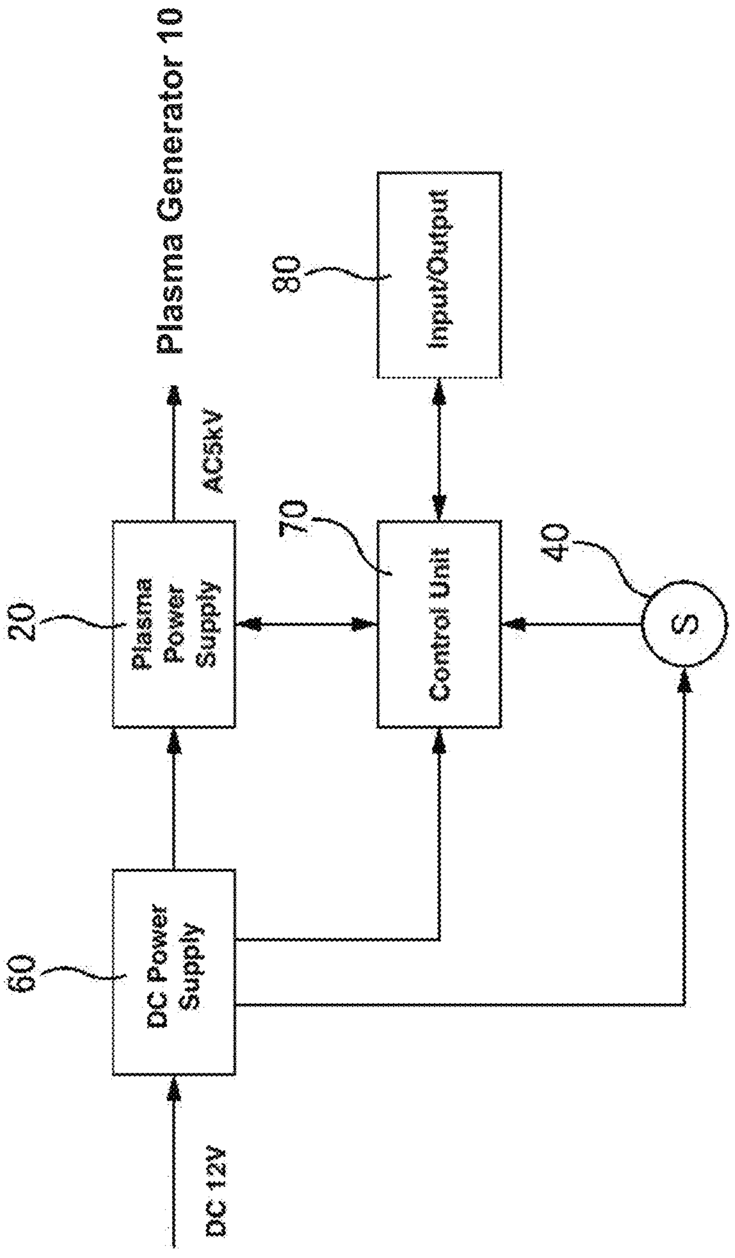
FIG. 7 is a schematic of an exemplary control circuit for the sterilization system 100 of FIG. 6.

FIG. 7 is a schematic of an exemplary control circuit for the sterilization system 100 of FIG. 6. As shown in FIG. 7, 12V DC is supplied to the DC power supply 60, which then supplies DC voltage to the control unit 70 as well as to the plasma power supply 20. The control unit 70 is also directly connected to the plasma power supply 20.

The DC power supply 60 is configured to supply a variety of DC voltages to the plasma power supply 20 and to the control unit 70. For example, the DC power supply 60 can supply DC 24V and DC 5V to power the control unit 70 and can supply DC 12V to the plasma power supply 20. The plasma power supply 20 converts the received DC 12V to AC, such as 5 kV AC, which it supplies to the plasma generator 10. The control unit 70 is also configured to communicate with the input/output 80.

IV. Gas Decomposition System

A. Applications

Greenhouse gases emitted from various social infrastructures, such as power plants, industrial product manufacturing plants, and various transportation systems, are a cause of global warming, and the reduction of greenhouse gases as much as possible is an urgent social issue. In particular, carbon dioxide ($CO_2$) generated from the combustion of fossil fuels is a major component of greenhouse gases, and various attempts have been proposed to reduce or suppress the generation of $CO_2$ and to remove the generated $CO_2$ from the environment.

The Gas Decomposition System 17 intakes gaseous fluid containing for instance, carbon dioxide, and ionizes compound molecules into their separate atoms into a positively charged carbon atom and negatively charged oxygen atoms by bringing the carbon dioxide into contact with an atmospheric pressure low temperature plasma. In some embodiments a Separation Unit including side electrodes will separate the charged atoms for collection, for recombining as new molecules or as purified molecules that exit the system.

In some embodiments, the Gas Decomposition System 700 constitutes a gas treatment method and system that enables continuous decomposition of gaseous fluids, such as, $CO_2$. Some of these embodiments, include relatively simple and commercially producible apparatus and configurations.

Hereinafter, carbon dioxide ($CO_2$) will be the example of a gas that can be broken down and treated using the described Gas Decomposition System technology. However, this technology is not limited to $CO_2$, but can be applied to other gases including greenhouses gases like methane (CH4), nitrous oxide (N2O) and fluorinated gases among others.

B. Detailed Explanation

The following overview will cover four embodiments of the Gas Decomposition System 700. The main difference between the four embodiments is how the molecules separated if encountering the atmospheric pressure low temperature plasma created by the Plasma Generator 10 (as previously described) are kept separate and subsequently collected. In all of the embodiments, the ionized molecules are separated by a Separation Unit 21. In some embodiments, the ionized molecules are separated by a Separation Unit 21 and collected by collection devices located within the Separation Unit 21.

Figure 10:
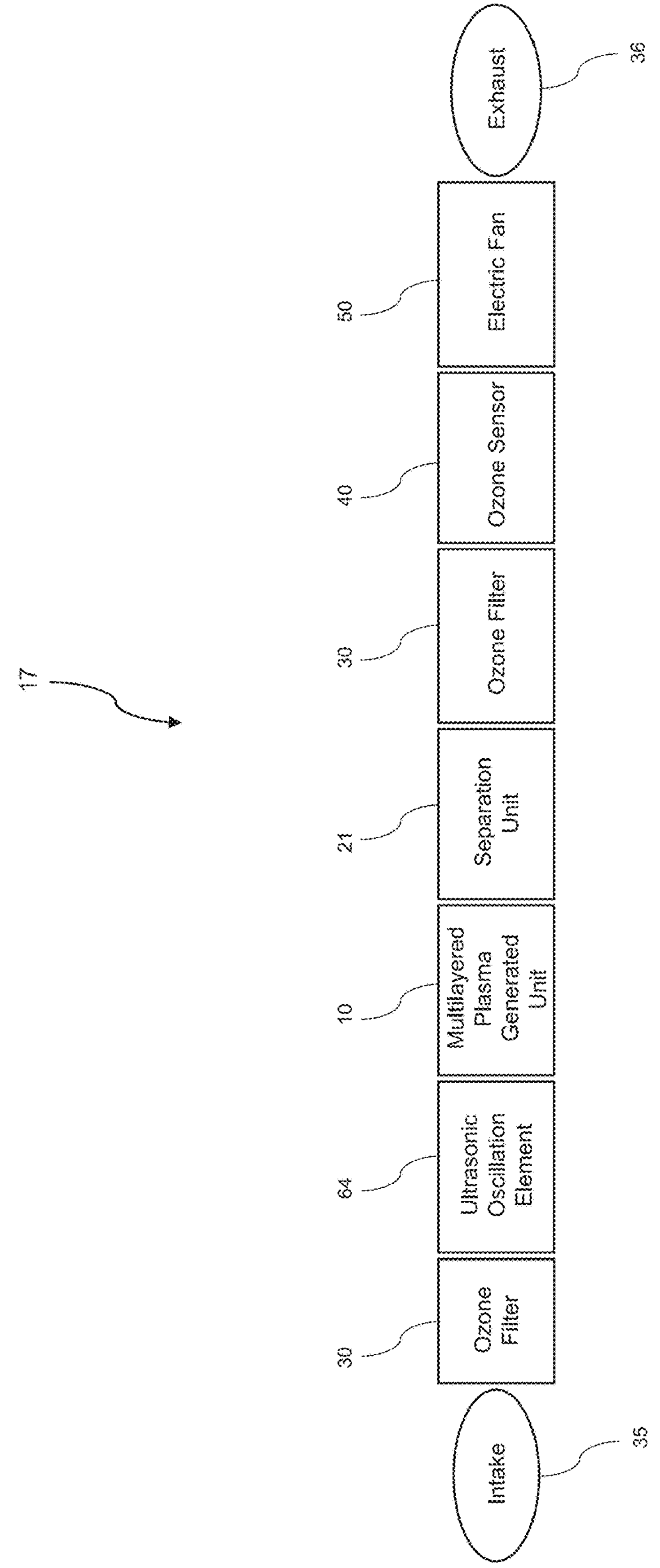
FIG. 10 is a schematic of a Gas Decomposition system 17 containing a separation unit 21.
Figure 11:
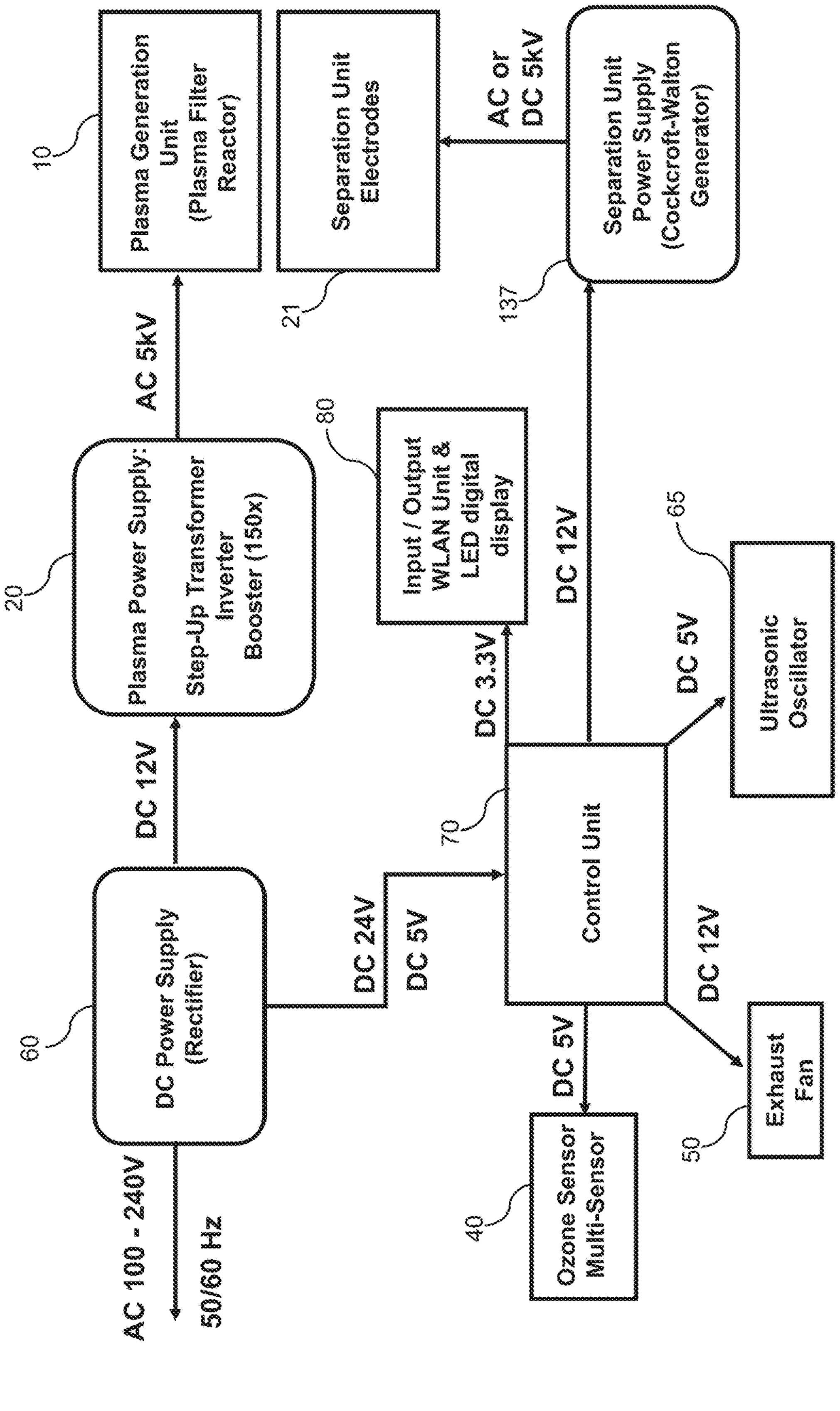
FIG. 11 is a schematic of an exemplary control circuit for the Gas Decomposition system 17
Figure 19:
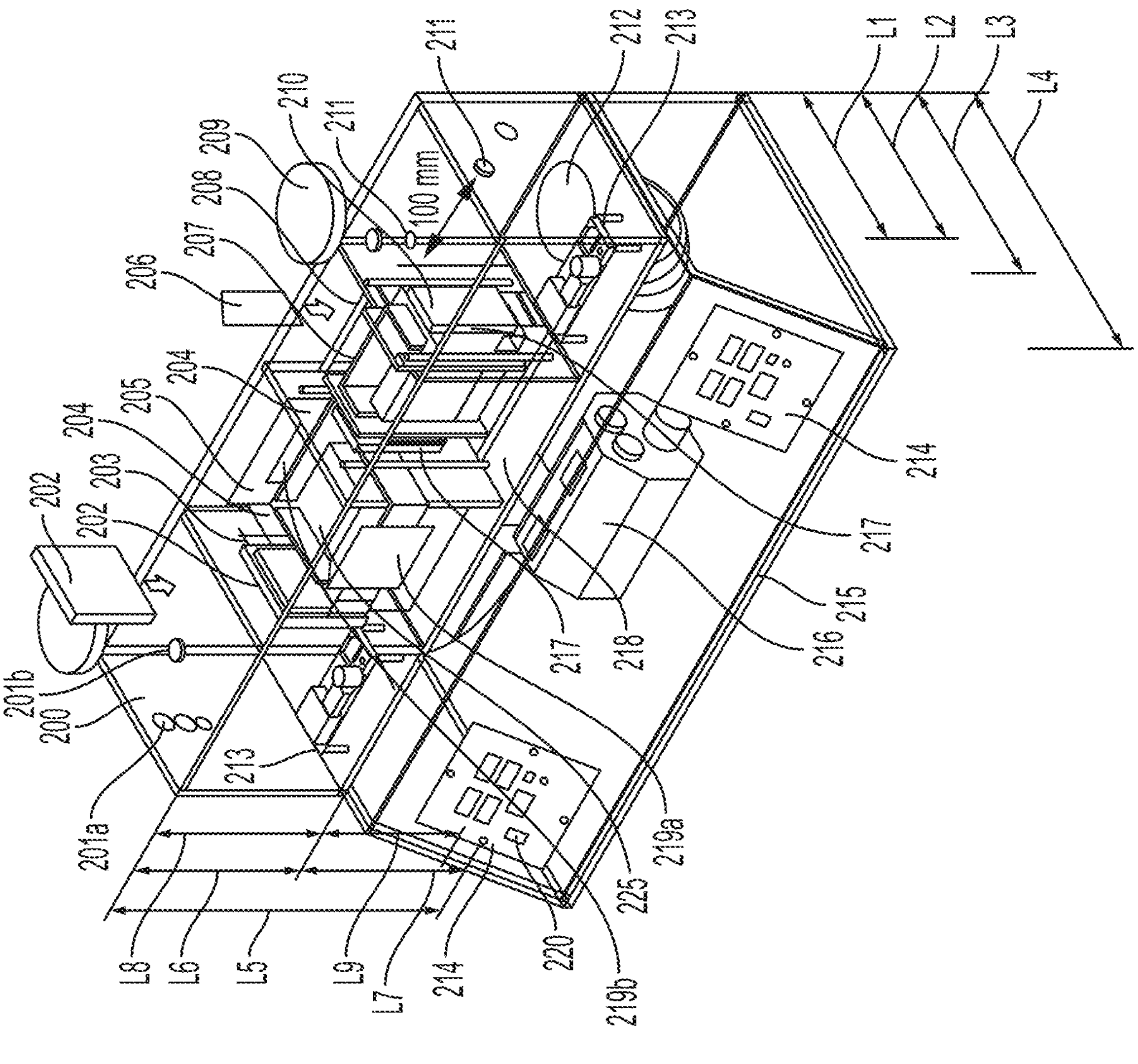
FIG. 19 is a schematic perspective view of an exemplary configuration of the Gas Decomposition system 17.
Figure 20:
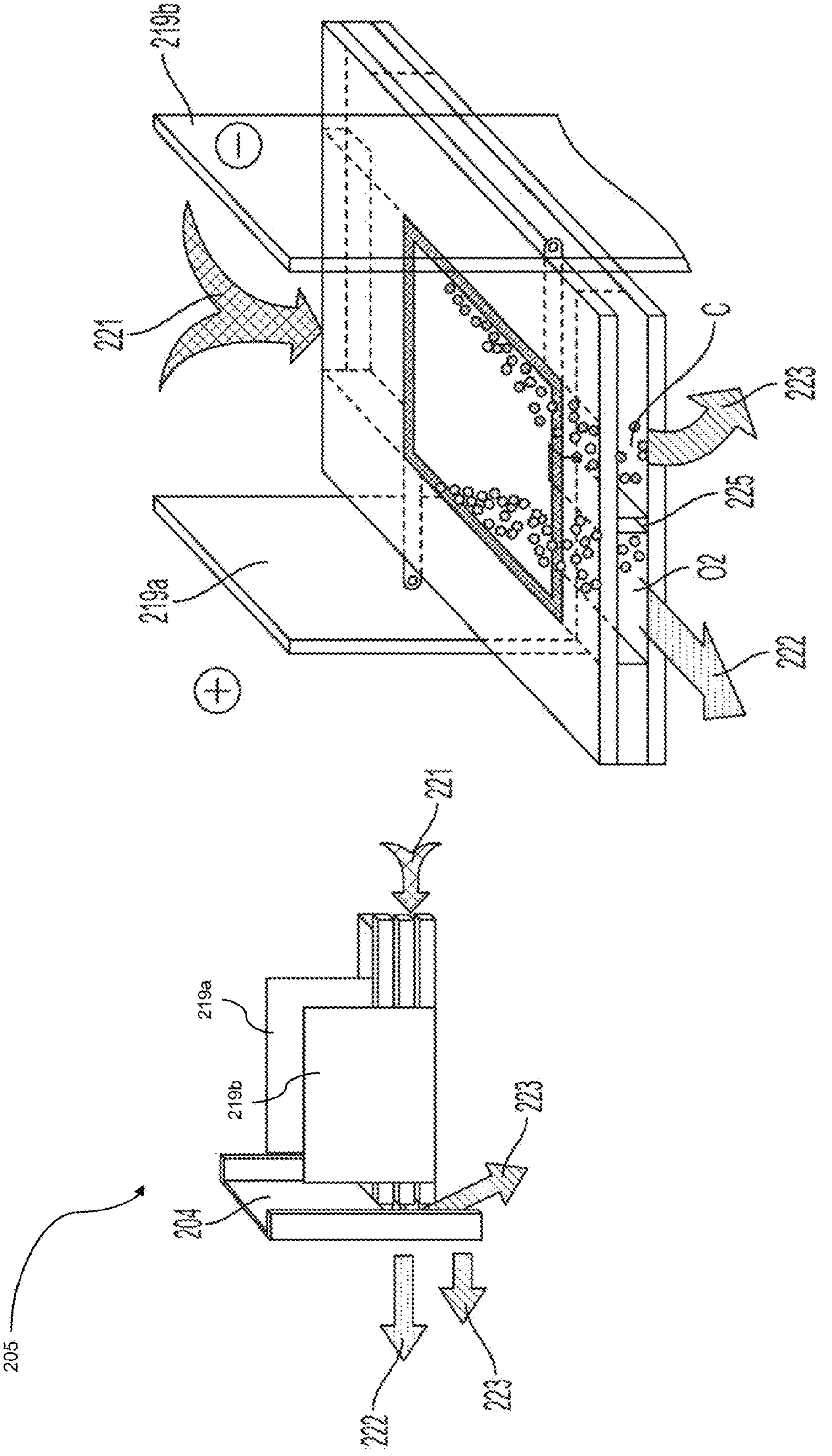
FIG. 20 is a schematic perspective view showing an exemplary operation of an exemplary separation unit 205.

In other embodiments the ionized molecules are separated by a Separation Unit 21 and collected by collection devices located outside of the Separation Unit 21. In some embodiments, there may be multiple Plasma Generators 10 and multiple Separation Units 21. In some embodiments, there may be multiple side electrodes and collection devices. All other aspects of the technology are the same unless specified. FIGS. 10 and 11 cover all embodiments. FIG. 12 through FIG. 16*b* describe the first embodiment. FIG. 17*a* through FIG. 18 describe embodiment 2. FIGS. 19 and 20 describe embodiment 3 and FIG. 21 describes embodiment 4.

Figure 12:
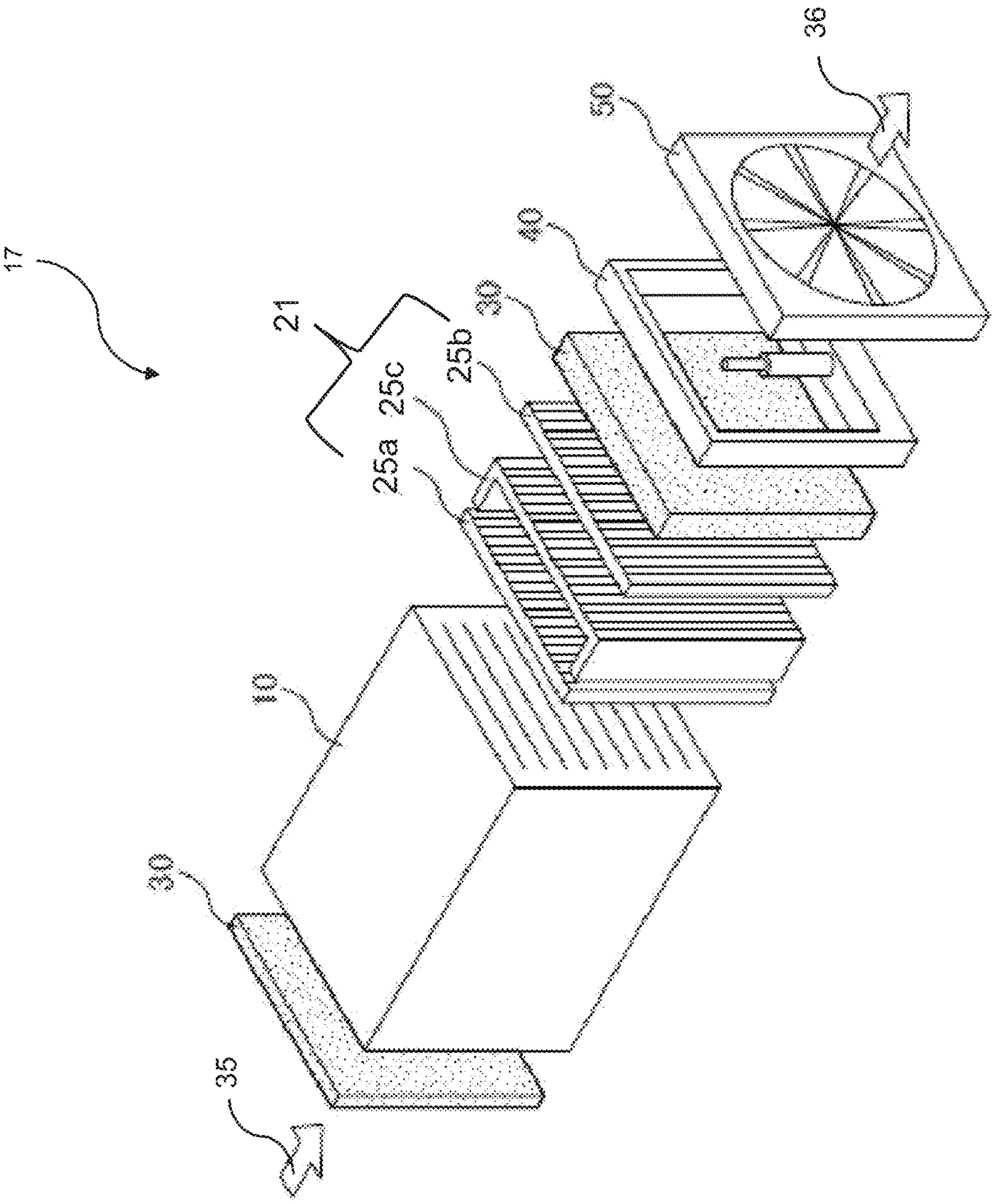
FIG. 12 is a schematic perspective view showing an exemplary configuration of the Gas Decomposition system 17 according to embodiment 1.
Figure 13:
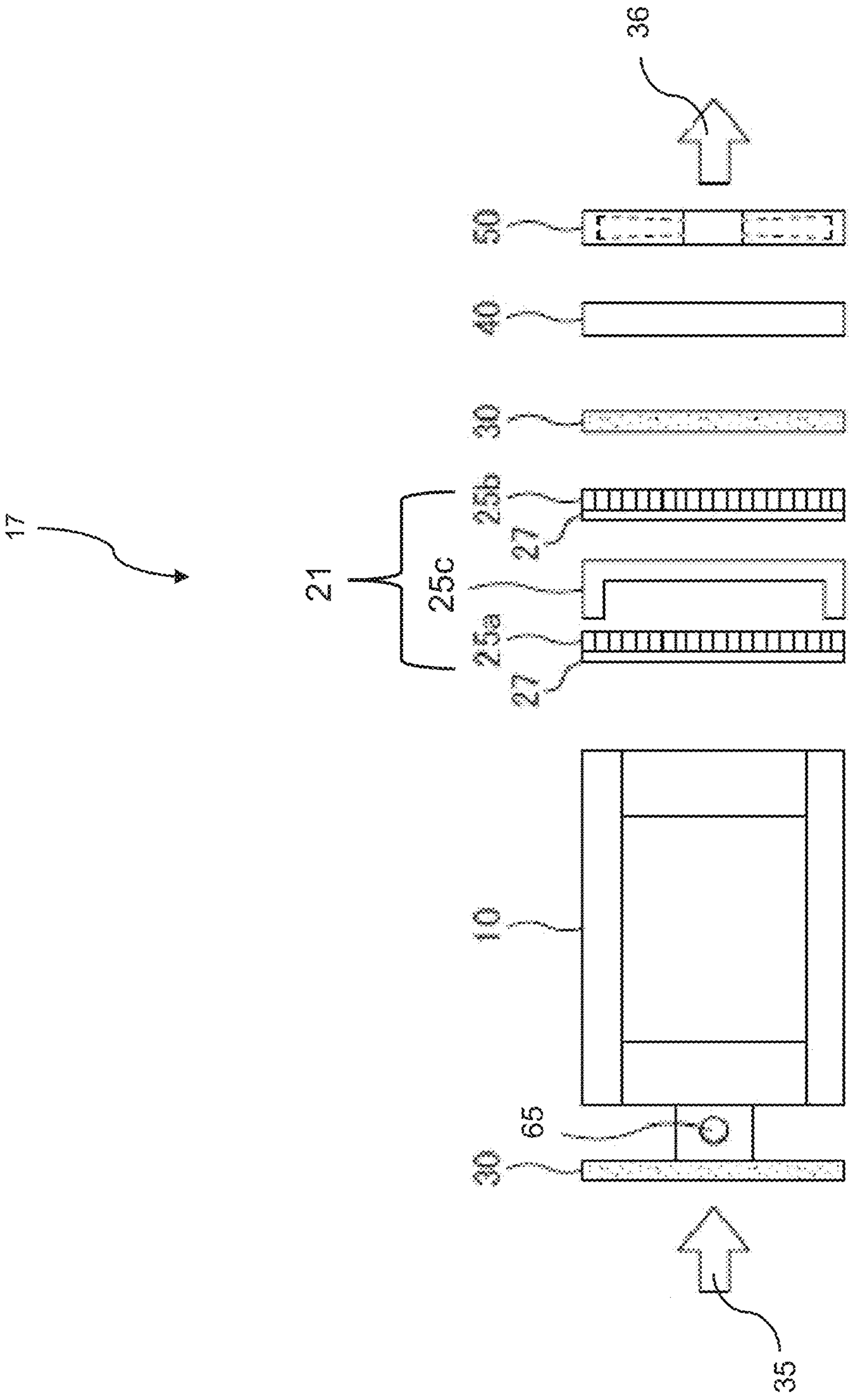
FIG. 13 shows a top plan view of the exemplary configuration of the Gas Decomposition system 17 corresponding to FIG. 12.
Figure 14:
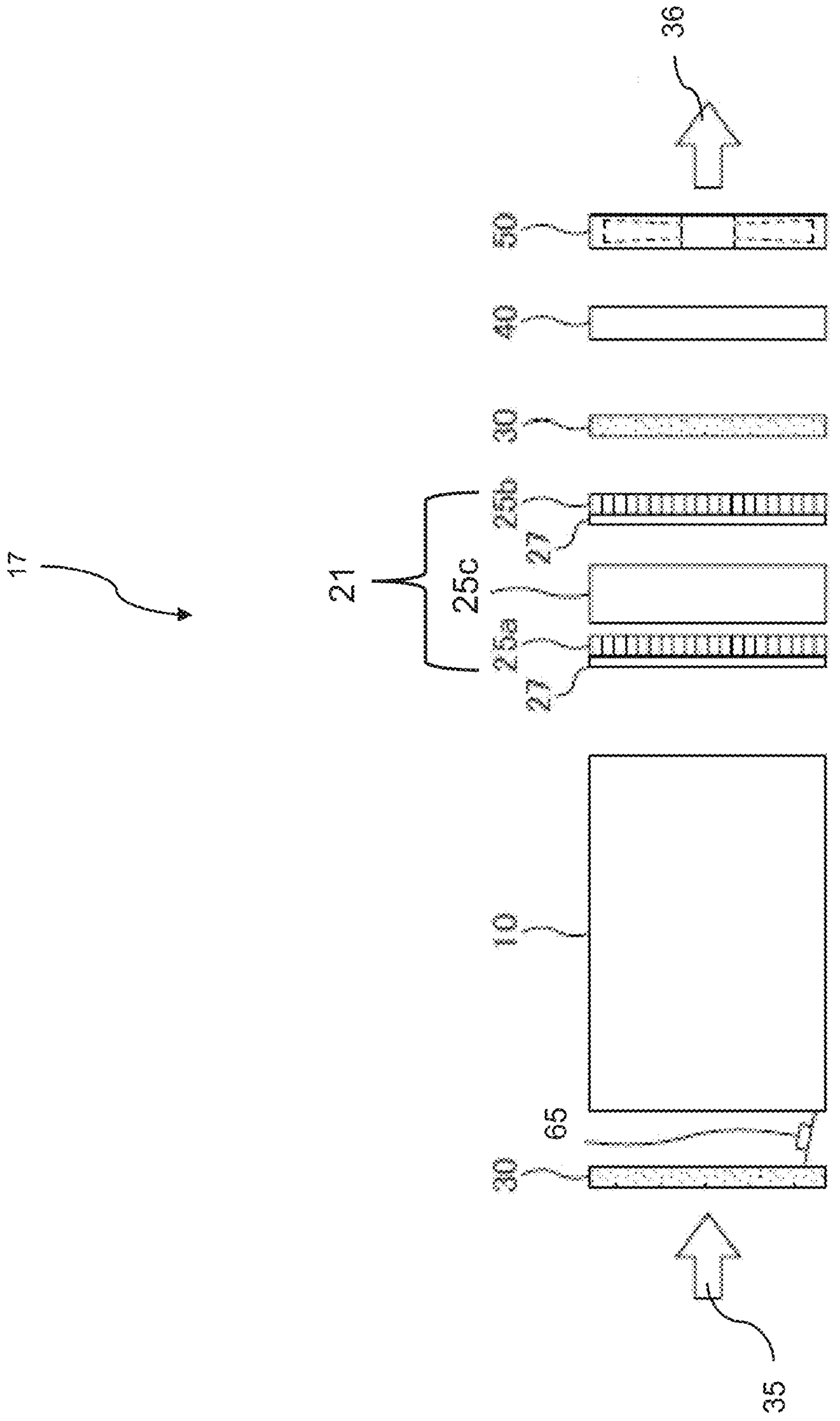
FIG. 14 shows a side view of the exemplary configuration of the Gas Decomposition system 17 corresponding to FIG. 12.

FIG. 10 is a schematic of the main features of the Gas Decomposition System 17 technology. FIG. 12 is a schematic perspective view showing a configuration example of the Gas Decomposition System 17, using the decomposition of $CO_2$ for example. FIG. 12 shows a configuration example of a Gas Decomposition System according to embodiment 1 of the present technology, and FIGS. 13 and 14 show a top plan view and a side view of the Gas Decomposition System 17 corresponding to FIG. 12. Hereinafter, “Gas Decomposition System” 17 may be referred to simply as “system” 17. However, other embodiments are shown in FIGS. 17*a*, 17*b*, 19, 20, and 21. The Gas Decomposition System 17 can include ozone filters on either or both sides of the plasma generator 10.

The system 17 is configured to perform a function of sucking a fluid containing gases, such as carbon dioxide, typically within ambient air, from the external environment, ionizing compound molecules like carbon dioxide into separate charged atoms such as positively charged carbon atoms and negatively charged oxygen atoms by an atmospheric pressure low temperature plasma. Exhaust gas containing $CO_2$ such as combustion exhaust gas from various engines as well as varying components of flue gas may be directly introduced into the system 17.

To accommodate exhaust gas or flue gas, for example, the parameters associated with the system 17, such as the material used for the dielectric layer 14, the applied voltage, or the thickness of the dielectric layers, among others, must be modified to effectively produce the plasma and break apart the molecules while also accommodating the increase in fluid temperature, fluid consistency, and/or fluid composition. Some exhaust gases can reach temperatures beyond the maximum long term operating temperatures of the materials in contact with the fluid, including the material of the dielectric layer 14 or that of the spacer 12, which would damage them or render them ineffective. These materials would require desirable parameters, like high maximum operating temperature, in order to accommodate high temperature exhaust gases rather than ambient air.

The system 17 illustrated in FIGS. 10, 12, 13, and 14, include, in order from the intake side 35, an ozone decomposition filter 30, an ultrasonic oscillation element 65, a plasma generator 10, a separation unit 21 (adsorption filter 27, first separation electrode 25 *a*, positive charge addition electrode 25 *c*, adsorption filter 27, and second separation electrode 25 *b*) as a separation unit 21, an ozone decomposition filter 30, an ozone sensor 40, and an electric fan 50. FIG. 12 simply shows a state in which these components are arranged along the flow path from the intake side 35 through to the outtake side 36. The system 17 can also be realized by arranging these components, for example, in a cylindrical housing.

The material used to bond the components to each other, including for example, the dielectric layer 14 to either of the plasma generator electrodes 16*a*, 16*b*, or even the side electrodes 219*a*, 219*b* to the spacer 12, would need to be temperature rated and can be any known related art or later developed apparatus or method of bonding, including but not limited to adhesive, epoxy, and glue. Embodiments are intended to include any mechanism of bonding, including by mechanical means, like rivets, bolts, or any other known related or later developed mechanical apparatus.

In some embodiments, heat may impact the dimensions of the gas decomposition system 17 or its individual components, including the plasma generator 10 or the separation unit 21. For example, the heat from the flue gas may cause some components to expand, known as thermal expansion. For some adhesives, it is known that a vertical expansion of 0.5 mm or more is possible, increasing the gap between the electrodes 16*a*, 16*b* of the plasma generator 10 substantially. There may be slight changes in design or dimensions in order to accommodate this thermal expansion. Increasing the plasma gap 15 by 0.5 mm or more may be beneficial for the plasma generator 10.

The plasma generator 10, and the separation unit 21, which are the main functions of the system 17, will be described below. The plasma generator 10 has a function of ionizing fluids/gases such as $CO_2$ into positively charged carbon atoms and negatively charged oxygen atoms. The separation unit 21 has a function of further separating the ionized carbon atoms and oxygen atoms to recover the carbon atoms as solid carbon through a collection device. The separation unit 21 may be a separate unit or may be combined with the plasma generator 10 to further separate carbon and oxygen molecules and collect carbon with a carbon collection device. The separation unit 21 may further be modified in configuration to include side electrodes that have a function of keeping the separated ionized carbon atoms and oxygen atoms separated to recover the carbon atoms as solid carbon through a collection device.

Once the ionized atoms have been diverted from the main flow, many different types of collection devices can be used to collect the ionized atoms, such as carbon ions. One example is a simple dry tank that accumulates the diverted carbon-rich gas (carbon particles) from the Separation Unit 21. Another more complex example is a wet tank where the diverted carbon rich gas comes in contact with some liquid that has an exceptional ability to dissolve carbon ions, thus holding them within the liquid solution for future processing.

A further example is that of an adsorption filter 17, where the carbon ions are adsorbed onto the material, which will then degrade over time and require replacement. A similar example is a carbon adhesion sheet 224, which can peel off carbon particles, but will also need to be replaced after degradation. A final example is that of a molecular sieve which will only allow molecules below a certain size to pass through. This may include a material that allows hydrogen and oxygen to pass through, but prevents carbon from doing so, allowing the carbon to collect. There may also be other molecular sieves that allow other molecules or different ratios of molecules to pass, but all would serve a similar final purpose of collecting certain molecules/atoms like carbon and passing through others. For example, zeolite may be used to allow carbon to pass through but prevent methane from passing through, serving a different but similar purpose.

The collection devices can be assisted in their function by introducing a catalyst to the fluid that would purposefully change the composition of the plasma. For example, water may be added to the fluid before entering the plasma generator 10, creating more hydrogen ions in the ionization process. This excess of hydrogen ions may then react with carbon ions to produce a greater of number of methane molecules. In the example of the molecular sieve, the methane may then be prevented from passing through and thus collected by the sieve.

1. Plasma Generator

Parameters described in this section refer to all plasma generators 10 in various embodiments of the Gas Decomposition System 17 and separation units 21.

In all embodiments of the Gas Decomposition System 17, including embodiments of the separation units 21 that have multiple plasma generators 10, untreated fluid 221 of multiple components, including $CO_2$, flows through the plasma generator 10, where the untreated fluid 221 is turned into a plasma by the plasma generator 10.

The plasma contains ionized molecules, or molecules that have a net electric charge be it negative or positive, and electrons. The electrons can impact the $CO_2$ molecules in the untreated fluid and impart their energy to the $CO_2$ molecules, increasing the vibrational, rotational, or electronic energies of the molecules. If the total amount of energy imparted to the $CO_2$ molecules is above the binding energy of the carbon-oxygen bonds in the molecules, the carbon dioxide can split into carbon ions 223 and oxygen ions 222, where the carbon ions 223 are mostly positively charged and the oxygen ions 222 are mostly negatively charged. The voltage may be increased to give the electrons enough energy to impact the $CO_2$ molecules and break the carbon oxygen bonds.

The plasma gap 15 can be increased or decreased to accommodate packing of catalyst particles. Other parameters that may need to be changed to accommodate packing of catalyst particles include the electrode gap, dielectric material, dielectric thickness, applied voltage, frequency of applied voltage, etc.

As previously discussed in the section describing the plasma generator in detail, a known contributor to the electron energy distribution function (EEDF) is the composition of the fluid between the dielectric layers. If the fluid to be treated is composed of significantly more carbon dioxide and water, and less nitrogen than ambient air, which is the case for the flue gas of coal power plants, the corresponding EEDF will change. Both carbon dioxide and water act to decrease the high energy tail of the EEDF, meaning there will be fewer electrons of high enough energy to separate carbon dioxide into carbon and oxygen ions. Because the Fluid Decomposition unit is meant to separate carbon dioxide into carbon and oxygen ions, it might be necessary to change some of the parameters of the plasma generator 10 to make the EEDF more beneficial for the separation of carbon dioxide.

In some embodiments, the electrodes 16*a*, 16*b* may be mirror-polished metal, including stainless steel.

In some embodiments, the plasma generator 10 may be assisted in its function by an ultraviolet emitter, which can help to ionize the fluid in the plasma gap and to possibly reduce the applied voltage required.

2. Separation Unit

Some of the disclosed embodiments combine the plasma generators with other apparatus to perform different functions. For example, some of the cold plasma generators discussed above are used to create ions from fluid (disposed in proximity to the cold plasma generator), and then to eject the ions to a separator. In some of these embodiments, the separator is configured to separate or further redirect the ions based on charge, i.e., negatively charged ions are redirected in one or multiple directions, and the positively charged ions are redirected to another or other multiple different directions that are different from the one or the multiple directions of the negatively charged ions.

Thus, some of the above embodiments relate to methods and apparatus for redirecting ions (such as based on their charge) that are generated upon communication with free radicals resulting from atmospheric pressure low temperature plasma. These embodiments are intended to include or otherwise cover any known, related art, or later developed technologies for separating the ions, for any known or later developed purpose, and based on any conceivable criteria including but not limited to polarity of the ions.

The redirected ions can be permanently separated with the use of a fluid separator or partition and collecting them in collecting the redirected ions in collection apparatus.

In some embodiments, the separation electrodes 219*a*, 219*b* may be mirror-polished metal, including stainless steel.

In some embodiments, the separation unit 21 can be assisted in its function by an ultrasonic oscillator 65. The ultrasonic waves can help to separate the decomposed molecules and impede or prevent them from combining with one another.

C. Variations of Embodiments

Various configurations of the separation unit 21 are disclosed herein purely for exemplary purposes. Some of these disclosed exemplary embodiments refer to the location and configuration of electrodes used to separate negatively and positively charged ions after the ionization of gases passing through the plasma generator 10. However, it is intended that the invention includes any and all known, related art, and later developed technologies to separate the negatively and positively charged ions for any known or later developed conceivable application, in fact, the embodiments are intended to include or otherwise cover separating the generated ions based on criteria other than their respective positive and negative charge.

In some embodiments, a separation unit 21 can be configured to be disposed downstream of a plasma generator 10 (see FIG. 11-FIG. 13). In some embodiments, a separation unit 21 may include separation electrodes 25*a*-25*c* that accelerate or decelerate charged atoms from compound molecules broken down after passing through the plasma generator 10. The separation electrodes 25*a*-25*c* can include two electrodes 25*a* and 25*b* that alternate between positive and negative charges, as well as a third electrode 25*c* that is consistently positive to repel and further slow down charged atoms such as carbon (C+) for collection and further separate from other perhaps negatively charged atoms like oxygen (O—) that will be propelled forward through the system 17 after interacting with the positively charged third separation electrode 25*c*. However, in other embodiments, the third electrode 25*c* can be configured or otherwise operated to be consistently negative, or even alternatively, to switch between positive and negative charges.

In some embodiments, side electrodes 219*a* and 219*b* are included as part of the separation unit 21. The side electrodes 219*a* and 219*b* may be positive, negative or alternating between charges and flank a plasma generator 10 that is also included in the separation unit 21 yet may also be disposed upstream or downstream of an additional plasma generator 10.

The different embodiments of the separation unit 21 and plasma generator 10 (as part of the system 17) can vary based on a number of structural differences, including but not limited to the configuration and number of the separation electrodes 25*a*, 25*b*, and 25*c*, the configuration and number of the side electrodes 219*a* and 219*b*, the position and number of plasma generators 10, etc. Additionally, plasma generators 10 within the separation unit 21 may be configured with different dielectric layer 14 materials, thickness and number of plasma gap 15 layers to adapt to different gases that may flow through the system 17, etc. In some embodiments, the separation unit 21 is disposed between the plasma generators 10.

As referenced in the Gas Decomposition section herein, the redirected ions can be collected by multiple types of collection devices. The relevant structures and methods of operation are discussed in detail therein.

1. Exemplary Embodiment 1

The separation unit 21 of this embodiment is described below with reference to FIGS. 10-16B. The separation unit 21 includes a first separation electrode 25*a*, a positive charge addition electrode 25*c*, and a second separation electrode 25*b*—in this order from the upstream side to the downstream side of the flow path. The first separation electrode 25*a* and the second separation electrode 25*b* are formed of a solid metal plate having a large number of slit-like openings, and from a conductive metal, such as, for example, stainless steel, aluminum, gold, silver, platinum, copper, or any other currently known, related art, or later developed material that facilitates the operation of the electrodes and/or of the overall apparatus.

The slit-like openings (slits) can be configured to facilitate airflow therethrough (or the flow of any other fluid, including but not limited to gases, liquids, slurries, etc.). The size, shape, and/or number of the slits can be based on application. However, it may be beneficial to configure the slits so as to be large enough and or spaced closely enough together (and/or otherwise configured, shaped, etc.) to enable, facilitate or enhance (such as for example in the context of efficiency) mixing of plasma and fluid. As one example, it may be beneficial for the slits to be large enough (not too small) or enough in quantity (too few) where efficiencies would be diminished such as would be caused by low airflow.

The first electrode 25*a* and the second electrode 25*b* can be formed of mesh conductive type materials similar to (or the same as) the materials used in solid form as described above. It may be beneficial for the size of mesh material used to be 100 mesh per inch. It may be beneficial to use a relatively small mesh size because it increases the efficiency of the plasma. However, it may also be beneficial for the mesh size to not be so small that it obstructs airflow or otherwise fails to enhance airflow.

Similarly to the first separation electrode 25*a* and the second separation electrode 25*b*, the positive charge addition electrode 25*c* can also be formed as a conductive metal or mesh plate having a relatively large number of slits. However, in some embodiments (such as those shown in FIG. 12), the positive charge addition electrode can be structurally different from the first separation electrode 25*a* and the second separation electrode 25*b*. For example, the positive charge addition electrode 25*c* can define a substantially U-shape in cross-section. In some of these embodiments, the substantially U-shaped cross-section is open (i.e., the concavity) at the upstream side of the flow path. However, not all embodiments include the U-shaped configuration of the positive charge addition electrode 25*c*, and embodiments are intended to include or otherwise cover any known, related art, or later developed configuration that facilitates or enhances the application or function at issue.

As shown in FIG. 13, an adsorption filter 27 can be provided at or on the upstream surfaces of the first separation electrode 25*a* and/or the second separation electrode 25*b*. In some embodiments, the adsorption filter 27 is configured to adsorb and/or recover the ionized carbon atoms as solid carbon. A HEPA (High Efficiency Particulate Air) filter can be included or otherwise used as the adsorption filter 27 to collect fine particles with high efficiency. A differential pressure sensor (not shown) may be provided at or on the adsorption filter 27 to measure the amount of solid carbon adsorbed at the adsorption filter 27. A replacement time of the adsorption filter 27 may be determined based on (or otherwise reported from) the pressure loss change caused by the adsorption of solid carbon.

In the first embodiment of the separation unit 21, gases (such as $CO_2$) are broken-up (ionized) by atmospheric pressure low temperature plasma into individual constituent atoms, such as positively charged carbon C+ and negatively charged oxygen O− after passing through the plasma generator 10. The inherent properties of C+ and O− ionized in the plasma generator 10 cause them to naturally readily recombine and return to a stable $CO_2$ molecule if not permanently separated. Therefore, some embodiments of the separation unit 21 can be configured such that C+ can be separated from O− and recovered as solid carbon by utilizing the difference in electric polarity between the ionized carbon atom and the oxygen atom.

The above example is provided in the context of the gas being $CO_2$. However, embodiments are intended to include or otherwise cover any possible gas. In fact, embodiments are intended to include or otherwise cover any fluid, including gases, liquids, slurries, etc.

As shown in FIGS. 12-14, embodiment 1 of the separation unit 21 has three separation electrodes 25*a*-25*c* that accelerate and decelerate C+ and O− to push O− through the system and slow C+ down to collect it for additional use. However, embodiments are intended to include or otherwise cover any number, structure, size, and/or order of separation electrodes 25*a*-25*c* to perform a designed application or function.

Figure 16A:
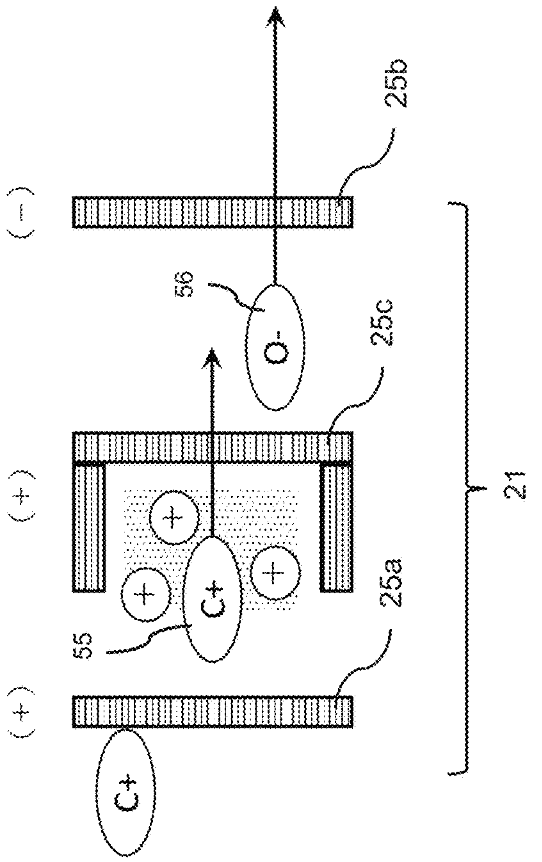
FIGS. 16*a* and 16*b* are schematics showing an exemplary operation of the separation unit 21 corresponding to FIG. 12.
Figure 16B:
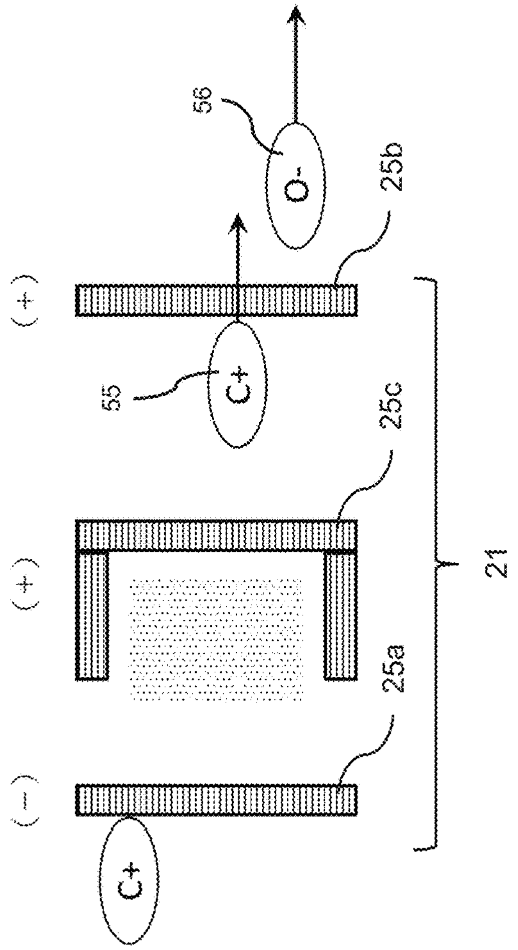
Figure 17A:
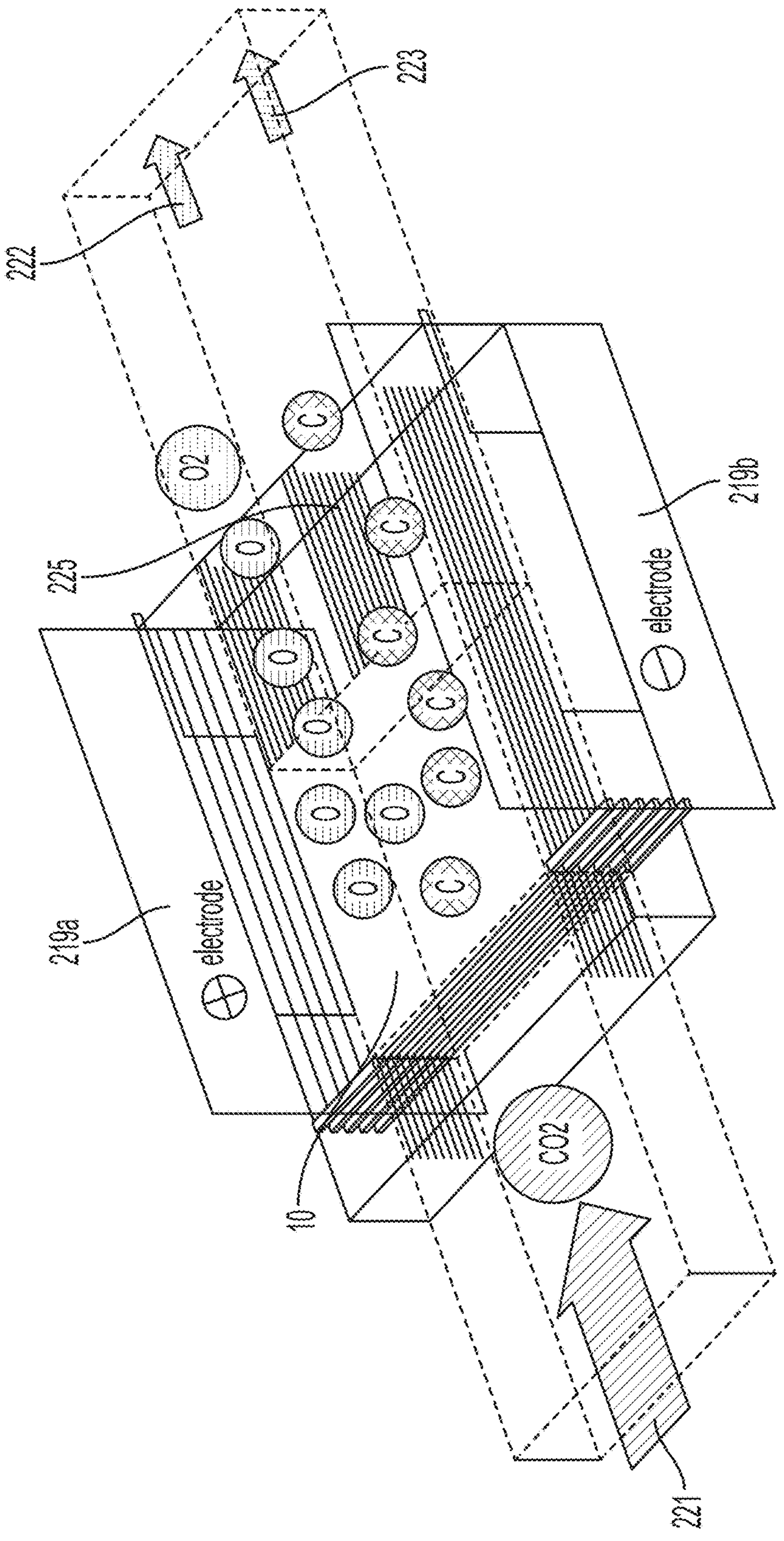
FIG. 17*a* is a schematic perspective view of an exemplary configuration of the Gas Decomposition system 17.

As shown in FIGS. 16A and 16B, a 5 kV AC voltage can be applied to the first separation electrode 25*a* to have a positive potential with respect to the ground (0 potential), and to the second separation electrode 25*b* so as to have a negative potential with respect to the ground. The speed of C+ moving downstream 55 from the plasma generator 10 is reduced by a repulsive force acting between the C+ and the first separation electrode 25*a* having a positive potential, and a certain percentage (in some embodiments fixed percentage) of the C+ is collected by an adsorption filter 27 provided at or on the first separation electrode 25*a*. The negatively charged O− is attracted by the positive potential of the first separation electrode 25*a*, whereas the speed of O− is accelerated 56 and is separated from C+ and passes through the first separation electrode 25*a*.

C+ that has passed through the adsorption filter 27 of the first separation electrode 25*a* without being collected enters a space surrounded by the positive charge addition electrode 25*c* and the first separation electrode 25*a*. The positive charge addition electrode 25*c* can be applied with a 5 kV AC voltage so as to have a positive potential with respect to the ground, and can serve to supply a positive charge to C+ that has partially lost a positive charge while passing through the first separation electrode 25*a*. After receiving the positive charge, C+ moves to the downstream side, through the positive charge addition electrode 25*c*, 55, while further decelerating such as based on the repulsive force from the positive charge addition electrode 25*c*. On the other hand, the O− that has passed through the first separation electrode 25*a* 56 is further accelerated by being attracted by the positive charge addition electrode 25*c* and moves downstream through the slit of the positive charge addition electrode 25*c* (see FIG. 14A).

Embodiments are intended to include or otherwise cover electrodes 25*a*-25*c* that are configured to perform a certain operation, such as those separation operations disclosed above, based upon receipt of a certain voltage. In some embodiments, it may be beneficial to supply the electrodes 25*a*-25*c* with a voltage ranging from approximately 5 kV to 9 kV AC. However, in some of these embodiments, it may be especially beneficial to supply the electrodes 25*a*-25*c* with approximately 5 kV AC voltage.

In some embodiments, the above voltage(s) are applied to the second separation electrode 25*b* so as to be a negative potential if the first separation electrode 25*a* is a positive potential. However, the second separation electrode 25*b* can be a positive potential at a constant cycle in order to collect C+ passing through the positive charge addition electrode 25*c* (See FIG. 16*b*). The second separation electrode 25*b*, having a positive potential, applies a repulsive force to the moving C+ to decelerate, thereby facilitating adsorption of C+ to the adsorption filter 27 on the surface of the second separation electrode 25*b*. Thus, C+ can be efficiently recovered by both the first separation electrode 25*a* and the second separation electrode 25*b*.

Embodiments are intended to include or otherwise cover any switching cycle of the first and second separation electrodes 25*a*, 25*b* to perform the desired function. However, in some embodiments, it may be beneficial for the switching cycle of the first and second separation electrodes 25*a*, 25*b* to be approximately 10-20 Hz. As the switching occurs, the frequency changes, however in some embodiments the amount of charge is not critical to the separation or operation of the apparatus. In some embodiments, it may be beneficial to use relatively low voltage so as to enhance steadiness of the frequency.

In some embodiments, the switching between negative or positive charge on the second separation electrode 25*b* (and/or of the first separation electrode 25*a*) can be accomplished by preparing a positive power supply and a negative power supply that are automatically switched. The switching circuit 136 shown in FIG. 13 can be provided such that the electrical flow (polarity) consistently switches at a predetermined rate. However, embodiments are intended to include or otherwise cover any known, later developed, and/or later developed apparatus or method for switching the charge of the above electrodes.

Figure 15:
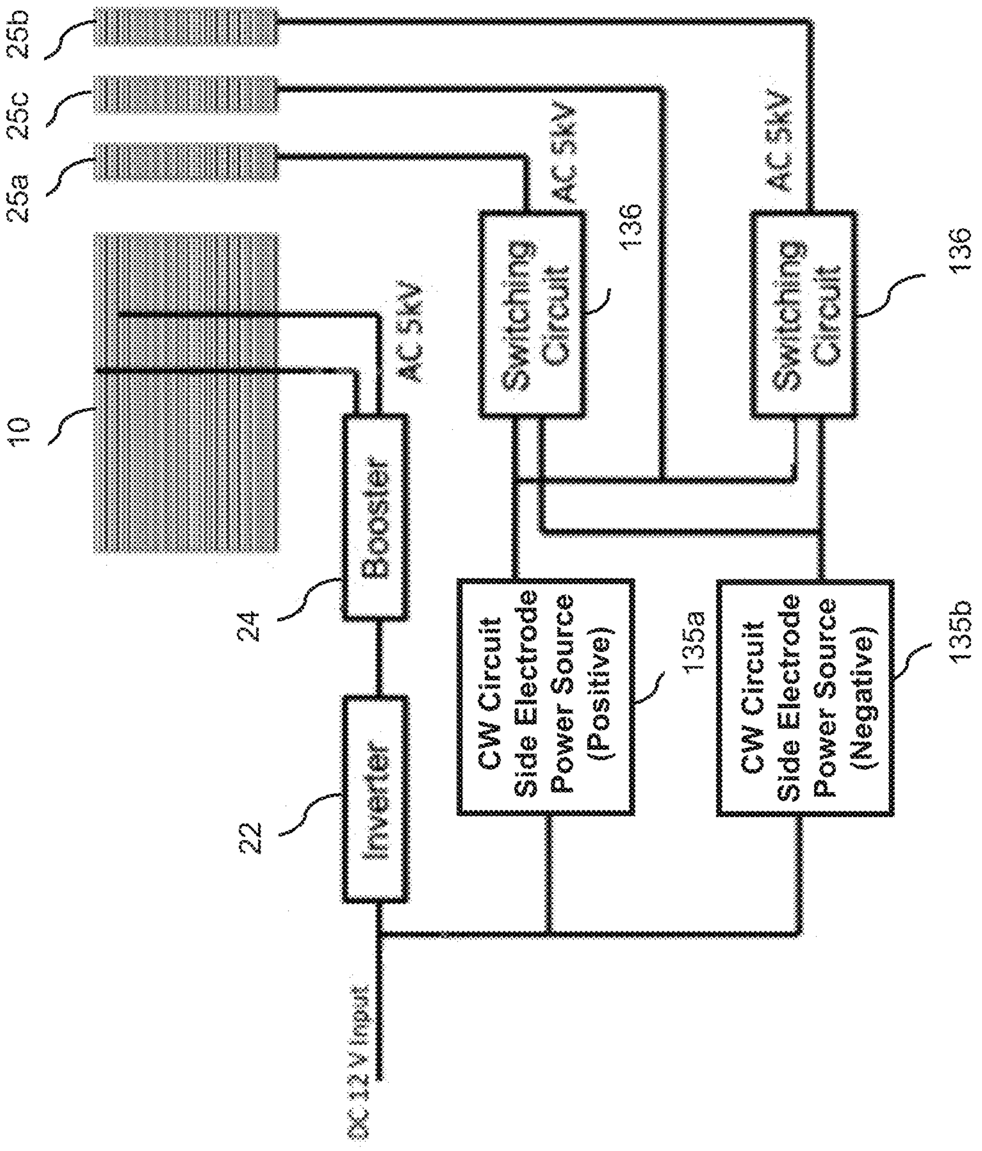
FIG. 15 is a schematic of an exemplary control circuit for the Gas Decomposition system 17 corresponding to FIG. 12.

The operation of the separation unit 21 is schematically shown in FIGS. 16*a* and 16*b*. As shown in FIG. 15, the two switching circuits 136 are 180 degrees out of phase, meaning that if one separation electrode is at a high positive voltage, then the other is at a high negative voltage and vice versa.

FIG. 16*a* shows the first case, where the first separation electrode 25*a* is at a high positive voltage and the second separation electrode 25*b* is at a high negative voltage. FIG. 16*b* shows the second case, where the first separation electrode 25*a* is at a high negative voltage and the second separation electrode 25*b* is at a high positive voltage. As shown in FIG. 15, the positive addition electrode 25*c* is connected to a high voltage DC source, staying at the same positive high voltage.

However, other embodiments include other operations of the separation unit 21, such as controlled by alternatives to the two switching circuits 136 discussed above.

2. Circuit for Exemplary Embodiment 1

FIG. 15 shows the circuital connections of the electrodes 16*a*, 16*b* in the plasma generator 10, and the electrodes 25*a*, 25*b*, and 25*c* of the separating unit 21. The DC 12 V input (shown at the left of FIG. 15) connects (directly or indirectly) to the plasma power supply unit 20 (as previously described), and the two Cockcroft Walton (CW) generators 135*a* and 135*b*. The above generates a high DC voltage from a low-voltage AC or pulsing DC input.

In some embodiments, the above circuits handle voltage ranging from approximately 12V-200V. In some embodiments, a voltage increase is accomplished at small intervals of 2× each. In some embodiments, it may be beneficial for DC 12V input to be multiplied to a voltage of DC 5 kV. However, embodiments are intended to include or otherwise cover other voltages and voltage ranges other than those discussed above.

In some embodiments, both CW generators are connected to two switching circuits 136. One switching circuit can be connected to the first separation electrode 25*a*, and the other switching circuit can be connected to the second separation electrode 25*b*. The switching circuit 136 can be configure to enable the electrical flow (polarity) to switch at a predetermined rate (such as to provide consistent switching).

In some embodiments, it may be advantageous for the frequency to be approximately 10-20 Hz. In some embodiments, it may be beneficial for the output of the switching circuits to the separation electrodes to be approximately DC 5 kV.

In some embodiments, it may be beneficial for the two switching circuits 136 to be 180 degrees out of phase, meaning that if one separation electrode 25*a* or 25*b* is at a relatively high positive voltage, then the other is at a relatively high negative voltage. The switching circuits 136 may include one or more high voltage relays, and/or other circuits configured to generate a high voltage alternating current from one or more high voltage DC currents.

In some embodiments, the positive charge addition electrode 25*c* can be directly connected to the high voltage positive CW generator, holding it at a constant positive high voltage of approximately DC 5 kV. Altogether, the separation electrodes 25*a* and 25*b* enact electric forces to separate positively charged carbon (C+) and negatively charged oxygen (O—) ions into alternating bunches, and push or otherwise direct them through the separation unit 21. The constant positive addition electrode 25*c* enacts a constant electric force to inhibit C+ ions from moving through the separation unit 21 and to allow the ions to be captured.

According to some of the embodiments of the separation unit 21, the solid carbon can be efficiently recovered while separating the ionized carbon atoms and the oxygen atoms in the plasma generator 10 to reduce, impede, or in some cases prevent recombination. In some embodiments, the adsorption filters 27 operate as a carbon collection device.

Embodiments are intended to cover or otherwise include any apparatus or methods for using the recovered solid carbon. In some embodiments, it may be beneficial for the recovered solid carbon to be used as a raw material for producing a highly functional material, such as carbon nanofiber.

3. Exemplary Embodiment 2

Figure 17B:
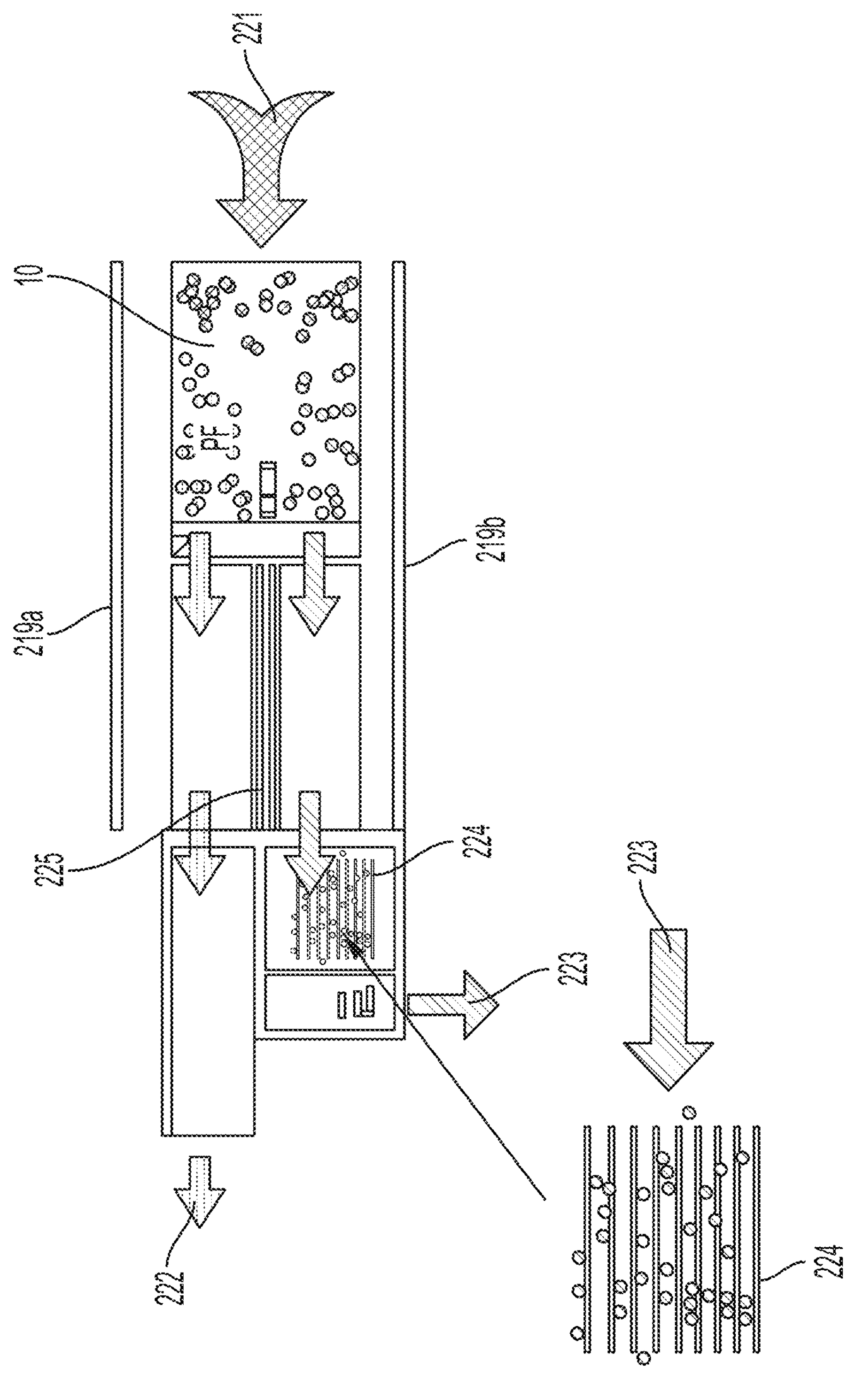
FIG. 17*b* is a top plan view of the exemplary configuration of the Gas Decomposition system 17 corresponding to FIG. 17*a*.
Figure 18:
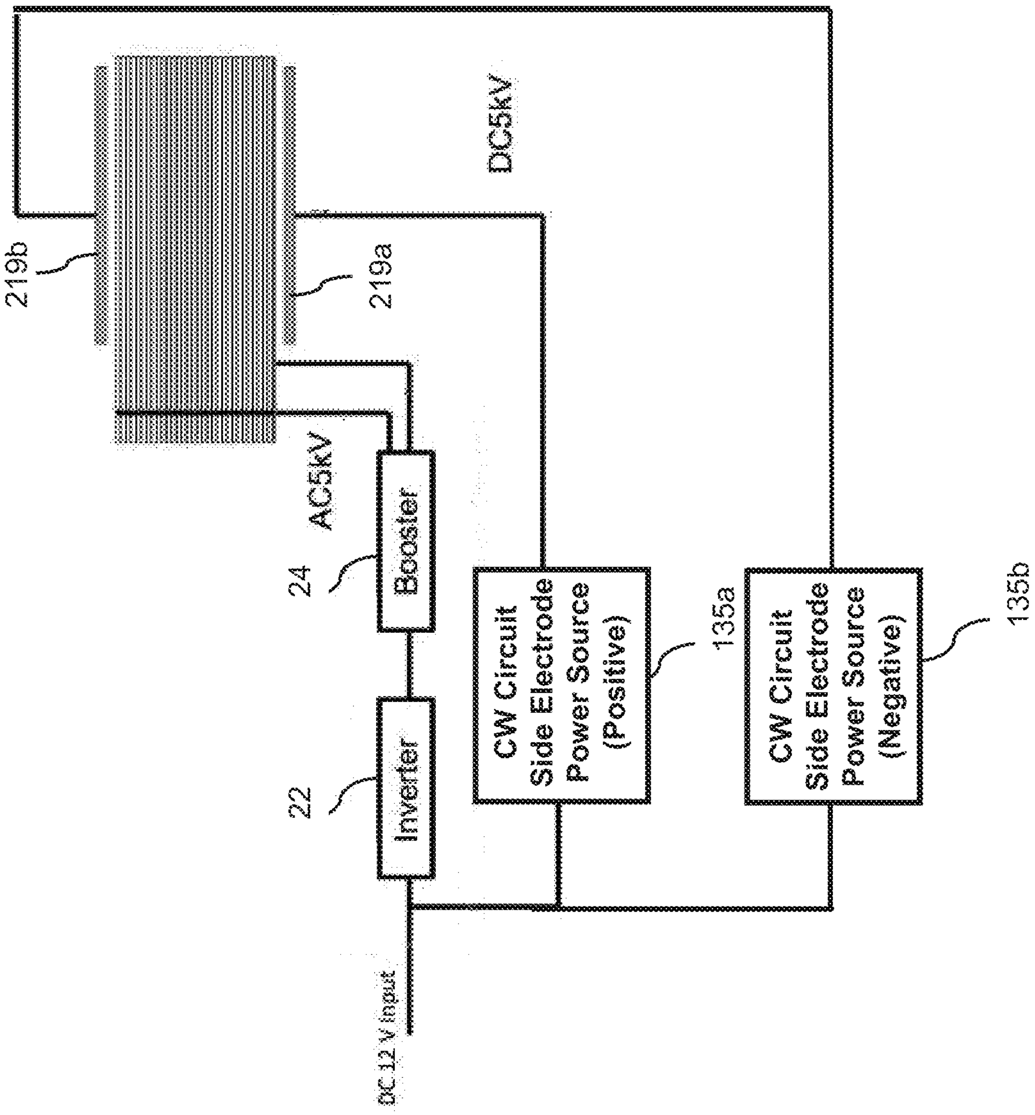
FIG. 18 is a schematic of an exemplary control circuit for the Gas Decomposition system 17 corresponding to FIG. 17*a*.

An exemplary second embodiment of the separation unit 21 is shown in FIG. 17*a*, FIG. 17*b*, and FIG. 18. A pair of side electrodes, one at a high positive voltage 219*a* and the other at a high negative voltage 219*b*, flank the plasma generator 10, and are positioned on opposite or opposing sides of the plasma generator 10.

The pair of side electrodes 219*a* and 219*b* can be configured to create a strong uniform electric field in a direction extending from 219*b* to 219*a*. The electric field can interact with positive and negative charges oppositely. The positively charged carbon ions 223 will be subject to an electric force pulling in the direction of the side electrode held at a high negative voltage 219*b*. The negatively charged oxygen ions 222 will be subject to an electric force pulling in the direction of the side electrode held at a high positive voltage 219*a*.

The side electrodes 219*a* and 219*b* can be formed from solid conductive metal (aluminum, stainless steel, etc.), similar to the material(s) used to form the electrodes 16*a* and 16*b* of the plasma generator 10. The metal side electrodes 219*a* and 219*b* can be adhered to borosilicate glass or material(s) similar to those of the dielectric layer 14 of electrodes 16*a* and 16*b*. However, embodiments are intended to include or otherwise cover these elements being formed of any known, related art, or later developed material to perform any desired function.

In some embodiments, it may be beneficial for the size of the side electrodes 219*a* and 219*b* to be based on the size of the plasma generator 10. As previously disclosed, the size of the plasma generator 10 can be based on application or use.

Two different sized of the plasma generator 10 are disclosed above. For example, one disclosed exemplary plasma generator has electrodes with a size of 6 cm×9 cm and an overall size of 9 cm×15 cm to accommodate for standard creepage. In this example, the corresponding side electrode size is 1.7 cm×9 cm with the overall size being 4.7 cm×15 cm. In another embodiment, the plasma generator 10 has electrodes with a size of 30 cm×30 cm and an overall size of 50 cm×50 cm. In this embodiment, the corresponding side electrode size are 8.6 cm×29 cm and an overall size of 28.6 cm×50 cm. However, embodiments are intended to include or otherwise cover plasma generators of any size, and in particular those having any sized electrodes.

In some embodiments, the side electrodes 219*a* and 219*b* flank either side of the plasma generator 10. In some of these embodiments, the side electrodes do not come into direct contact with the plasma generated in the plasma generator 10, which may be beneficial because the creepage area around the electrodes 16*a* and 16*b* separate them. The applied voltage and frequency used for the side electrodes are described in detail below in the circuit section.

The fluid, which can include carbon ions 223 and oxygen ions 222, flows through the plasma generator 10. The electric forces caused by the side electrodes 219*a* and 219*b* will pull the carbon ions 223 onto the same side of the plasma generator 10 as the negative voltage side electrode 219*b*, and the oxygen ions 222 onto the same side of the plasma generator 10 as the positive voltage side electrode 219*a*.

The fluid exiting the plasma generator 10 can enter the regions between the fluid separator 225 and the side electrode 219*a*, 219*b*. The fluid separator 225 may also slightly overlap the region of the plasma generator 10. One end of the fluid separator 225 is disposed at the point where the dielectric layer 14 and electrode 16*a* and 16*b* of each plasma generating layer of the plasma generator 10 exists, and extents along the length of the plasma generator 10 including the creepage area.

The fluid separator 225 can be configured to be permanently affixed in the current embodiment, but in alternative embodiments can be configured to be removably attached to the overall structure. Some embodiments can include multiple groves within the creepage area, equal or substantially equal to the width and length of the fluid separator 225 to allow for beneficial placement of the fluid separator 225. This movement of the fluid separator 225 allows for flexibility of use for molecules separated in a particular application. The fluid separator 225 can be formed of any known, related art, or later developed insulating material similar to that of the dielectric layer 14 of the plasma generator 10, or any other similar material that operates for the function discussed above.

Because the carbon ions 223 are pulled toward the negative voltage side electrode 219*b*, the carbon ions 223 will enter the space between the fluid separator 225 and the negative voltage side electrode 219*b* as they exit the plasma generator 10. Similarly, the oxygen ions 222 are pulled toward the positive voltage side electrode 219*a*, and will enter the space between the fluid separator 225 and the positive voltage side electrode 219*a*. Thus, the carbon ions 223 and the oxygen ions 222 are thereby separated into two separate flows exiting the device.

As shown in FIG. 17*b*, the carbon ions 223 can be redirected to flow through one or multiple carbon collection device that includes carbon adhesion sheets 224 or any other known, related art, or later developed apparatus or method. In some embodiments, the carbon adhesion sheets 224 are configured to peel off carbon particles.

However, other embodiments cover or otherwise include alternative structures and materials that are usable to collect carbon. For example, a magnesium alloy catalyst used as a coating on top of the metal of the carbon adhesion sheets 224 can be used to capture carbon. The carbon ions 223 may also or alternatively be redirected to any carbon collection device that accumulates carbon and maintains the carbon in a designated space, and such structures include any of the previously described types of collection devices. For example, the ions can also be collected by dry or wet tanks or other holding devices.

4. Circuit for Exemplary Embodiment 2

FIG. 18 shows the configuration of an exemplary control circuit used to power the separation unit 21 of embodiment 2. In some embodiments, a 12V DC input connects directly or indirectly to the plasma power supply 20 (as previously described), and to the CW Circuits 135*a* and 135*b*. In some embodiments, the inverter 22 can then be connected to the booster 24, which outputs AC 5 kV to the electrodes of the plasma generator 10. The output of 5 kV is intended to be exemplary, with beneficial results between 500V and 15 kV. In some embodiments, the frequency of the voltage output from the booster 24 can be modified by an additional circuit element between the booster 24 and the electrodes 16*a*, 16*b*. The output to the side electrodes of the separation unit 21 may need to be increased in order to accommodate the creepage around the electrodes of the plasma generator 10.

In some embodiments, the CW circuits 135*a* and 135*b* are Cockcroft-Walton generators, which can operate as multipliers. These structures can generate a high DC voltage from a low-voltage AC or pulsing DC input. In some embodiments, these circuits can be configured to handle voltage ranging from approximately 12V-200V. In some embodiments, a voltage increase is accomplished at small intervals of 2× each. In some embodiments, DC circuits can create higher voltages relatively quickly or instantly to enable usage of such smaller circuits. In some embodiments, DC 12V input is multiplied to DC 5 kV, which may be beneficial.

In some embodiments, one CW generator 135*a* is configured to multiply the input DC 12V to a positive DC 5 kV, which is then connected to the positive high voltage side electrode 219*a*. The other CW generator 135*b* multiplies the input DC 12V to a negative DC 5 kV, which is then connected to the negative high voltage side electrode 219*b*.

5. Exemplary Embodiment 3

An exemplary third embodiment is disclosed herein, which is similar to the second embodiment. The exemplary third embodiment is also disclosed herein as part of a larger and more complete exemplary system that includes monitors or sensors and collection devices, which are described below.

FIG. 19 shows the top cover 200 of embodiment 3. Exemplary embodiments are intended to includes or otherwise cover the top cover 200 having any size and being formed of any material that operates for the purpose disclosed below. In some embodiments, the top cover 200 is approximately 5 mm thick and formed of clear or substantially clear acrylic (but it can also be opaque, for example).

In some embodiments, the fluid to be treated flows into the device through the hazardous substance input hole with rubber cap 211 and into one or more plasma generator(s) 207 through the pre filter 206, which is held by the pre filter rack 210, and the acrylic housing 208 for the plasma generator(s) 207. The plasma generator(s) 207 disclosed herein can be the same as the plasma generator 10 (previously described).

The fluid entering the plasma generator 207 can pass the circulation duct hole 212, which can be covered by a duct hole lid 209. The fluid also passes a multi-sensor 213 that can be configured to identify and/or measure the presence of a multitude of specific gases or other substances in any fluid state, including but not limited to carbon dioxide ($CO_2$), carbon monoxide (CO), and ozone ($O_3$).

The results of the measurements can be displayed on an external display panel 214, as well as results from other sensor measurements. An exemplary configuration of the control panel 214 is shown in FIG. 19, including many of an exemplary panel element 220. Alternatively, or in addition, the results can be transmitted remotely for remote usages.

In some embodiments, the fluid that flows past through the prefilter 206 passes a nano-level water vapor injector 217 that injects nanometer-scale drops of water vapor into the stream of fluid entering the plasma generator(s) 207. The plasma generator(s) 207 turns the stream of fluid, that now includes the untreated fluid from the hazardous substance input hole 211 as well as the water vapor from the nano-level water vapor injector 217, into the plasma gap region within the plasma generator 207.

The plasma allows for carbon dioxide to be ionized, forming carbon (C+) and oxygen (O—) ions. A spacer 218 can be provided to separate the plasma generator(s) 207 from an ion exchange membrane 204. The ions then pass through the ion exchange membrane 204, allowing some ions to pass through and others to be captured or prevented from passing. Another nano-level water vapor injector 217 may be added, and it may inject more nanometer-scale drops of water vapor into the stream of fluid before entering the separation unit 205.

The fluid then continues into the separation unit 205, where the fluid is kept in a plasma state, with the addition of the side electrodes 219*a*, 219*b*, that create a strong electric field to separate C+ ions from O− ions. The side electrodes 219*a*, 219*b* can be connected to the same voltage supplies, constructed from the same materials, and work the same or a similar way as the side electrodes 219*a* and 219*b* of embodiment 2 disclosed above. The fluid separator 225 is not pictured but is implied to be inside of the separation unit 205 at the marked location. The action of the fluid separator 225 is the same as described in embodiment 2, but is explained in further detail below in the description of FIG. 20.

In some embodiments, the fluid continues through another ion exchange membrane 204, and through an ozonolysis filter 202 that captures and filters out some or all of hazardous $O_3$ from the system. The ozonolysis filter rack 203 can be configured to be disposed upstream of the filter 202 and to structurally hold the filter 202 in place.

In some embodiments, the treated fluid passes another multi-sensor 213 that measures the presence of a multitude of specific gases (or substances in any form) in the treated fluid, such as for example carbon dioxide ($CO_2$), carbon monoxide (CO), and ozone ($O_3$). The results of the measurements can be displayed on an external display panel 214, as well as results from other sensor measurements, and can be transmitted for remote usages.

In some embodiments, the treated and measured fluid flows out of the device through the post-treatment air collection holes, one with a rubber cap 201*b* and one without 201*a* (these can both be capped or uncapped). All of the above components (except for the external display panel 214) can be encased within a rectangular prism shaped top cover 200 of height L8×width L1×length.

This rectangular volume can be disposed at or on top of a right trapezoidal prism shaped lower storage box 215 where the height is L9, the bottom width is L4, the top width is L3. The external display panels 214 can be disposed at or on the exterior of the slanted surface of the prism as shown. The trapezoidal prism can be configured to encase a transformer 216, which can be used as a booster 24 for the plasma power supply unit 20, as previously shown in FIG. 18. The height from the top of the trapezoidal prism to the top of the rectangular prism is L6, the height from the top of the trapezoidal prism to the floor is L7, and the overall height from the floor to the top of the rectangular prism is L5. The width of the frame that fixes the rectangular prism to the top of the trapezoidal prism is L2.

In some embodiments, L1 can range from 190 mm to 210 mm, but it is especially beneficial for the value to be 200 mm. In some embodiments, L2 can range from 200 mm to 220 mm, but it is especially beneficial for the value to be 210 mm. In some embodiments, L3 can range from 250 mm to 270 mm, but it is especially beneficial for the value to be 260 mm. In some embodiments, L4 can range from 360 mm to 380 mm, but it is especially beneficial for the value to be 370 mm. In some embodiments, L can range from 390 mm to 420 mm, but it is especially beneficial for the value to be 406 mm. In some embodiments, L6 can range from 200 mm to 220 mm, but it is especially beneficial for the value to be 210 mm. In some embodiments, L7 can range from 190 mm to 210 mm, but it is especially beneficial for the value to be 198 mm. In some embodiments, L8 can range from 190 mm to 210 mm, but it is especially beneficial for the value to be 200 mm. In some embodiments, L9 can range from 170 mm to 190 mm, but it is especially beneficial for the value to be 180 mm.

FIG. 20 shows an exemplary operation of the separation unit 205 in more detail. In some embodiments, untreated fluid 221 flows into a plasma generator 10, where the untreated fluid is turned into a plasma, or a combination of ionized molecules and atoms. The side electrodes 219*a* and 219*b*, one connected to a positive voltage 219*a* and the other connected to a negative voltage 219*b*, can create a strong electric field that causes the oppositely charged ions to move in different directions; the C+ ions 223 will be attracted towards the negative voltage side electrode 219 and the O− ions 222 will be attracted towards the positive voltage side electrode 219. As both types of ions move towards the outlet of the separation unit 205, they encounter a fluid separator 225, which serves the same purpose as the fluid separator 225 as disclosed in embodiment 2. As the ions pass the fluid separator 225, the ions are physically impeded or even prevented from recombining and will thus remain separated.

The fluid separator 225 can be configured to be permanently affixed in the current embodiment, but in alternative embodiments can be configured to be removably attached to the overall structure. Some embodiments can include multiple groves within the creepage area, equal or substantially equal to the width and length of the fluid separator 225 to allow for beneficial placement of the fluid separator 225. This movement of the fluid separator 225 allows for flexibility of use for molecules separated in a particular application. The fluid separator 225 can be formed of any known, related art, or later developed insulating material similar to that of the dielectric layer 14 of the plasma generator 10, or any other similar material that operates for the function discussed above.

In some embodiments, the fluid then exits the separation unit 205 and flows through an ion exchange membrane 204, which impedes or even prevents the positively charged carbon ions 223 from flowing through, but allows the negatively charged oxygen ions 222 to flow through. In this way, carbon dioxide can be separated into carbon and oxygen ions, and the carbon ions can be extracted from the fluid. The redirected ions can also be collected by dry or wet tanks or other collection devices and methods.

The circuitry for Embodiment 3 is referenced in FIG. 18. The transformer 16 in FIG. 19 can act as the booster 24 for the plasma power supply 20.

6. Exemplary Embodiment 4

The fourth embodiment includes a combination of the structures of the second embodiment, but may differ in configuration, parameters, or in other ways. However, in some embodiments, the mechanism of separation is the same as described in embodiment 2.

Figure 21:
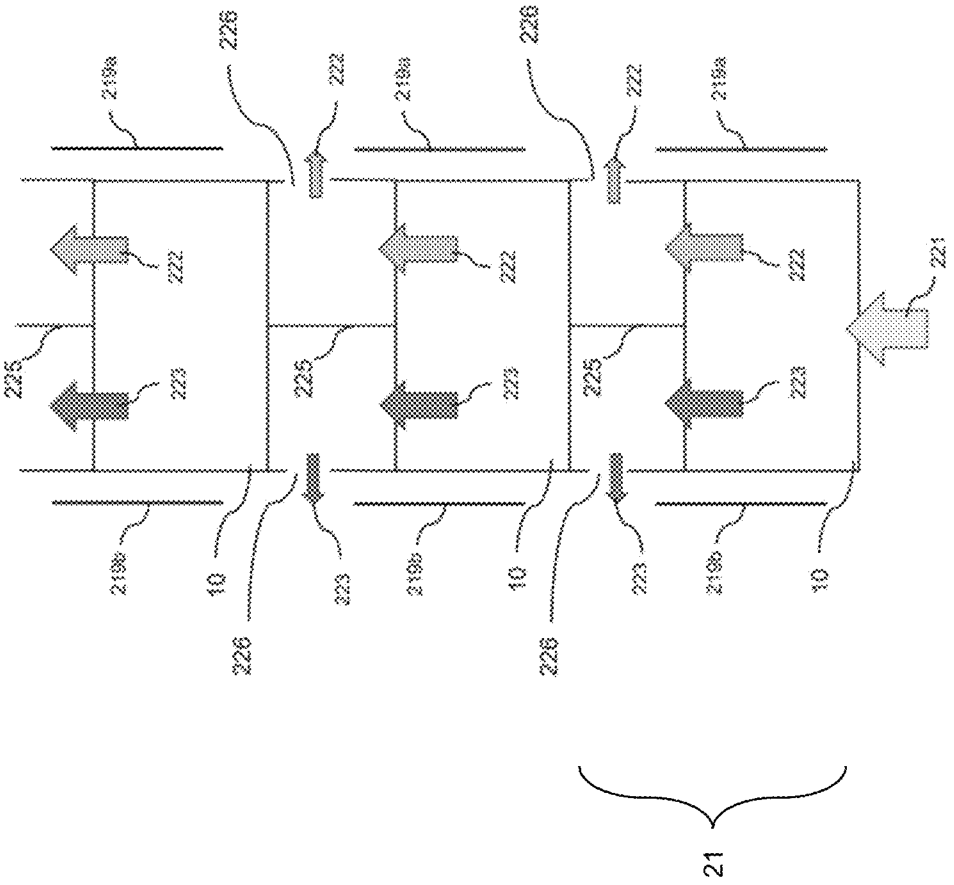
FIG. 21 is a top plan view showing an exemplary operation of an exemplary configuration of the Gas Decomposition system 17.

FIG. 21 shows an exemplary fourth embodiment of the separation unit 21. The untreated fluid 221 flows into a plasma generator 10, included as part of an exemplary configuration of the separation unit 21, where the molecules of the fluid are ionized and energized by free electrons, allowing for the decomposition of carbon dioxide into carbon ions 223 and oxygen ions 222. As in the second embodiment, the positive voltage side electrode 219*a* and the negative voltage side electrode 219*b* create a strong uniform electric field that pulls the carbon ions 223 towards the negative voltage side electrode 219*b* and the oxygen ions 222 toward the positive voltage side electrode 219*a*. Thus, as both ion species flow out of the plasma generator 10, they are separated into two streams, and the fluid separator 225 impedes or prevents them from recombining, effectively keeping them separated after they have passed through the plasma generator 10 and the side electrodes 219*a* and 219*b*.

Once the separated species flow past the side electrodes, they can be individually redirected out of the device through holes 226 in the side of the device. The positional configuration of the holes 226 in this embodiment is merely provided for exemplary purposes, and the holes 226 can alternatively be disposed in other areas, such as at the top or bottom of the device. The carbon ions 223 and oxygen ions 222 are then able to flow out of the device separately.

The neutral species (including carbon dioxide that was not decomposed by the plasma generator 10) as well as carbon and oxygen ions that were not able to be removed by the holes 226, continue to flow to another plasma generator 10, where the separation and removal process is repeated. FIG. 21 shows three sets of plasma generators 10, and components of the separation unit 21, including side electrodes 219*a* and 219*b*, fluid separator 225, and holes 226, although embodiments are intended to include or otherwise cover any number of these structures.

The parameters of each set of plasma generators 10, side electrodes 219*a* and 219*b*, the applied voltage to d=side electrodes 219*a*, 219*b*, fluid separator 225, and holes 226, can also vary within the same embodiment. For example, in some embodiments, the voltage to the first pair of side electrodes may be +5 kV and −5 kV, while for the second pair the voltage might be +6 kV and −6 kV. Any other parameters can vary, including but not limited to dielectric material, dielectric thickness, fluid separator material, and plasma power supply output voltage, for example.

Circuitry for Embodiment 4 is referenced in FIG. 18 and can be used to power a single separation unit 21.

V. High Volume Fluid Decomposition System

A. Applications

Greenhouse gases emitted from various social infrastructures, such as power plants, industrial product manufacturing plants, and various transportation systems, are a cause of global warming, and the reduction of greenhouse gases as much as possible is an urgent social issue. In particular, carbon dioxide ($CO_2$) generated from the combustion of fossil fuels is a major component of greenhouse gases, and it would be beneficial to reduce or suppress the generation of $CO_2$ and to remove some or all of the generated $CO_2$ from the environment.

Some embodiments of the disclosed High Volume Fluid Decomposition System 700 (hereinafter may be referred to simply as "system" 700), intake gaseous fluid from industrial plants like coal plants, gas plants, utility plants, cement manufacturing plants, etc. In some of these embodiments, the gaseous fluid includes carbon dioxide, and the system ionizes compound molecules into their separate charged atoms, such as into a positively charged carbon atom and negatively charged oxygen atoms by bringing carbon dioxide into contact with an atmospheric pressure low ion temperature plasma (i.e., cold plasma). In the described technology, side electrodes will separate charged atoms for collection by catalyst, tanks, carbon adhesion sheets, ion exchange membranes, molecular sieves, electrostatic precipitator, electrochemical, or other apparatuses as purified molecules that are either collected or exit the system.

Some of the embodiments are especially beneficial for high volume applications. However, embodiments include and are intended to cover many other types of applications beyond those disclosed above. In fact, although the system is characterized as a "High Volume Fluid Decomposition System," it is intended to cover applications and contexts that constitute low volume and/or medium volume usages.

Some of the disclosed High Volume Fluid Decomposition Systems constitute a gas treatment method for industrial or manufacturing plants that release mixed noxious gases into the atmosphere, with the purpose of enabling continuous or substantially continuous decomposition, sequestrations and/or removal of gaseous fluids or particles, such as CO2, other greenhouse gases, and oxygenates. Some of these embodiments include simple and commercially producible configurations.

A wide range of industrial or manufacturing plants and related noxious gases exist. Thus, various parameters of the Plasma Generator 10 and separation unit 21, which may include a plasma generator 10, within the High Volume Fluid Decomposition System, are disclosed herein as being considered to efficiently take in such gases and decompose molecules. Exemplary parameters include consistency of the noxious gas, temperature of the fluid entering the system, existing chemical and physical make-up of the gas entering the system, etc. These factors may cause the materials and structures that form the system to be modified to handle various temperature ranges, increase(s) in applied and plasma voltage, collection of specific particles, etc.

Hereinafter, carbon dioxide ($CO_2$) emitted from an industrial power plant is used as an example of a gas that can be broken down, sequestered, removed and/or treated using the disclosed High Volume Fluid Decomposition System technology. However, the disclosed technology is not limited to $CO_2$, and instead can be applied to other gases including greenhouses gases such as for example methane ($CH_4$), nitrous oxide ($N_2O$), fluorinated gases, etc. Moreover, the temperature of the exhaust gas containing $CO_2$ entering the High Volume Fluid Decomposition System 700 can range anywhere from relatively low temperatures of 100 degrees Celsius to approximately 500 degrees Celsius for normal cases. Extreme temperatures as discussed herein are those above 500 degrees Celsius. The various range of temperatures can be based on the direct exhaust gas output from the industrial power plant itself, or due to cooling apparatus adding to cool the exhaust gas before it enters the High Volume Fluid Decomposition System 700.

B. Detailed Explanation

The following disclosure focuses on various embodiments of a High Volume Fluid Decomposition System 700. This technology is disclosed in the context of use in fossil-fuel, coal plants, gas plants, and similar applications including those that use less or even small amounts of fluids. It is also intended that the embodiments cover use with any fluid, including but not limited to gases, liquids, slurries, etc.

In other words, the embodiments can be used in any industrial, manufacturing, and other processes involving fluids at any conceivable temperatures, fluid mixtures, physical and chemical makeup of the fluids entering the system 700. In situations where the fluids are at extreme temperatures, some embodiments cool the fluids before entering the High Volume Fluid Decomposition System 700 by including additional apparatus and methods to the system 700. In some of these embodiments, this cooling can be achieved by a heat exchanger or by any known, related art, or later developed apparatus for cooling fluids.

Some of the embodiments that add the cooling system do not require further modifications to the High Volume Fluid Decomposition System 700, while other embodiments that add cooling do modify other aspects of the High Volume Fluid Decomposition System 700. In situations where gas is at extreme temperatures that cannot be cooled before entering the High Volume Fluid Decomposition System 700, the materials that comprise the various components of the High Volume Fluid Decomposition System 700 can be changed to withstand the higher temperatures.

Figure 22:
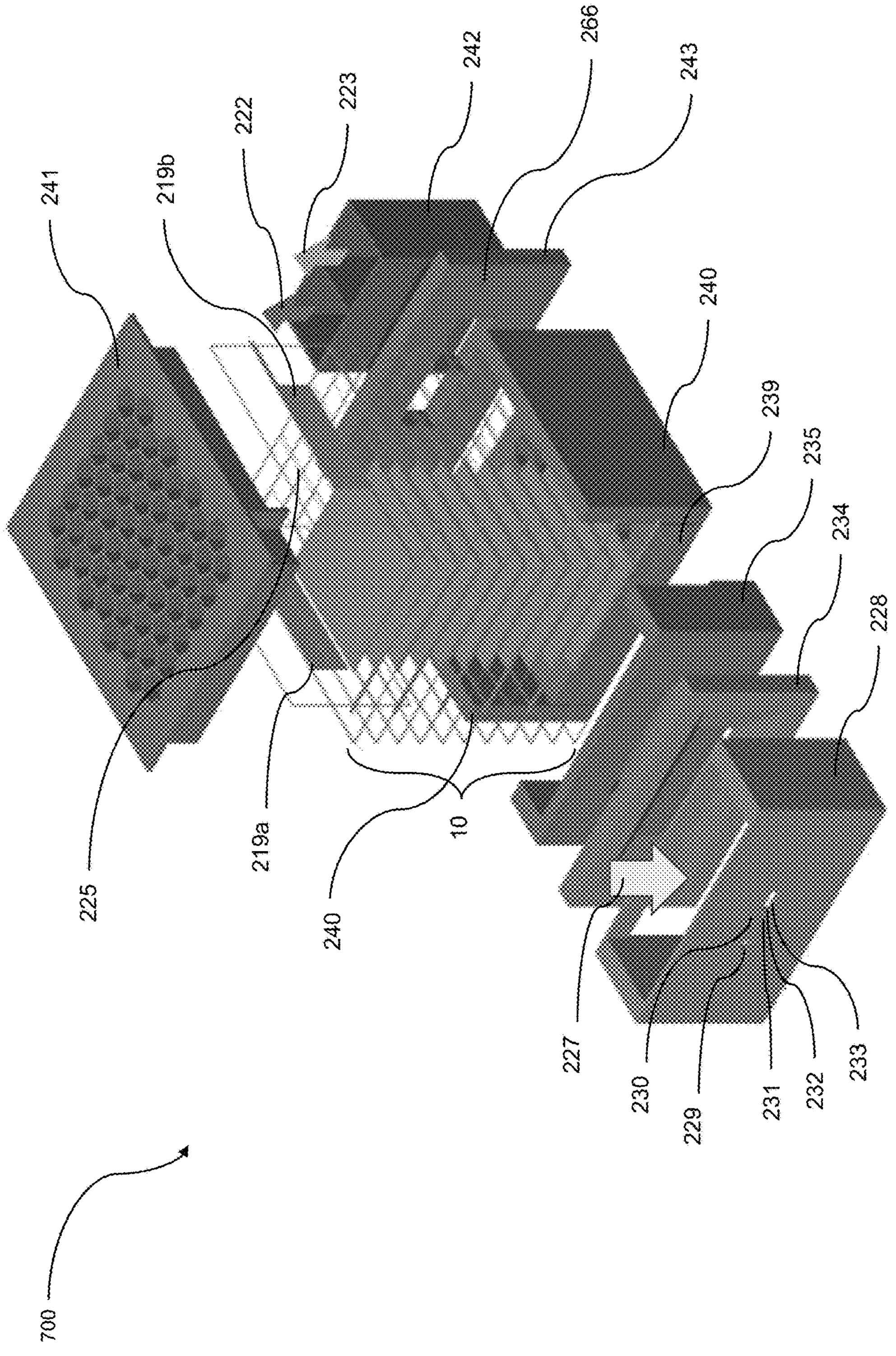
FIG. 22 is an exploded perspective view of an exemplary configuration of a High Volume Fluid Decomposition system 700.

The High Volume Fluid Decomposition system 700 depicted in FIG. 22 can process mixed flue gases composed of combustion products that include water vapor, carbon dioxide, particulates, heavy metals, and acidic gases. Carbon monoxide and volatile organic compounds (VOCs) are also products of combustion and may be processed by this technology. Moreover, the technology depicted in FIG. 22 can incorporate known, related art, and later developed technologies to limit or reduce the amount of particulate matter entering the atmosphere.

Figure 23:
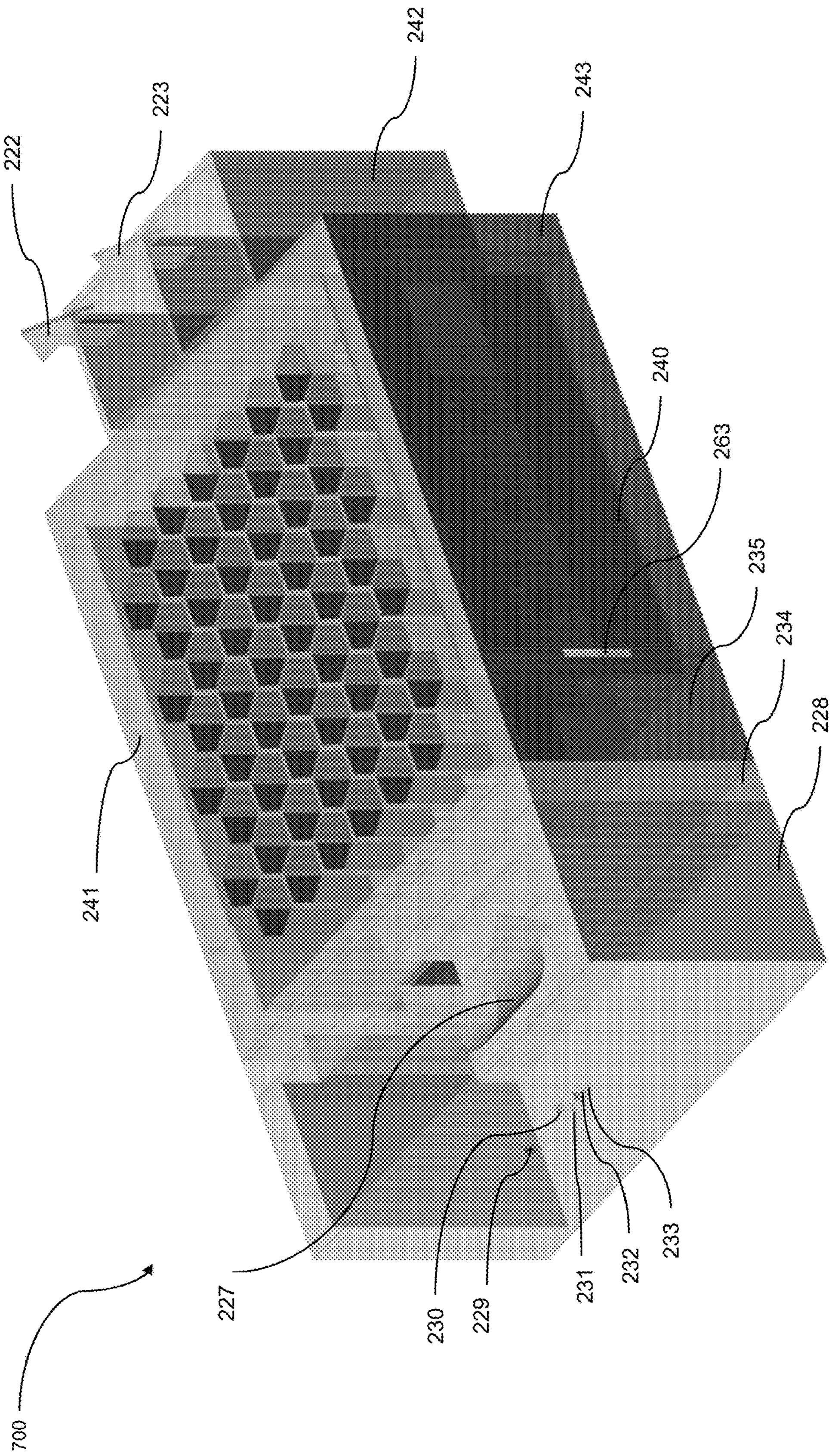
FIG. 23 is a perspective view of the High Volume Fluid Decomposition system 700 of FIG. 22.

In general, the High Volume Fluid Decomposition System 700 shown in FIG. 22 can be stacked to meet the requirements of the source of fluid depicted in FIG. 23. The System 700 can include a plasma generating unit 10, including horizontally stacked electrode 16*a*, 16*b* and dielectric layers 14, that can break down incoming molecules, such as CO2, into constituent charged atoms like C+ and O−. The plasma generator 10 is flanked by vertical separation electrodes 219*a*, 219*b* (comprising a separation unit), one connected to high voltage positive source and the other connected to a high voltage negative source, that will attract either positively charged atoms like C+ or negatively charged atoms like O−; thus separating the charged products from low temperature atmospheric plasma breakdown of compound molecules. Importantly, embodiments are intended to include or otherwise cover any number of stacked systems, i.e., there is no limit to the number of systems that can be stacked.

Figure 29:
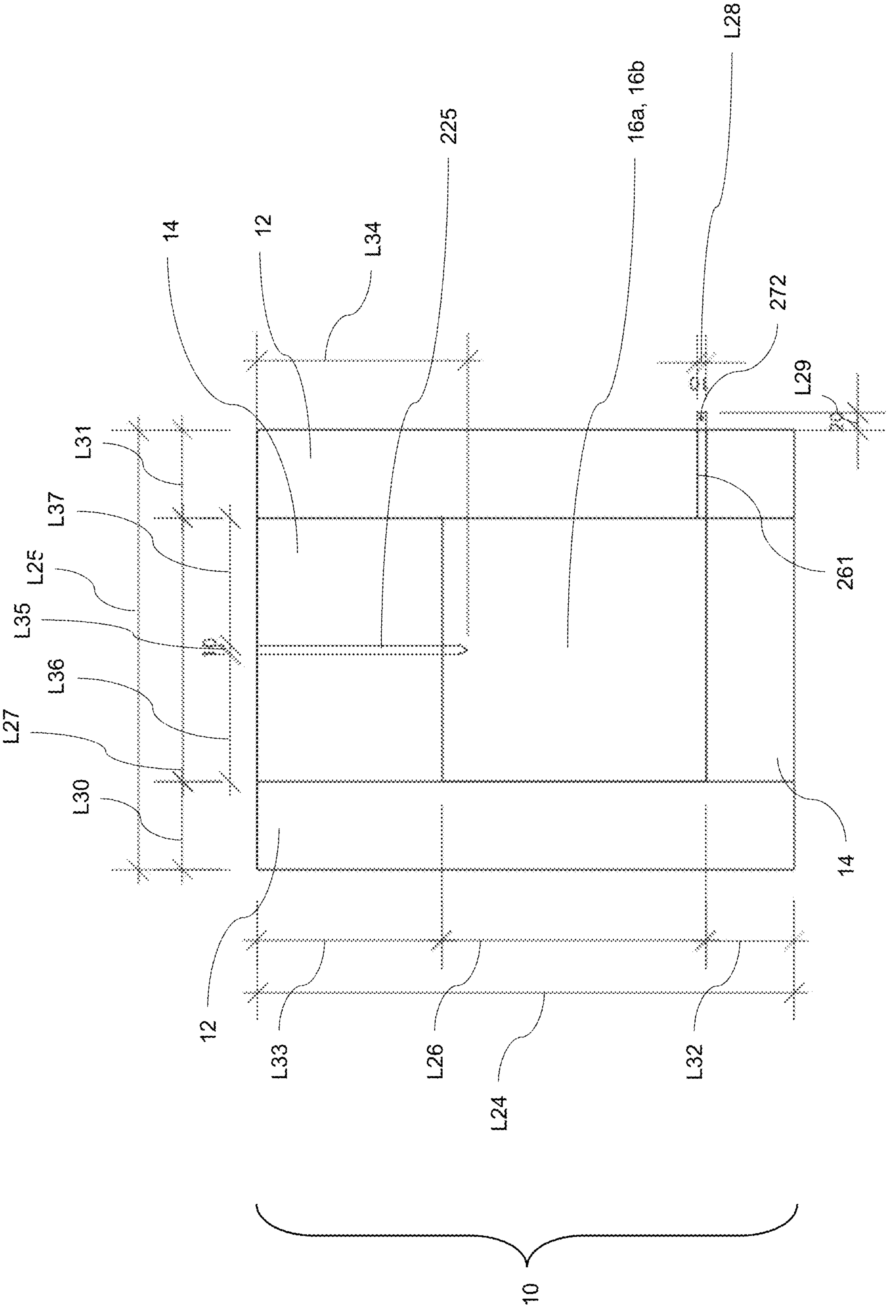
FIG. 29 is a plan view showing dimensions of plasma generating electrodes 16*a*, 16*b* of the plasma generator 10 and the fluid separator 225 of the separation unit 21 of the High Volume Fluid Decomposition system 700 of FIG. 22.

A fluid separator 225, or partition, shown in FIG. 29, can be attached downstream of the plasma generator 10 and flanked by the same vertical separation electrodes 219*a*, 219*b* as the plasma generator 10 to further maintain separation of charged atoms. Together, these elements (plasma generator 10, separation unit 21 including separation electrodes, 219*a*, 219*b* and partition 225) make up a single High Volume Fluid Decomposition System 700 unit of the High Volume Fluid Decomposition Stack 800 depicted in FIG. 24 and described below.

A number of High Volume Fluid Decomposition Stacks 800 (hereinafter may simply be referred to as "system" 800) are included within the full High Volume Fluid Decomposition Supplement 900 (hereinafter may simply be referred to as "system" 900). In some embodiments, the High Volume Fluid Decomposition system 700 may include a plasma generator 10, but may not necessarily include a separation unit 21, separation electrodes 219*a*, 219*b*, or a fluid separator 225.

It should be noted that catalysts and components of the collection units can be disposed within the stacked electrodes and upstream or downstream of the plasma generator 10, or can be introduced within the general space inside of each stacked unit 245, which includes the space upstream and downstream of the plasma generator 10, to sequester, remove or convert flue gases, such as $CO_2$ or separated flue gas atoms such as C+ and O−. Moreover, collection units can be disposed inside or downstream of the plasma generator 10 and/or separation unit 21 or in multiple locations along the system 700, 800, or 900.

FIG. 22 is an exploded schematic of an exemplary High Volume Fluid Decomposition system 700. The untreated gas 227, which can be at least partially or fully composed of flue gas or exhaust gas from an industrial plant or other industrial source, flows in through the exhaust inlet duct 228. The exhaust inlet duct 228 can be connected to an industrial exhaust source through a series of pipes, ducts, and/or other apparatus or methods, and directs the gas from the exhaust source into the embodiment.

While the exhaust gas is being directed, it may be exposed to or interact with one or several devices that provide one or a variety of functions. Some of these devices may be mounted to the exhaust inlet duct 228, which can have built-in device mounts that may include but not be limited to a nano-level water vapor and/or catalyst port 229, a UV installation port 230, a sensor port 231, an ultrasonic oscillator installation port 232, a surveillance window port 233, etc. The mount positions shown in FIG. 22 are exemplary and embodiments are intended to cover any number or position of mounts on the exhaust inlet port 228 or any other part of the High Volume Fluid Decomposition system 700.

The nano-level water vapor and/or catalyst port 229 can house an inlet pipe for a nano-level water vapor injector 217 (as described in embodiment 3 of the Gas Decomposition System 17) and/or catalyst to be introduced to and mixed with the exhaust gas 227 while it passes through the exhaust inlet duct 228. The UV installation port 230 can house an ultraviolet emitting device that can emit ultraviolet radiation into the exhaust gas 227 while it flows through the exhaust inlet duct 228. The UV radiation can help to generate the plasma within the plasma generator 10.

Beneficial results may be obtained if the UV spectrum emitted from the ultraviolet emitting device is in the UV-A, UV-B, or UV-C ranges, with even more beneficial results in the UV-A or UV-C ranges. The ultraviolet radiation emitted from a device housed by the UV installation port 230 can also penetrate the exhaust gas 227 inside the exhaust inlet duct 228 and can be absorbed by the exhaust gas 227 while it is in other parts of the High Volume Fluid Decomposition system. The sensor port 231 can house any kind of sensor that measures any relevant aspect of the exhaust gas 227, including but not limited to its composition, temperature, flow rate, and vorticity.

The ultrasonic oscillator installation port 232 can house an ultrasonic wave emitter that emits ultrasonic sound waves into the exhaust gas 227 while it is in any part of the High Volume Fluid Decomposition system 700. The ultrasonic waves can help to separate the decomposed molecules and impede or prevent them from combining with one another. The surveillance window port 233 can house a surveillance window for direct visual surveillance, a camera for remote surveillance, or any other known, related art, or later developed apparatus that provides visual surveillance.

The exhaust gas 227 then exits the exhaust inlet duct 228 and flows through the tapered collar 234, which functions to compress the cross-sectional area of the flow of gas in a smooth and laminar fashion, impeding or preventing the introduction of turbulent losses. The cross-sectional area of the flow of the exhaust gas 227 is compressed from the outlet area of the exhaust inlet duct 228 to the inlet area of the plasma generating unit 10 (i.e., total cross-sectional area of each plasma gap 15 of the plasma generator 10 as shown in FIG. 3).

Figure 27:
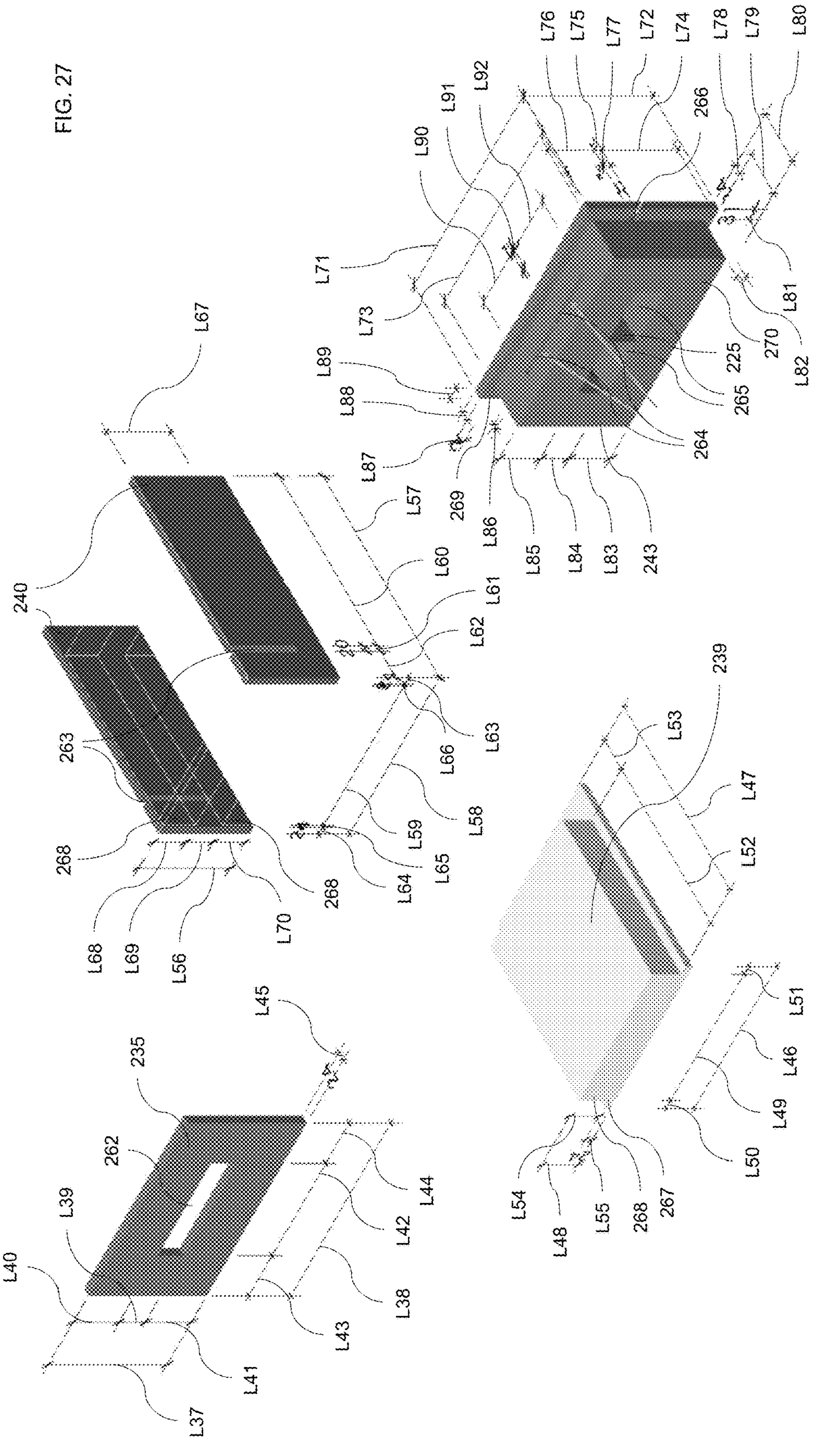
FIG. 27 is an exploded perspective view of the insulating material of FIG. 26.

The plasma generating section includes the front section of the insulation 235, which includes a flow opening to allow the exhaust gas 227 to enter. The plasma generating unit 10, as described in the Plasma Generator section II herein, includes stacked electrodes and dielectric layers and the separation unit 21, as described in the Gas Decomposition System 17 section IV herein, can also be included, which includes a positive side electrode 219*a*, a negative side electrode 219*b*, and a fluid separator 225. The plasma generating unit 10 and separation unit 21 components can be partially, substantially, or completely encased by the insulation material divided into the front section 235, the rear section 243, the bottom section 239, the top section 241, and the side sections 240. The insulating material may be made of Polyoxybenzylmethylenglycolanhydride (Bakelite or any related material that can handle the heat flux or structural forces) or any related material that can handle the heat flux resulting from the various temperatures at which different industrial plants produce exhaust gas, as described above in the overview section. The rear section 243 may include electrode holes 266, as shown in FIG. 27 discussed below.

In some embodiments, the bottom section 239 and top section 241 of the insulating material can have a holed honeycomb structure, or any other pattern or construction to reduce the amount of insulating material while providing a sufficiently high structural integrity.

The exhaust gas 227 is at least partially turned into a plasma by the components of the plasma generator 10, and the separation unit 21 can then separate the exhaust gas 227 into at least two components. In some embodiments, the two components are mostly carbon ions, neutrals, or molecules, and oxygen ions, neutrals, or molecules. Once the exhaust gas 227 has been separated into the two components, the exhaust outlet duct 242 directs the separate flows of the oxygen ions 222 and the carbon ions 223. In some embodiments the exhaust outlet duct 242 may not fully separate carbon ions 223 and oxygen ions 222. In the case this happens, one side of outlet duct 242 is expected to contain more carbon ions 223 compared to oxygen ions 222 and the other side is expected to contain more oxygen ions 222 than carbon ions 223. Some embodiments may provide an insulation component between the rear section 243 and the exhaust outlet ducts 242.

FIG. 23 is a schematic of the same embodiment of the High Volume Fluid Decomposition System 700 shown in FIG. 22. All components discussed in the context of FIG. 22 can be included in the embodiment of FIG. 23, even though some components are hidden under or inside other components and may therefore not be specifically shown. For example, the plasma generating components in the plasma generator 10, including the stacked electrodes and dielectric layers and the separation unit 21 components including a positive side electrode 219*a*, a negative side electrode 219*b*, and a fluid separator 225, and one of the insulation material components 239, are hidden within the other insulation material components 235, 243, 241, and 240 and thus cannot be shown.

The untreated gas 227, which can be at least partially or fully composed of flue gas or exhaust gas from an industrial plant or other industrial source, flows in through the exhaust inlet duct 228. The exhaust inlet duct 228 is intended to be connected to an industrial exhaust source through a series of pipes, ducts, or other apparatus/methods, and directs the gas from the exhaust source into the embodiment.

While the exhaust gas is being directed, it may be exposed to or interact with one or several devices that may provide a variety of functions. Some of these devices may be mounted to the exhaust inlet duct 228, which has built-in device mounts that may include but not be limited to a nano-level water vapor and/or catalyst port 229, a UV installation port 230, a sensor port 231, an ultrasonic oscillator installation port 232, and a surveillance window port 233. The mount positions shown in FIG. 23 are shown for exemplary purposes, and embodiments are intended to cover any number or position of mounts on the exhaust inlet port 228 or any other part of the High Volume Fluid Decomposition system 700.

The nano-level water vapor and/or catalyst port 229 can house an inlet pipe for a nano-level vapor injector 219 (as described in embodiment 3 of the Gas Decomposition System 17) and/or catalyst to be introduced to and mixed with the exhaust gas 227 while it passes through the exhaust inlet duct 228. The UV installation port 230 can house an ultraviolet emitting device that can emit ultraviolet radiation into the exhaust gas 227 while it flows through the exhaust inlet duct 228. The ultraviolet radiation emitted from a device housed by the UV installation port 230 (as previously described) can also penetrate the exhaust gas 227 inside the exhaust inlet duct 228 and can be absorbed by the exhaust gas 227 while it is in other part(s) of the High Volume Fluid Decomposition system 700. Due to the changed or inherent attributes of the plasma generators 10 described below, such as, the mirror-finished electrodes and clarity of the borosilicate dielectric layer, the UV spectrum and intensity is enhanced, increased, or even maximized. The sensor port 231 can house any known, related art, or later developed sensor that measures any relevant aspect of the exhaust gas 227, including but not limited to its composition, temperature, flow rate, and vorticity.

The ultrasonic oscillator installation port 232 (as previously described) can house an ultrasonic wave emitter that emits ultrasonic sound waves into the exhaust gas 227 while it is in any part of the High Volume Fluid Decomposition system 700. The ultrasonic waves can help to separate the decomposed molecules and keep them from combining with one another. The surveillance window port 233 can house a surveillance window for direct visual surveillance, a camera for remote surveillance, or any other known related art that functions as a means of visual surveillance.

The exhaust gas 227 then exits the exhaust inlet duct 228 and flows through the tapered collar 234, which functions to compress the cross-sectional area of the flow of gas in a smooth and laminar fashion, impeding or preventing the introduction of turbulent losses. The cross-sectional area of the flow of the exhaust gas 227 is compressed from the outlet area of the exhaust inlet duct 228 to the inlet area of the plasma generating section of the High Volume Fluid Decomposition system 700.

The plasma generating section includes the front section of the insulation 235, which includes a flow opening to allow the exhaust gas 227 to enter. The plasma generating unit 10 and separation unit 21 components are partially, substantially, or completely encased by the insulation material divided into the front section 235, the rear section 243, the bottom section 239 (not shown), the top section 241, and the side sections 240. The insulating material may be made of Bakelite or any other relevant material that can handle the temperature fluctuations from the various industrial plants emitting exhaust gas, as described above in the above section. Some embodiments include a hole 263 in the side of the insulating material, as shown in FIG. 27 and disclosed below.

In some embodiments, the bottom section 239 and top section 241 of the insulating material can have a holed honeycomb structure, or any other construction to reduce the amount of insulating material while providing a sufficiently high structural integrity.

The exhaust gas 227 is at least partially turned into a plasma by the components of the plasma generating section 10, and the separation unit 21 can then separate the exhaust gas 227 into at least two components. In some embodiments, the two components are carbon ions, neutrals, or molecules, and oxygen ions, neutrals, or molecules. Once the exhaust gas 227 has been separated into the two components, the exhaust outlet duct 242 directs the separate flows of the oxygen ions 222 and the carbon ions 223. In some embodiments the exhaust outlet duct 242 may not fully separate carbon ions 223 and oxygen ions 222. In the case this happens, one side of outlet duct 242 is expected to contain more carbon ions 223 compared to oxygen ions 222 and the other side is expected to contain more oxygen ions 222 than carbon ions 223. In some embodiments, there may be an insulation component between the rear section 243 and the exhaust outlet ducts 242.

Figure 24:
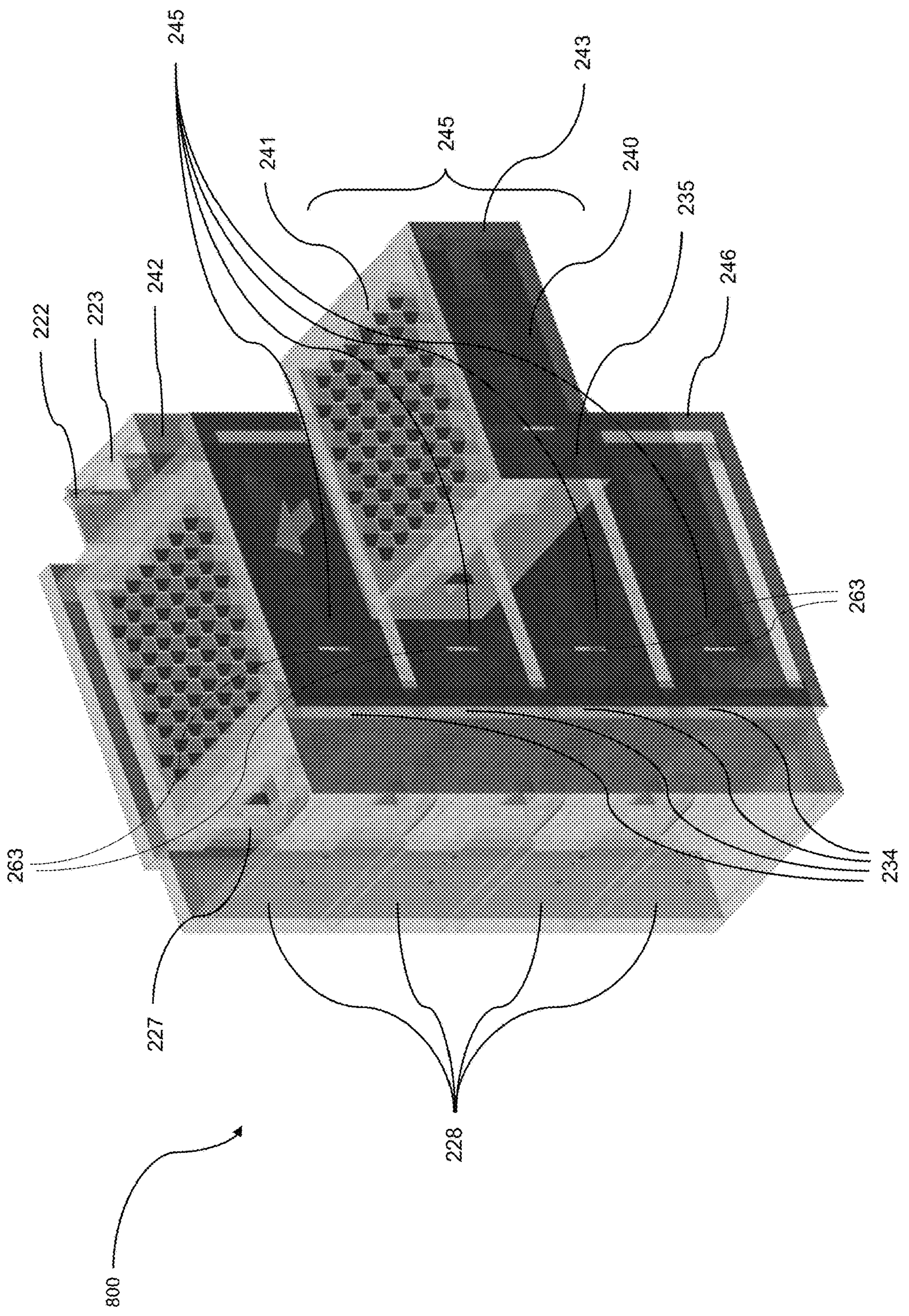
FIG. 24 is a perspective view of a High Volume Fluid Decomposition stack 800 that includes multiple High Volume Fluid Decomposition systems 700 of FIG. 22.

FIG. 24 is a schematic of an exemplary configuration of a High Volume Fluid Decomposition stack 800, including four stacked High Volume Fluid Decomposition systems 700. The exhaust gas 227 flows into each of the stacked exhaust inlet ducts 228. The exhaust inlet ducts 228 may allow gas to flow between them, or they may be separately supplied exhaust gas 227 and insulated from each other. The exhaust inlet ducts 228 and the tapered collars 234 are connected to a rack 246 that houses each of the removable plasma filter units 245. The rack can be made of any structural material that can handle the heat flux resulting from the various temperatures of the exhaust gas and the choice of insulating material of the other components as described above in the above section, including but not limited to iron, stainless steel, aluminum, titanium, or any other metal or related structural material. In some embodiments, the exhaust inlet ducts 228 may be combined to make one continuous, integral, or even unitary duct with the same or similar attachments to connect to each tapered collar 234.

Each removable plasma filter unit 245 includes the front section 235, the rear section 243, the bottom section 239 (hidden in figure), the top section 241, and the side sections 240 of the insulating material, and contains the plasma generating 10 components and separation unit 21 components. Some embodiments include a hole 263 in the side of the insulating material of each High Volume fluid decomposition system 700, as shown in FIG. 27 disclosed below. In some embodiments, the rack 246 can be designed with a mechanism to allow the removable plasma filter units 245 to be easily removed with or without the use of specialized tools such as spring closures.

The stacked exhaust outlet ducts 242 are connected to the rear side of the rack 246 and allow the directed flow of the separate gas species, oxygen 222 and carbon 223. In some embodiments, the exhaust outlet ducts 242 may allow the gas species to flow between them by connecting each of the exhaust outlet ducts 242 through a set of holes. In some embodiments, the exhaust outlet ducts 242 may be combined to make one continuous, integral or even unitary duct with the same or similar attachments to connect to the rear section 243 of each stacked removable plasma filter unit 245. Some embodiments may provide an insulation component between the rear section 243 and the exhaust outlet ducts 242.

Figure 25:
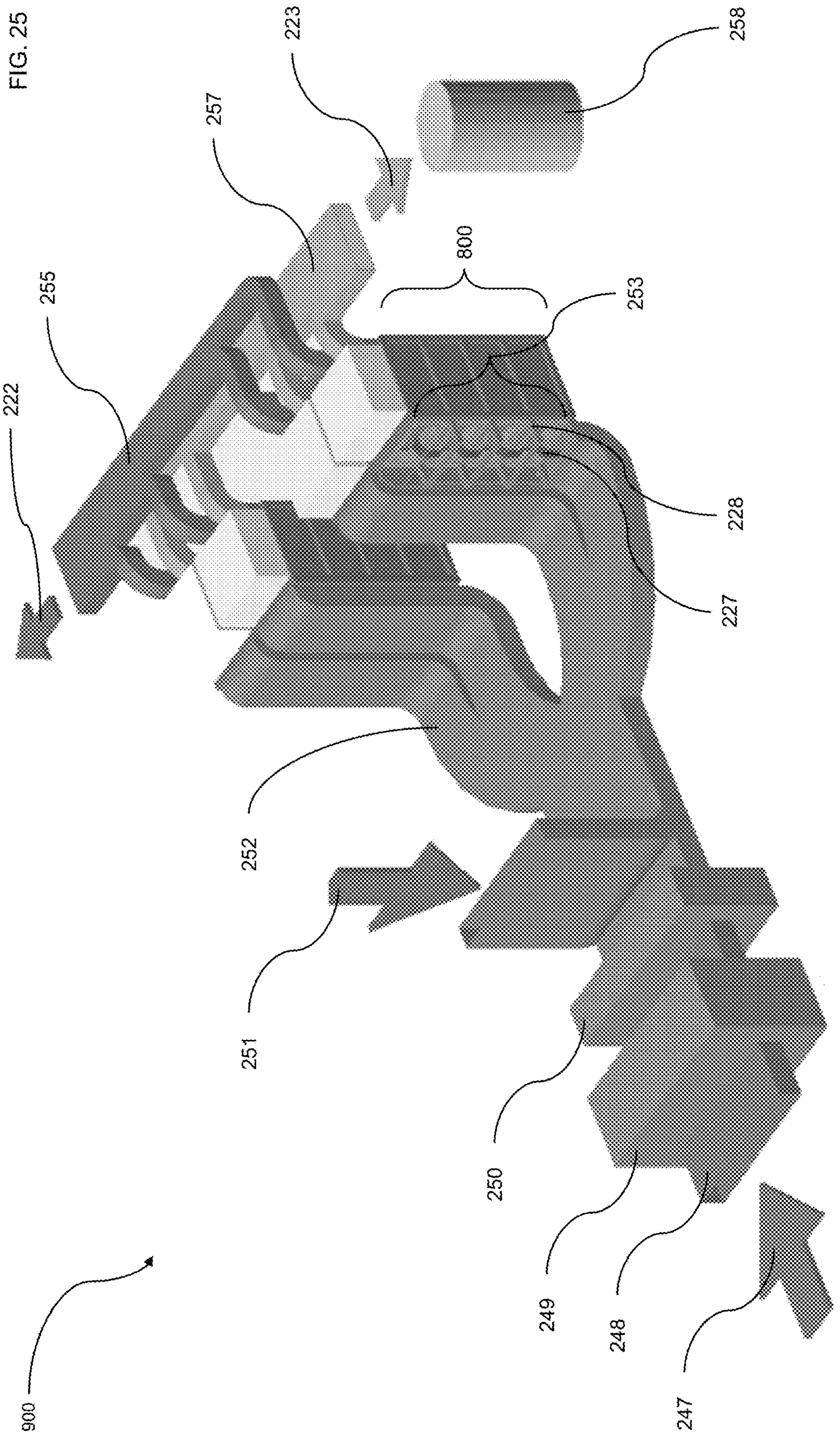
FIG. 25 is a perspective view of a High Volume Fluid Decomposition supplement 900 that includes multiple High Volume Fluid Decomposition stacks 800 of FIG. 24.

FIG. 25 is a schematic of an exemplary configuration of a High Volume Fluid Decomposition supplement 900 to an industrial plant including multiple High Volume Fluid Decomposition stacks 800 being connected to an industrial exhaust gas source. Fresh air 247 flows through the air intake duct 248 and then through the air preheater 249. The preheater 249 acts to heat the fresh air 247 to a specified temperature. The preheated air flows through the compressor 250, which acts to compress the preheated air from the preheater 249, and the resulting compressed and preheated air flows into the exhaust gas duct 252. The flue gas 251 flows into the exhaust gas duct 252 and is mixed with the compressed and preheated air from the compressor 250. The exhaust gas mixture 227 can then flow into the exhaust gas inlet ducts, as shown in the interior view section 253.

The interior view section 253 is not a physical part of the High Volume Fluid Decomposition supplement 900 and is intended as a visual aid to describe the action of the exhaust gas duct 252 and attached components. The exhaust gas 227 is then at least partially turned into a plasma and decomposed by the High Volume fluid decomposition stack 800 and the resulting oxygen gas 222 can flow through the oxygen outlet duct 255 and the resulting carbon gas 223 can flow through the carbon outlet duct 257.

Figure 26:
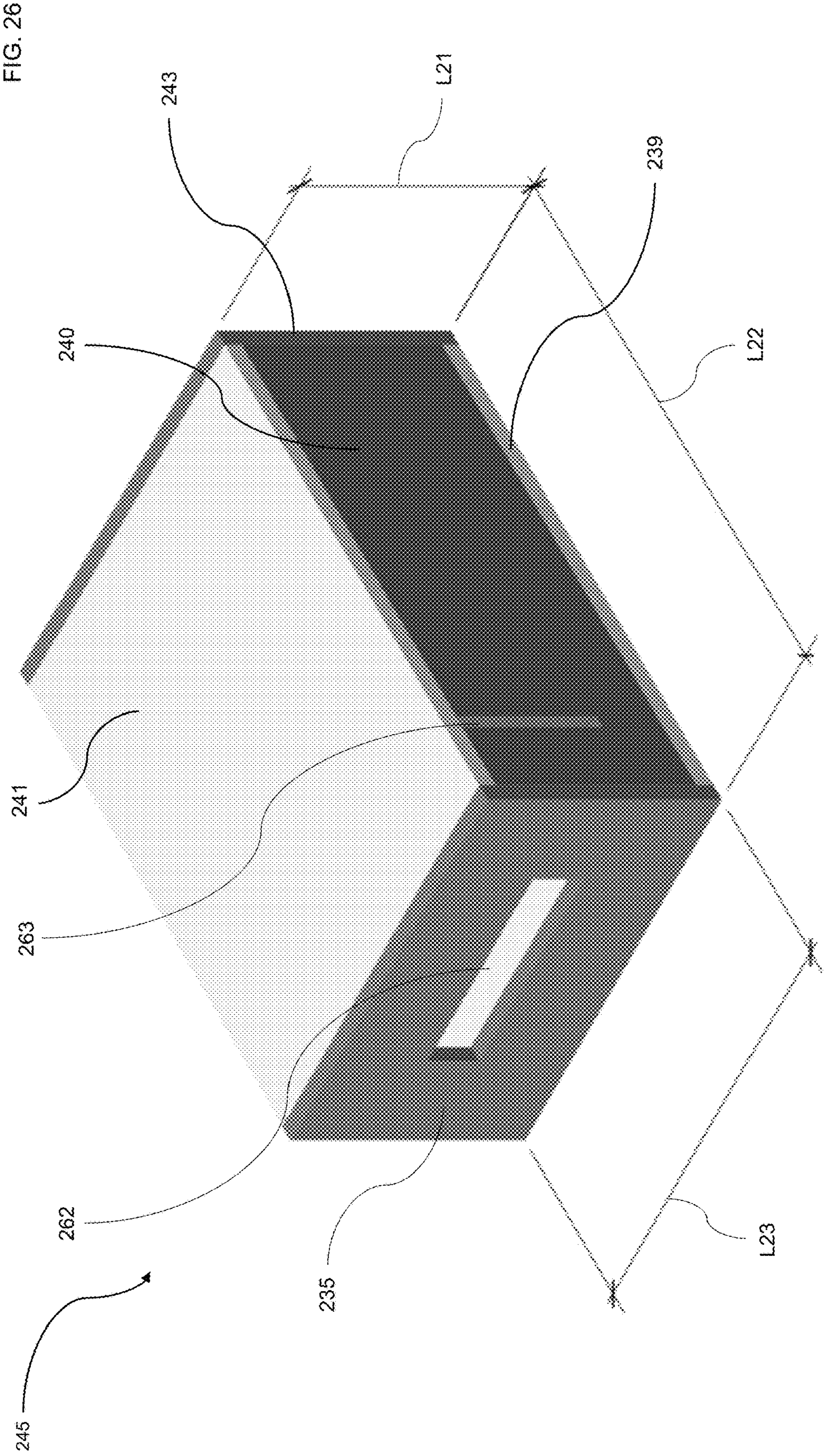
FIG. 26 is a perspective view showing dimensions of insulating material of the High Volume Fluid Decomposition system 700 of FIG. 22.

FIG. 26 shows exemplary dimensions of a single removable plasma filter unit 245. The overall height L21 yields beneficial results between 250 and 400 mm, with even more beneficial results at 334 mm. The overall length L22 yields beneficial results between 700 and 900 mm, with even more beneficial results at 773 mm. The overall width L23 yields beneficial results between 450 and 700 mm, with even more beneficial results at 562 mm.

FIG. 27 shows exemplary dimensions of the insulating materials of the High Volume Fluid Decomposition system 700. Starting with the front section 235 in the top left of FIG. 27, beneficial results are provided if the height L37 is between 200 and 400 mm, with even more beneficial results at 334 mm. The width L38 yields beneficial results between 500 and 700 mm, with even more beneficial results at 562 mm. The front section 235 can have an opening 262 to allow the flow of gas or other fluid. The height L39 of the opening 262 yields beneficial results between 50 and 100 mm, with even more beneficial results at 74 mm. The width L42 of the opening 262 yields beneficial results between 200 and 400 mm, with even more beneficial results at 300 mm.

The placement of the opening 262 depends on its distance from all edges of the front section 235. The distance L40 from the top edge of the opening 262 to the top edge of the front section 235 yields beneficial results between 50 and 200 mm, with even more beneficial results at 130 mm. The distance L41 from the bottom edge of the opening 262 to the bottom edge of the front section 235 yields beneficial results between 50 and 200 mm, with even more beneficial results at 130 mm. The distance L43 from the left edge of the opening 262 to the left edge of the front section 235 yields beneficial results between 50 and 200 mm, with even more beneficial results at 131 mm. The distance L44 from the left edge of the opening 262 to the right edge of the front section 235 yields beneficial results between 50 and 200 mm, with even more beneficial results at 131 mm. The width L45 of the front section 235 yields beneficial results between 1 and 100 mm, with even more beneficial results at 24 mm.

Moving to the bottom left of FIG. 27, the total width L46 of the bottom section 239 yields beneficial results between 500 and 700 mm, with even more beneficial results at 562 mm. The total length L47 of the bottom section 239 yields beneficial results between 600 and 800 mm, with even more beneficial results at 725 mm. The total height L48 of the bottom section 239 yields beneficial results between 50 and 200 mm, with even more beneficial results at 124 mm. The bottom section 239 can be divided into a rectangular section 267, and a cubic section 268, situated on top of the rectangular section 267.

The width of the rectangular section 267 is L46 and the length of the rectangular section 267 is L47. The height L55 of the rectangular section yields beneficial results between 1 and 100 mm, with even more beneficial results at 24 mm. The width L49 of the cubic section 268 yields beneficial results between 400 and 600 mm, with even more beneficial results at 500 mm. The length L52 of the cubic section 268 yields beneficial results between 500 and 700 mm, with even more beneficial results at 610 mm. The height L54 of the cubic section 268 yields beneficial results between 50 and 150 mm with even greater results at 100 mm.

The placement of the cubic section 268 on top of the rectangular section 267 depends on the distances from each edge of the cubic section 268 to each corresponding edge of the rectangular section 267. The front edge of the cubic section 268 is in line with the front edge of the rectangular section 267, and so in some embodiments the distance between them is zero, and in other embodiments this distance is substantially zero or small, and so in some embodiments the distance between the front edge of the cubic section 268 and the front edge of the rectangular section 267 is not zero.

The distance L50 from the left edge of the cubic section 268 to the left edge of the rectangular section 267 yields beneficial results between 1 and 50 mm, with even more beneficial results at 31 mm. The distance L51 from the right edge of the cubic section 268 to the right edge of the rectangular section 267 yields beneficial results between 1 and 50 mm, with even more beneficial results at 31 mm. The distance L53 from the rear edge of the cubic section 268 to the rear edge of the rectangular section 267 yields beneficial results between 50 and 200 mm, with even more beneficial results at 115. The top section 241 is not pictured, but it is understood that it is a mirrored copy of the bottom section 239.

Moving to the top right of FIG. 27, the height L56 of each side section 240 yields beneficial results between 200 and 400 mm, with even more beneficial results at 286 mm. The length L57 of each side section 240 yields beneficial results between 600 and 800 mm, with even more beneficial results at 725 mm. The width L64 and L63 of each side section 240 yields beneficial results between 1 and 100 mm, with even more beneficial results at 24 mm. As a visual aid, the cubic sections 268 of the bottom section 239 and top section 241 are placed between the side sections 240. The total width L58 of the side sections 240 and the added cubic sections 268 yields beneficial results between 500 and 700 mm, with even more beneficial results at 562 mm.

Each side section 240 has a hole 263 cut out or otherwise defined to allow the electrical leads 261 that can be seen in FIG. 29, protrude from the plasma generator 10 and their associated wiring to fit inside the space created by the holes 263. The width L61 of each hole 263 yields beneficial results between 1 and 100 mm, with even more beneficial results at 20 mm. The height L67 of each hole 263 yields beneficial results between 100 and 300 mm, with even more beneficial results at 200 mm. The hole 263 is cut out from the top edge of each side section 240. The placement of the hole 263 along the length of each side section 240 depends on the distances from the left and right edges of the hole 263 to the front and rear edges of the side section 240. The distance L62 from the front edge of the side section 240 to the left edge of the hole 263 yields beneficial results between 50 and 150 mm, with even more beneficial results at 95 mm. The distance L60 from the right edge of the hole 263 to the rear edge of the side section 240 yields beneficial results between 500 and 700 mm, with even more beneficial results at 610 mm.

The placement of the cubic sections 268 between the side sections 240 depends on various distances. The distances L65 and L66 between the edges of the side sections 240 and the edges of the cubic sections 268 yield beneficial results between 1 and 20 mm, with even more beneficial results at 7 mm. The distance L59 that spans between the end of each gap between the side sections 240 and the cubic sections 268 yields beneficial results between 400 and 600 mm, with even more beneficial results at 500 mm.

The heights L68 and L70 from the top or bottom of each side section 240 to the bottom or top of each cubic section 268 yields beneficial results between 50 and 150 mm, with even more beneficial results at 100 mm. The distance L69 between the bottom of the cubic section 268 of the top section 241 and the top of the cubic section 268 of the bottom section 239 yields beneficial results between 50 and 150 mm, with even more beneficial results at 86 mm.

Moving to the bottom right of FIG. 27, the total height L72 of the rear section 243 yields beneficial results between 200 and 400 mm, with even more beneficial results at 334 mm. The total width L71 yields beneficial results between 500 and 700 mm, with even more beneficial results at 562 mm. The total length L80 yields beneficial results between 50 and 200 mm, with even more beneficial results at 139 mm. The rear section 243 can be split into a modified rectangular section 269 and a modified cubic section 270.

The height of the modified rectangular section 269 is L72 and the width of the modified rectangular section 269 is 171. The length L78 and L88 of the modified rectangular section 269 yields beneficial results between 1 and 50 mm, with even more beneficial results at 24 mm. The length L79 of the modified cubic section 270 yields beneficial results between 50 and 200 mm, with even more beneficial results at 115 mm. The width L73 of the modified cubic section 270 yields beneficial results between 400 and 600 mm, with even more beneficial results at 500 mm.

The modified cubic section 270 includes two exhaust holes 265, that are also cut out of the modified rectangular section 269, which allow gas or other fluid to flow through and exit the removable plasma filter 245. The height L84 of the exhaust holes 265 yields beneficial results between 25 and 150 mm, with even more beneficial results at 74 mm. The widths L90 and L92 of the exhaust holes 265 yields beneficial results between 100 and 200 mm, with even more beneficial results at 145 mm.

The distance L85 from the top of each exhaust hole 265 to the top of the modified cubic section 270 yields beneficial results between 50 and 150 mm, with even more beneficial results at 106 mm. The distance L83 from the bottom of the modified cubic section 270 to the bottom of each exhaust hole 265 yields beneficial results between 50 and 150 mm, with even more beneficial results at 106 mm. The modified cubic section 270 also has slot holes 264 cut or otherwise defined through the top edge of the modified cubic section 270 and through the top inner edge of the exhaust holes 265.

The slot holes 264 can be used as ozone filter slots to allow added ozone filters to be easily replaceable. The widths of the slot holes 264 can correspond to the widths L90 and L92 of the exhaust holes 265. The length L86 of each slot hole 264 yields beneficial results between 1 and 50 mm, with even more beneficial results at 13 mm. The distance L91 between the slot holes 264, which may be the same as the distance between the exhaust holes 265, which may also be the same as the width of the fluid separator 225, yields beneficial results between 1 and 50 mm, with even more beneficial results at 10 mm.

The placement of the modified cubic section 270 on, over, or at the modified rectangular section 269 is dependent on the distances between their edges. The distance L82 from the bottom edge of the modified rectangular section 269 to the bottom edge of the modified cubic section 270 yields beneficial results between 1 and 50 mm, with even more beneficial results at 24 mm. The distance L87 from the top edge of the modified rectangular section 269 to the top edge of the modified cubic section 270 yields beneficial results between 1 and 50 mm, with even more beneficial results at 24 mm. The distance L89 from the left edge of the modified rectangular section 269 to the left edge of the modified cubic section 270 yields beneficial results between 1 and 50 mm, with even more beneficial results at 31 mm. The distance L81 from the right edge of the modified rectangular section 269 to the right edge of the modified cubic section 270 yields beneficial results between 1 and 50 mm, with even more beneficial results at 31 mm.

Figure 28:
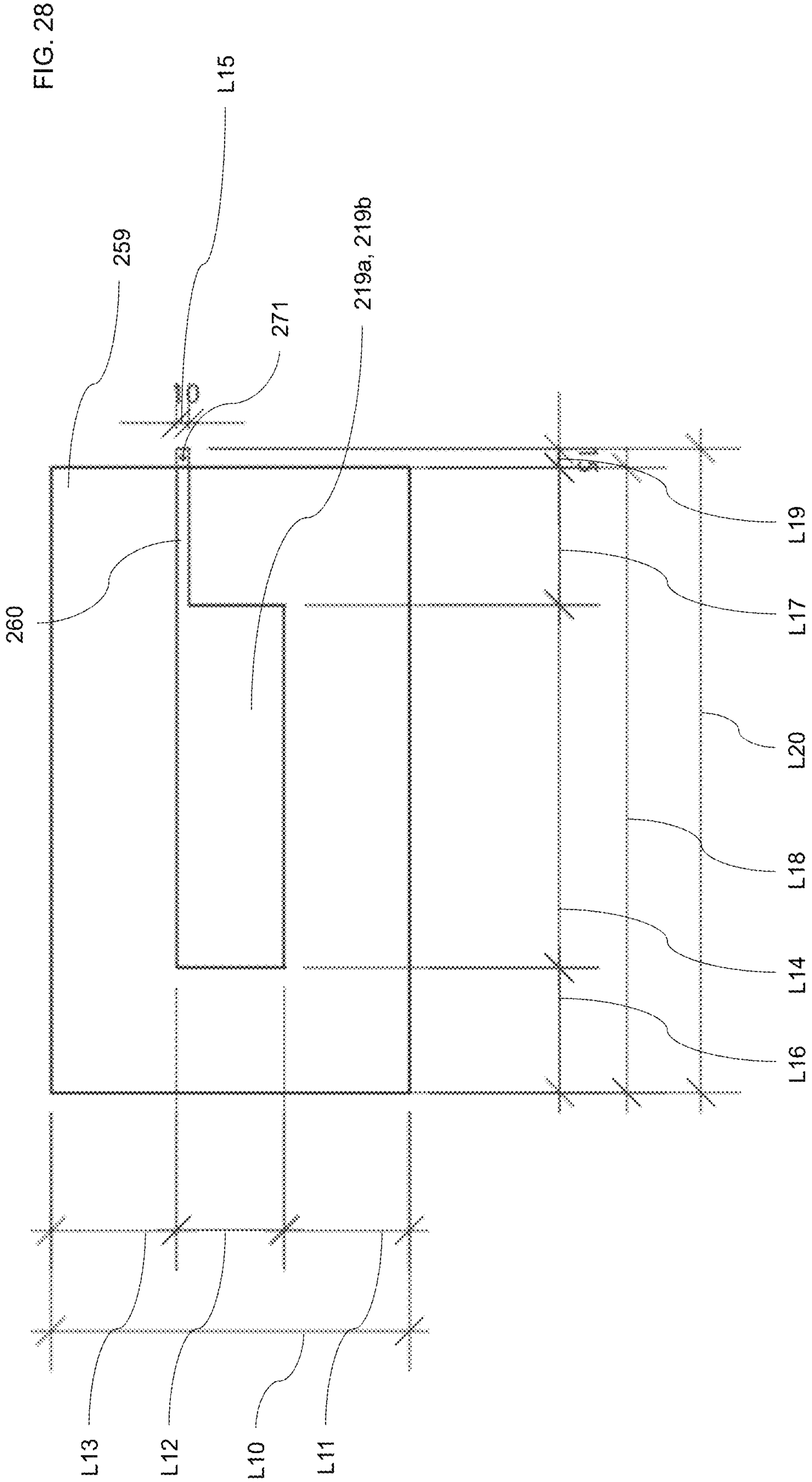
FIG. 28 is a plan view showing dimensions of separation electrodes 219*a*, 219*b* of the High Volume Fluid Decomposition system 700 of FIG. 22.

The modified rectangular section 269 may also have electrode holes 266 cut out or otherwise defined to allow the protruding electrical leads that can be seen in FIG. 28 260 of the side electrodes 219*a*, 219*b* to fill the space created. The width L77 of the electrode holes 266 yields beneficial results between 1 and 50 mm, with even more beneficial results at 20 mm. The height L75 of the electrode holes 266 yields beneficial results between 1 and 50 mm, with even more beneficial results at 20 mm. The placement of the electrode holes 266 in the modified rectangular section 269 depends on the distances from their corresponding edges. The left edge of the left electrode hole 266 is in line with the right edge of the modified cubic section 270.

In some embodiments, the distance between the left edge of the left electrode hole 266 and the right edge of the modified cubic section 270 may be zero, substantially zero, or not zero. The distance L76 from the top of the electrode hole 266 to the top edge of the modified rectangular section 269 yields beneficial results between 75 and 200 mm, with even more beneficial results at 119 mm. The distance L74 from the bottom of the electrode hole 266 to the bottom edge of the modified rectangular section 269 yields beneficial results between 100 and 300 mm, with even more beneficial results at 195 mm.

The material used to bond the components to each other, including for example, the insulation materials 235,239,240, 241,243, would need to be temperature rated and can be any known related art or later developed apparatus or method of bonding, including but not limited to adhesive, epoxy, and glue. Embodiments are intended to include any mechanism of bonding, including by mechanical means, like rivets, bolts, or any other known related or later developed mechanical apparatus.

In some embodiments, heat may impact the dimensions of the high volume fluid decomposition system 700 or its individual components, including the plasma generator 10 or the separation unit 21. For example, the heat from the flue gas may cause some components to expand, known as thermal expansion. There may be slight changes in design or dimensions in order to accommodate this thermal expansion.

1. Plasma Generator

Parameters described in this section refer to the plasma generating components that include the High Volume Fluid Decomposition unit 700. Untreated fluid 227 of multiple components, including $CO_2$, flows through the plasma generator 10, where the untreated fluid 227 is turned into a plasma by the plasma generator 10.

The plasma generator 10 is disclosed in the Plasma Generator section II herein, in the context where the fluid that flows through the plasma generator 10 is ambient air. However, the plasma generator 10 may be modified to handle other types of fluids, such as in the context of the Gas Decomposition System disclosed in section IV herein. If the type of fluid that flows through the plasma generator 10 in the High Volume Fluid Decomposition system 700 is exhaust gas (such as from industrial sources, including flue gas from power plants), the apparatus may be further modified.

The generated plasma contains ionized molecules, or molecules that have a net electric charge be it negative or positive, and electrons. The electrons within the generated plasma can impart their energy to exhaust gas entering the system 700, such as $CO_2$ molecules, increasing the vibrational, rotational, or electronic energies of the molecules. If the total amount of energy imparted to the $CO_2$ molecules is above the binding energy of the carbon-oxygen bonds in the molecules, the carbon dioxide can split into carbon ions 223 and oxygen ions 222, where the carbon ions 223 are mainly positively charged and the oxygen ions 222 are mainly negatively charged.

The positively charged carbon ions 223 can combine with each other to form solid particles of carbon that can in some cases be deposited on the surfaces of the plasma facing components of the plasma generator 10 and the separation unit 21. Referring to FIG. 3, these components include the dielectric layer 14 and the spacer 12 as well as the fluid separator 225, shown to be contacting the plasma region in FIG. 17*a*.

The solid particles can also be deposited on surfaces downstream of the plasma, as the finite lifetime of the carbon ions allows them to travel downstream of the plasma generator 10 in the High Volume Fluid Decomposition system 700, the High Volume decomposition stack 800, or the High Volume Fluid Decomposition supplement 900 before combining with each other. The apparatus of FIG. 17*a*, FIG. 22 and FIG. 25 include the fluid separator 225, the rear section 243 of insulation, the exhaust outlet duct 242, and the carbon outlet duct 257. If the separation is imperfect, and not all carbon ions 223 are separated and collected, then some of the carbon particles can form in the oxygen outlet duct 255 as well. Some embodiments may have the plasma generator 10 and/or the separation unit 21 continually rotating to prevent the deposition of carbon particles on the surface of the dielectric layer 14 and spacer 12.

The deposition of solid particles onto plasma facing components or components downstream of the plasma may present problems to the continuous or substantially continuous operation of the High Volume as decomposition system 700. To mitigate or otherwise address these problems, some embodiments may rotate the plasma generator 10 by 90 degrees (or approximately 90 degrees) so that the dielectric layer 14 surfaces point perpendicular to the direction of gravity. Some embodiments may include extra holes through the components of the plasma generator 10 that can capture and direct the particles away from the plasma facing components. In some embodiments, the dielectric layer 14 and the spacer 12 may be coated in a material that resists or impedes the deposition of carbon particles or repels the ions themselves.

In some embodiments, the plasma generator 10 may be vibrated at a desirable frequency to reduce, impede, or prevent the build-up of carbon particles. Some embodiments may include one or multiple extra fans to increase the flow of gas across the plasma facing surfaces to decrease the rate of deposition of the particles or place a limit to the total height of deposition perpendicular to the surface. The pressure of the exhaust gas 227 can also be modulated, whether increased or decreased, to help with mitigation of particle deposition.

As previously discussed in the section describing the plasma generator in detail, a contributor to the electron energy distribution function (EEDF) is the composition of the fluid between the dielectric layers. If the fluid to be treated is composed of significantly more carbon dioxide and water, and less nitrogen than ambient air, which is the case for the flue gas of coal power plants, the corresponding EEDF will change. Both carbon dioxide and water act to decrease the high energy tail of the EEDF, meaning there will be fewer electrons of high enough energy to separate carbon dioxide into carbon and oxygen ions.

Because the High Volume Fluid Decomposition unit 700 is intended to separate carbon dioxide into carbon and oxygen ions, it may be beneficial to change some of the parameters of the plasma generator 10 to make the EEDF more effective for the separation of carbon dioxide. These parameters include but are not limited to dielectric materials, dielectric thickness, electrode material, electrode gap, plasma gap, applied voltage, and frequency of applied voltage.

In some embodiments, solid catalysts may be placed in the plasma gap 15 in a configuration similar to that of a packed bed reactor. It may be necessary for some embodiments to change the size of the plasma gap 15, or any other component of the High Volume Fluid Decomposition system 700, to accommodate the addition of the solid catalysts, or any other addition relating to the purpose of economically decomposing carbon dioxide molecules. It may also be necessary for some embodiments to include structures within the plasma generator 10 that can hold the solid catalysts in place.

In some embodiments, the electrodes 16*a* and 16*b* may be mirror-polished metal, including stainless steel. Due to the mirror-finished electrodes and clarity of the borosilicate dielectric layer, the UV spectrum and intensity of the UV emitter described above is increased, enhanced, or even maximized.

The material used to bond the components to each other, including for example, the dielectric layer 14 to either of the plasma generator electrodes 16*a*, 16*b*, would need to be temperature rated and can be any known related art or later developed apparatus or method of bonding, including but not limited to adhesive, epoxy, and glue. Embodiments are intended to include any mechanism of bonding, including by mechanical means, like rivets, bolts, or any other known related or later developed mechanical apparatus.

In some embodiments, heat may impact the dimensions of the gas decomposition system 17 or its individual components, including the plasma generator 10 or the separation unit 21. For example, the heat from the flue gas may cause some components to expand, known as thermal expansion. For some adhesives, it is known that a vertical expansion of 0.5 mm or more is possible, increasing the gap between the electrodes 16*a*, 16*b* of the plasma generator 10 substantially. There may be slight changes in design or dimensions in order to accommodate this thermal expansion. Increasing the plasma gap 15 by 0.5 mm or more may be beneficial for the plasma generator 10.

2. Separation Unit a. Overview

As previously described in the Gas Decomposition System section IV herein, some of the disclosed embodiments combine the plasma generators 10 with other apparatus to perform different functions. For example, some of the plasma generators 10 discussed above are used to create ions from fluid (disposed in proximity to the plasma generator), and then to eject the ions to a separator 21. In some of these embodiments, the separator 21 is configured to separate or further redirect the ions based on charge, i.e., negatively charged ions are redirected in one or multiple directions, and the positively charged ions are redirected to another or other multiple different directions that are different from the one or the multiple directions of the negatively charged ions.

Thus, some of the above embodiments relate to methods and apparatus for redirecting ions (such as based on their charge) that are generated upon communication with free radicals resulting from atmospheric pressure low temperature plasma. These embodiments are intended to include or otherwise cover any known, related art, or later developed technologies for separating the ions, for any known or later developed purpose, and based on any conceivable criteria including but not limited to polarity of the ions.

Some of the disclosed exemplary embodiments refer to the location and configuration of electrodes used to separate negatively and positively charged ions after the ionization of gases passing through the plasma generator 10 and/or separation unit 21. However, it is intended that the invention includes any and all known, related art, and later developed technologies to separate the negatively and positively charged ions for any known or later developed conceivable application. In fact, the embodiments are intended to include or otherwise cover separating the generated ions based on criteria other than their respective positive and negative charge.

In some embodiments, side electrodes 219*a* and 219*b* are included as part of the separation unit 21. The side electrodes 219*a* and 219*b* may be positive, negative, or alternating between charges and flank a plasma generator 10 that is also included in the separation unit 21 yet may also be disposed upstream or downstream of an additional plasma generator 10.

b. Separation Electrodes

As previously described in one embodiment of the Gas Decomposition System (section IV herein), a pair of side electrodes, one at a high positive voltage 219*a* and the other at a high negative voltage 219*b*, flank the plasma generator 10, and are positioned on opposite or opposing sides of the plasma generator 10.

The side electrodes 219*a* and 219*b* can be formed from solid conductive metal (aluminum, stainless steel, etc.), similarly to the material(s) used to form the electrodes 16*a* and 16*b* of the plasma generator 10. The metal side electrodes 219*a* and 219*b* can be adhered to borosilicate glass or material(s) similar to those of the dielectric layer 14 on electrodes 16*a* and 16*b*. However, embodiments are intended to include or otherwise cover these elements being formed of any known, related art, or later developed material to perform any desired function.

The fluid, which can include carbon ions 223 and oxygen ions 222, flows through the plasma generator 10. The electric forces caused by the side electrodes 219*a* and 219*b* will pull the carbon ions 223 onto the same side of the plasma generator 10 as the negative voltage side electrode 219*b*, and the oxygen ions 222 onto the same side of the plasma generator 10 as the positive voltage side electrode 219*a*.

The dimensions of the separation electrodes 219*a*, 219*b* are shown in FIG. 28. In some embodiments, the separation electrodes 219*a*, 219*b* are embedded within an insulating material 259. The insulating material 259 located around each side electrode 219*a*, 219*b*, allows for high voltage to run through it. The size of the insulating material 259 as shown on FIG. 28 is based on industrial standards, such as those in the United States, Europe, or Japan. The height L10 of the insulating material 259 yields desirable results within 200 to 400 mm with even better results at 286 mm. The width L18 of the insulating material 259 yields desirable results within 400 to 600 mm with even better results at 500 mm.

The main area of the separation electrodes 219*a*, 219*b* is defined by the height L12 and the width L14. The height L12 of the separation electrodes 219*a*, 219*b* yields desirable results within 50 to 150 mm, with even better results at 86 mm. The width L14 of the separation electrodes 219*a*, 219*b* yields desirable results within 200 to 400 mm, with even better results at 290 mm.

The electrical lead 260 that protrudes from the separation electrodes 219*a*, 219*b* is defined by the height L15 and the width L17+L19. The total width is the addition of the width L17 within the insulating material 259 and the width L19 outside the insulating material 259. Desirable results are yielded if the width L17 is between 50 to 160 mm, with even better results at 110 mm. Desirable results are also yielded if the width L19 is between 1 to 20 mm, with even better results at 15 mm. The height L15 yields desirable results within 1 to 20 mm, with even better results at 20 mm. The total width L20 of the device yields desirable results within 400 to 600 mm, with even better results at 515 mm. The end of the electrical lead 260 that extends out of the insulating material 259 may include a tap hole 271, or any other related structure or shape to facilitate connection of the electrical lead 260 to a voltage source.

The placement of the separation electrodes 219*a*, 219*b* within the insulating material 259 depends on the surrounding spacing. Desirable results are yielded if the distance L13 between the top of the insulating material 259 and the top of the separation electrodes 219*a*, 219*b* is within 50 to 150 mm, with even better results at 100 mm. Desirable results are also yielded if the distance L11 between the bottom of the insulating material 259 and the bottom of the separation electrodes 219*a*, 219*b* is within 50 to 150 mm, with even better results at 100 mm. Desirable results are also yielded if the distance L16 between the side of the insulating material 259 and the side of the separation electrodes 219*a*, 219*b* opposite the electrical lead 260 is within 50 to 150 mm, with even better results at 100 mm. The opposite side placement of the separation electrodes 219*a*, 219*b* is also defined by L17, which, as discussed above, yields desirable results within 50 to 160 mm, with even better results at 110 mm.

In some embodiments, the separation electrodes 219*a*, 219*b* may be mirror-polished metal, including stainless steel. Due to the mirror-finished electrodes and clarity of the borosilicate dielectric layer, the UV spectrum and intensity of the UV emitter described above is enhanced, increased, or even maximized.

The material used to bond the components to each other, including for example, the side electrodes 219*a*, 219*b* to the spacer 12, would need to be temperature rated and can be any known related art or later developed apparatus or method of bonding, including but not limited to adhesive, epoxy, and glue. Embodiments are intended to include any mechanism of bonding, including by mechanical means, like rivets, bolts, or any other known related or later developed mechanical apparatus.

In some embodiments, heat may impact the dimensions of the gas decomposition system 17 or its individual components, including the plasma generator 10 or the separation unit 21. For example, the heat from the flue gas may cause some components to expand, known as thermal expansion. There may be slight changes in design or dimensions in order to accommodate this thermal expansion.

c. Fluid Separator ("Partition")

The fluid separator or partition 225 can be configured to be permanently affixed in the current embodiment, but in alternative embodiments can be configured to be removably attached to the overall structure. Some embodiments can include multiple groves within the creepage area, equal or substantially equal to the width and length of the fluid separator 225 to allow for beneficial placement of the fluid separator 225. This movement of the fluid separator 225 allows for flexibility of use for molecules separated in a particular application. The fluid separator 225 can be formed of any known, related art, or later developed insulating material similar to that of the dielectric layer 14 of the plasma generator 10, or any other similar material that operates for the function discussed above.

Because the carbon ions 223 are pulled toward the negative voltage side electrode 219*b*, the carbon ions 223 will enter the space between the partition 225 and the negative voltage side electrode 219*b* as they exit the plasma generator 10. Similarly, the oxygen ions 222 are pulled toward the positive voltage side electrode 219*a* and will enter the space between the partition 225 and the positive voltage side electrode 219*a*. Thus, the carbon ions 223 and the oxygen ions 222 are thereby separated into two separate flows exiting the device.

FIG. 29 shows the dimensions of the fluid separator 225 and its placement relative to the electrodes 16*a*, 16*b* of one layer of the plasma generator 10 from a top-down view. The overall length L24 of the electrodes 16*a*, 16*b* and all of their accompanying dielectric or insulating materials yields beneficial results between 500 and 700 mm, with even better results at 610 mm. The overall width L25 of the electrodes 16*a*, 16*b* and all of their accompanying dielectric or insulating materials yields beneficial results between 400 and 600 mm, with even better results at 500 mm.

The length L26 of the electrodes 16*a*, 16*b* yields beneficial results between 200 and 400 mm, with even better results at 300 mm. The width L27 of the electrodes 16*a*, 16*b* yields beneficial results between 200 and 400 mm, with even better results at 300 mm. The length L31 of the electrical lead 261 from the electrodes 16*a*, 16*b* that resides within the dielectric material of the dielectric layers 14 yields beneficial results between 50 and 150 mm, with even better results at 100 mm. The length L29 of the electrical lead 261 from the electrodes 16*a*, 16*b* that extends outside of the insulating material yields beneficial results between 1 and 40 mm, with even better results at 20 mm. The width L28 of the electrical lead 261 that extends outside of the insulating material yields beneficial results between 1 and 40 mm, with even better results at 10 mm. The end of the electrical lead 261 that extends out of the spacer 12 may include a tap hole 272, or any other related structure or shape to facilitate connection of the electrical lead 261 to a voltage source.

The placement of the electrodes 16*a*, 16*b* within the insulating material 259 which comprise the dielectric layers 14 relies on the distances from the sides of the electrodes 16*a*, 16*b* to the outer sides of the insulating material 259, or spacer 12 material. The distance L30 from the side of the electrode 16*a*, 16*b* opposite the electrical lead 261 to the outer side of the spacer 12 material yields beneficial results between 50 and 150 mm, with even better results at 100 mm. The distance L31 from the opposite side of the electrode 16*a*, 16*b* to the outer side of the opposite spacer 12 material yields beneficial results between 50 and 150 mm, with even better results at 100 mm. The distance L32 from the front side of the electrodes 16*a*, 16*b* to the front outer edge of the insulating material which comprise the dielectric layers 14 yields beneficial results between 50 and 150 mm, with even better results at 100 mm. The distance L33 from the rear side of the electrodes 16*a*, 16*b* to the rear outer edge of the insulating material which comprise the dielectric layers 14 yields beneficial results between 100 and 300 mm, with even better results at 210 mm.

The length L34 of the fluid separator 225 yields beneficial results between 100 and 350 mm, with even better results at 240 mm. The width L35 of the fluid separator yields beneficial results between 1 and 20 mm, with even better results at 10 mm. The distance L36 from the left side of the fluid separator 225 to the right edge of the left spacer 12 yields beneficial results between 50 and 200 mm, with even better results at 145 mm. The distance L37 from the right side of the fluid separator 225 to the left edge of the right spacer 12 yields beneficial results between 50 and 200 mm, with even better results at 145 mm.

3. Control Circuit

Previous configurations of the control and power circuits (i.e., the plasma power supply 20) can be used for embodiments where plasma gaps are provided in the plasma generator 10. As the number of plasma gaps 15 is increased, more power supplies and more than one control circuit may be provided.

At some threshold number of plasma gaps 15, it might be beneficial to combine the control and power circuits into one, with a single more powerful transformer providing the high voltage supply.

Depending on the number of electrodes connected to the transformer, it will be rated for an appropriate amount of supplied power.

In some applications, it may be beneficial to use silicon carbide semiconductors or similar apparatus to provide power to the plasma generation units 10. Silicon carbide semiconductors are smaller in size than traditional transformers and the power supply 20, but have been found to produce 3.3 kV of plasma voltage, which may be the same or different from the applied voltage. It has been shown that silicon carbide semiconductors can raise the efficiency of the plasma generating region to 90%.

4. Collection Apparatus

The High Volume Fluid Decomposition system 700 may be modified to include a variety of catalysts and collection devices to sequester, remove or process specific gases that enter the system 700 such as $CO_2$ and $CH_4$ or charged atom products from the breakdown of flue gases that enter the system by low temperature atmospheric pressure plasma, such as C+ and O−.

In some embodiments, the oxygen outlet duct 255 connects to a chimney and the carbon outlet duct 257 connects to a collection apparatus 258.

Once Ionized atoms have been diverted from the main flow of gases and particles in the high-volume Fluid Decomposition system 700, different types of collection devices can be used to collect the ionized atoms, such as carbon ions. One example is a simple dry tank that accumulates the diverted carbon-rich gas from the Separation Unit 21.

A dry tank can be made of material that can withstand various temperatures of exhaust gas, standard pressure, and resist corrosion. At relatively lower temperatures, the dry tanks can be made up of or coated with lithium, sodium, potassium, rubidium, caecum, francium, or similar material or coating. At higher temperatures, the exhaust gas may react with the metal and produce metal carbides. Additional materials to reduce, impede, or prevent corrosive metal carbides, such as carbon steel specifically used for higher temps. To reduce the possibility of rust or oxidation, the tank can be coated with temperature rated epoxy, enamel, rubber lining, zinc coating, was or silicate-based rust inhibitor coating, or similar material.

Another more complex example is a wet tank where the diverted carbon rich gas contacts some liquid that has an exceptional ability to dissolve carbon ions, thus holding them within the liquid solution for future processing. A wet tank can include a liquid catalyst such as CaOH, caustic alkaline, amine containing solution, carbonic acids, or a combination of these or similar catalysts. A further example is that of an adsorption filter 17, where the carbon ions are adsorbed onto the material, which will then degrade over time and require replacement. A similar example is a carbon adhesion sheet 224, which can peel off carbon particles, but may need to be replaced after degradation.

Additionally, a molecular sieve that allows molecules below a certain size to pass through can be added within the individually stacked units of the High Volume Fluid Decomposition system 700 or in the exiting exhaust region 242 of the system 700 This structure may include a material that allows hydrogen and oxygen to pass through, but reduces, impedes, or prevents carbon from doing so, allowing the carbon to collect. Other molecular sieves can be used that allow other molecules or different ratios of molecules to pass, but all may serve a similar purpose of collecting certain molecules/atoms like carbon and passing through others. For example, zeolite may be used to allow carbon to pass through but prevent methane from passing through, potentially allowing both $CH_4$ and C+ to be sequestered, removed, or processed.

The collection devices can be assisted in their function by introducing a chemical to the fluid that would purposefully change the composition of the plasma. For example, water or alkaline water may be added to the fluid 227 before entering the plasma generator 10, creating more hydrogen ions in the ionization process. This excess of hydrogen ions may then react with carbon ions to produce a greater number of methane molecules. In the example of the molecular sieve, the methane may then be impeded or prevented from passing through and thus collected by the sieve.

The collection devices can collect gases other than greenhouse gases that result from a reforming process. The reforming process is dependent on catalysts added to the fluid.

5. Catalysts

In order to make the High Volume Fluid Decomposition system 700 more economical, it may be desirable to include the use of catalysts. Catalysts can be introduced to facilitate the dissociation of molecules and add new molecules to the dissociation process to help control the recombined byproducts, among other materials. It has been shown that catalysts can enhance the local electric field, affect the plasma discharge type and form microdischarges in porous catalysts, while the plasma may modify catalysts and their microscopic structure, metal dispersion, and chemical state.

In determining the type of catalyst used to increase the efficiency of plasma gas, to help dissociate molecules, or to control targeted byproducts, the substance (e.g., solids, liquids, gases, gels), material the catalyst is comprised of (quartz, nickel, zeolite, sodium, etc.), and its overall physical structure may be taken into consideration. An enhanced understanding of the catalyst substance, material form, and physical structure may lend to a stronger expected result. For example, particle size, porous structure, support structure, oxygen vacancy, surface area, etc., can affect the efficiency of the plasma, dissociation, and even byproduct formation.

Catalysts do not need to be made of molecules yet can instead be ultraviolet radiation (as previously described), which is known as a photocatalyst. The location of the catalysts can be categorized into three types: upstream, downstream, or within the plasma generator 10.

An example of a catalyst located upstream of the plasma generator 10 is the addition of a catalyst such as $H_2O$ or alkaline water (Hydrogen rich water) added to untreated fluid 227 such as $CO_2$ entering the plasma gas region 15, which increases the ROS activity and adds more control over byproduct formation. In some embodiments, a nano-level water vapor jet 219 is added upstream of the plasma generator 10. The fine mist of the nano-level water vapor jet 219 allows for control over humidity levels and reduces interference with the electrical charge of the plasma gap region 15. The amount of the water vapor added must be adjusted to accommodate the overall size of the plasma generator due to humidity concerns. The humidity levels must be less than 100% and the rate of increase in humidity levels are affected by the overall size of the plasma generator 10. For example, if the plasma generator 10 is 50 cm×50 cm, it will take more time for the same nano-level water vapor device 219 to increase the humidity level to 100% as compared to the 9 cm×12 cm plasma generator 10. Another example of a catalyst located within the plasma generator 10 is a catalyst such as La—Ni/$AL_2O_3$, Mg—Ni/$AL_2O_3$, $AL_2O_3$, Ca—Ni/$AL_2O_3$ or similar that is coated on the surface of the plasma generating region on the outer surface of the dielectric layer 14 and spacer 12.

An example of a catalyst located within the plasma generator 10 is packing of the plasma gaps 15, similar to that of a packed bed reactor. It has been shown that the conversion and energy efficiency can be enhanced by using a packed bed catalyst in plasma generators 10. Packed bed catalyst such as glass beads, quartz, $AL_2O_3$, $BaTiO_3$, $SiO_2$, and $ZrO_2$ have all shown to improve conversion rates and energy efficiency of CO2. The packing materials can be unsupported spheres of catalysts, or they can be supported rods of catalysts or similar structures. The packing materials affect the physical characteristics of the plasma discharge that enhance the electric field and enable the formation of surface discharges and micro-discharges, thus promoting plasma gas phase dissociation.

An example of a catalyst located downstream of the plasma generator 10 is packing of the spaces downstream of the plasma generator 10, which include the spaces in the High Volume Fluid Decomposition system 700, the High Volume Fluid Decomposition stack 800, or the High Volume Fluid Decomposition supplement 900 that are downstream of the plasma generator 10. The catalyst is not in direct contact with the plasma so it cannot interact with short-lived ROS, only with the exit gas that contains long-lived intermediates and, possibly, vibrationally excited species.

In some embodiments, the catalyst can be packed into the insulation element between the rear section 243 and the exhaust outlet duct 242, which is part of the space inside the High Volume Fluid Decomposition system 700.

The types of catalysts used, or location of the catalyst, depends on the desired goal from introducing untreated gases, such as $CO_2$ to the cold plasma. The desired goal can be to increase the efficiency of the cold plasma being generated, to facilitate the dissociation of molecules to isolate a particular species or particle, it can be to produce a particular molecular byproduct during the recombining of volatile reactive species while in or after exiting the plasma gas region.

In some embodiments, the use of a catalyst may be to assist in the facilitation and efficiency of the plasma in dissociating molecules while coming into contact with the plasma gas region 15. By adding a catalyst, such as helium and argon, into the Fluid Decomposition system 700, the increased density of dissociated electrons will increase the rate at which $CO_2$ bonds will break. Increasing the specific energy input with an inert gas catalyst will increase the conversion rate but may decrease the energy efficiency due to the energy require to dissociate the untreated gas and the catalyst. In addition to the catalyst increasing the number of electron-impact dissociation of molecules such as $CO_2$ in the plasma gas phase, the $CO_2$ gas can also dissociate on the surface of the catalyst itself due to the energetic electrons found on the surface of the catalyst.

In some embodiments, the use of a catalyst may be to facilitate the permanent separation and collection of the dissociated molecules in the separation unit 21. In this case, the separation unit 21 dissociates molecules into various active species, and with the use of side electrodes, are guided to specified collection areas.

What is claimed is:

1. A decomposing and collection apparatus for use with a fluid, comprising:

an assembly for generating ions via applying atmospheric pressure, low temperature plasma to the fluid and separating the generated ions, the assembly including multiple plasma generator and separator units that are vertically stacked relative to each other, each of the multiple plasma generator and separator units including:

a plasma generator for generating the atmospheric pressure, low temperature plasma, the plasma generator including a first electrode covered at least in part with a first dielectric layer and a second electrode covered at least in part with a second dielectric layer and disposed such that a predetermined gap separates the first and second dielectric layers, the plasma generator also including a power supply configured to supply electrical power to the first and second electrodes at a predetermined voltage and frequency, such that, based on the predetermined gap between the first and second dielectric layers, atmospheric pressure, low temperature plasma is generated such that positively and negatively ions are ejected from the plasma generator; and a separator disposed to receive the positively and negatively ions ejected from the plasma generator, the separator including: a first separator electrode; a second separator electrode spaced from the first separator electrode; and a separator power supply that supplies electric power in the form of at least one of different voltages and different polarities to the first and second separator electrodes ranging from 0 kV and 10 kV, such that the received positively charged ions are redirected in one direction and the received negatively charged ions are redirected to another direction different from the one direction; and a collector configured to collect at least one of the redirected positively charged ions and the negatively charged ions.

2. The decomposing and collection apparatus of claim 1, wherein the collector is configured to collect the redirected positively charged ions.

3. The decomposing and collection apparatus of claim 1, further comprising a rack that is configured to operate as a housing to hold the vertically stacked multiple plasma generator and separator units.

4. The decomposing and collection apparatus of claim 3, wherein the rack defines multiple apertures that are configured such that each of the multiple plasma generator and separator units are disposed in one of the multiple apertures.

5. The decomposing and collection apparatus of claim 4, wherein the rack is configured such that each of the multiple plasma generator and separator units are insertable into and removable from one of the multiple apertures.

6. The decomposing and collection apparatus of claim 1, wherein each of the multiple plasma generator and separator units includes a hollow case in which one of the plasma generator and separator units is disposed.

7. The decomposing and collection apparatus of claim 6, wherein the hollow case of each of the multiple plasma generator and separator units is formed of an electrically insulating material to electrically insulate each of the multiple plasma generator and separator units from each other.

8. The decomposing and collection apparatus of claim 7, wherein the hollow case includes a top that defines apertures.

9. The decomposing and collection apparatus of claim 8, wherein each of the apertures of the top of the hollow case define a hexagon in cross-section so as to collectively form a honeycomb structure.

10. The decomposing and collection apparatus of claim 3, further comprising an inlet duct structure configured to facilitate flow of the fluid into each of the multiple plasma generator and separator units, the inlet duct structure being disposed at an inlet side of the rack.

11. The decomposing and collection apparatus of claim 10, further comprising an outlet duct structure configured to facilitate flow of the separated ions out of each of the multiple plasma generator and separator units, the outlet duct structure being disposed at an outlet side of the rack.

12. The decomposing and collection apparatus of claim 11, further comprising a UV emitter disposed proximate the inlet duct structure to facilitate plasma generation.

13. The decomposing and collection apparatus of claim 12, further comprising an ultrasonic oscillator disposed proximate the inlet duct structure to facilitate ion separation.

14. The decomposing and collection apparatus of claim 13, further comprising a tapered collar disposed between the inlet duct and the rack configured to facilitate laminar flow of the fluid entering the vertically stacked multiple plasma generator and separator units.

15. The decomposing and collection apparatus of claim 14, wherein the fluid is a primary fluid that includes exhaust of an industrial process, and further comprising a mixer configured to mix a secondary fluid with the primary fluid prior to entry into each the vertically stacked multiple plasma generator and separator units.

16. The decomposing and collection apparatus of claim 15, wherein the secondary fluid includes ambient air.

17. The decomposing and collection apparatus of claim 15, further comprising a heater configured and disposed to heat the secondary fluid prior to entry of the secondary fluid into the mixer.

* * * * *